United States Patent
Liu et al.

(10) Patent No.: US 11,819,835 B2
(45) Date of Patent: Nov. 21, 2023

(54) CATALYST FOR CONTAMINANT REDUCTION AND METHODS OF USE THEREOF

(71) Applicant: The Regents of the University of California, Oakland, CA (US)

(72) Inventors: Jinyong Liu, Riverside, CA (US); Changxu Ren, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 90 days.

(21) Appl. No.: 17/174,166

(22) Filed: Feb. 11, 2021

(65) Prior Publication Data

US 2021/0252492 A1    Aug. 19, 2021

Related U.S. Application Data

(60) Provisional application No. 63/002,616, filed on Mar. 31, 2020, provisional application No. 62/975,060, filed on Feb. 11, 2020.

(51) Int. Cl.
    *B01J 23/00*      (2006.01)
    *B01J 31/16*      (2006.01)
     (Continued)

(52) U.S. Cl.
     CPC .......... *B01J 31/1616* (2013.01); *B01J 21/18* (2013.01); *C02F 1/705* (2013.01); *C02F 2101/12* (2013.01)

(58) Field of Classification Search
None
See application file for complete search history.

(56) References Cited

U.S. PATENT DOCUMENTS

| | | |
|---|---|---|
| 6,077,429 A | 6/2000 | Frankenberger et al. |
| 6,077,432 A | 6/2000 | Coppola et al. |
| | (Continued) | |

OTHER PUBLICATIONS

Liu et al. (Abstract of Paper, 250th ACS National Meeting & Exposition, Boston, MA, Aug. 16-20, 2015, ENVR-142 (Year: 2015).*

(Continued)

*Primary Examiner* — Yun Qian
(74) *Attorney, Agent, or Firm* — Viksnins Harris Padys Malen LLP

(57) ABSTRACT

Described herein are heterogeneous catalysts for removing impurities, such as halogen oxyanions (e.g., $ClO_4^-$ and $ClO_3^-$), from a fluid, the catalyst can comprise: an oxygen atom transfer (OAT) transition metal, a Group VIII metal, and a support, where the transition metal and the Group VIII metal can be in physical communication with the support either directly or indirectly through each other, whereby the catalyst can chemically remove impurities from the fluid. Certain embodiments provide catalysts that further comprise nitrogen donor ligand(s). Accordingly, such catalysts that comprise the OAT transition metal in the form of a complex with one or more nitrogen donor ligands have enhanced efficiency in reducing halogen oxyanion (e.g., $ClO_4^-$) to $Cl^-$. Also described are methods or kits for making the catalysts and methods or reactor for the treatment of a fluid utilizing the catalyst.

10 Claims, 37 Drawing Sheets

(51) Int. Cl.
  C02F 1/70  (2023.01)
  B01J 21/18  (2006.01)
  C02F 101/12  (2006.01)

(56) References Cited

U.S. PATENT DOCUMENTS

| | | |
|---|---|---|
| 6,270,682 B1 | 8/2001 | Santen et al. |
| 6,878,286 B2 | 4/2005 | Jensen et al. |
| 6,881,348 B2 | 4/2005 | Cannon et al. |
| 2016/0347634 A1 | 12/2016 | Rosei et al. |

OTHER PUBLICATIONS

Chen, X, et al., "Exploring beyond palladium: Catalytic reduction of aqueous oxyanion pollutants with alternative platinum group metals and new mechanistic implications", Chemical Engineering Journal 313, 745-752 (2017).

Hurley, K, et al., "Ligand-Enhanced Reduction of Perchlorate in Water with Heterogeneous Re-Pd/C Catalysts", J Am Chem Soc 131 (40), 14172-14173 (2009).

Kuznetsova, et al., "Cyclohexane oxidation with an O2-H2 mixture in the presence of a two-component Pt/C-heteropoly acid catalyst and ionic liquids", Kinetics and Catalysis, 58 (5), 522-532, (2017).

Liu, J, et al., "A New Bioinspired Perchlorate Reduction Catalyst with Significantly Enhanced Stability via Rational Tuning of Rhenium Coordination Chemistry and Heterogeneous Reaction Pathway", Environ Sci Technol 50, 8874-5881 (2016).

Ren, C, et al., "A Bioinspired Molybdenum Catalyst for Aqueous Perchlorate Reduction", ChemRxiv. Cambridge: Cambridge Open Engage, 17 pages; Preprint, https://doi.org/10.26434/chemrxiv.13107743.v1 (Oct. 2020).

Ren, C, et al., "A Bioinspired Molybdenum Catalyst for Aqueous Perchlorate Reduction", J Am Chem Soc 143, 7891-7896 (May 2021).

Ren, C, et al., "A Bioinspired Molybdenum Catalyst for Aqueous Perchlorate Reduction", Supplemental Information, ChemRxiv. Preprint, https://doi.org/10.26434/chemrxiv.13107743.v1, 29 pages (Oct. 2020).

Ren, C, et al., "ENVR 539: Bioinspired heterogeneous catalysts for (per)chlorate reduction: Continuous improvements in activity, stability, and economy", American Chemical Society Spring 2019 National Meeting & Exposition, Orlando, FL, Presentation 22 pages (Apr. 2, 2019).

Ren, C, et al., "Catalytic Reduction of Aqueous Chlorate with MoOx Immobilized on Pd/C", ACS Catal 10, Supporting Information, 1-8 (Jul. 2020).

Ren, C, et al., "Catalytic Reduction of Aqueous Chlorate With MoOx Immobilized on Pd/C", ACS Catal. 10(15), 8201-8211 (Jul. 2020).

Ren, C, et al., "CATL 277: Substantially enhanced reduction of oxyanions through the integration of Group 6-8 metal oxides into supported hydrogenation catalyst", American Chemical Society Spring 2019 National Meeting & Exposition, Orlando, FL, Abstract, 1 page (Feb. 12, 2019).

Ren, C, et al., "ENVR 539: Biomimetic heterogeneous catalysts for chlorate reduction", American Chemical Society Spring 2019 National Meeting & Exposition, Orlando, FL, Abstract, 1 page (Feb. 12, 2019).

Ren, C, et al., "Molybdenum-Catalyzed Perchlorate Reduction: Robustness, Challenges, and Solutions", ACS EST Engg 2, 181-188 (Oct. 2021).

Ren, C, et al., "CATL 277: Substantially Enhanced Reduction of Aqueous Chlorate through the Immobilization of Molybdenum Species on Palladium Catalyst", Presentation at American Chemical Society Spring 2019 National Meeting & Exposition, Orlando, FL, 17 pages (Apr. 2, 2019).

Liu, J, et al., "ENVR-142: Using Bio-inspiration to Design Catalysts for Water Purification", Presentation at American Chemical Society 2015 National Meeting & Exposition, Boston, MA, 22 pages (Aug. 17, 2015).

Liu, J, et al., "Bioinspired Complex-Nanoparticle Hybrid Catalyst System for Aqueous Perchlorate Reduction: Rhenium Speciation and Its Influence on Catalyst Activity", ACS Catal. 2015, 5, 2, 511-522 (Dec. 2014).

\* cited by examiner

| entry | ligand | TOF₀ (h⁻¹)[b] |
|---|---|---|
| | (4,4'-disubstituted-2,2'-bipyridine) | |
| 1 | R = H | 14.3 |
| 2 | R = Me | 12.4 |
| 3 | R = OH | 11.7 |
| 4 | R = OMe | 20.8 |
| 5 | R = NMe₂ | 53.9 |
| 6 | R = NH₂ | 106 |
| 7 | R = Cl | 0.63 |
| 8 | 6,6'-dimethyl-2,2'-bipyridine | 0.78 |
| 9 | 2,2'-biquinoline | 0.13 |
| | (4-substituted pyridine) | |
| 10 | R = H | 0.16 |
| 11 | R = OH | 0.16 |
| 12 | R = NH₂ | 0.090 |
| 13 | R = NMe₂ | 0.79 |
| 14 | trans-1,2-diaminocyclohexane | 0.43 |
| 15 | ethylenediamine | 0.18 |
| 16 | TMEDA | 0.22 |

| entry | ligand | TOF₀ (h⁻¹)[b] |
|---|---|---|
| 17 | 1,10-phenanthroline | 3.1 |
| 18 | 2-(2-pyridyl)imidazole | 4.6 |
| 19 | 4,4-dimethyl-2-(2-pyridyl)oxazoline | 2.8 |
| 20 | 2-(oxazolinyl)-1,8-naphthyridine | 0.31 |
| 21 | 1,10-phenanthroline-5,6-dione | 11.2 |
| 22 | cyclopenta-fused diazafluorenone | 0.40 |
| 23 | 2,2':6',2''-terpyridine | 0.85 |

FIG. 36

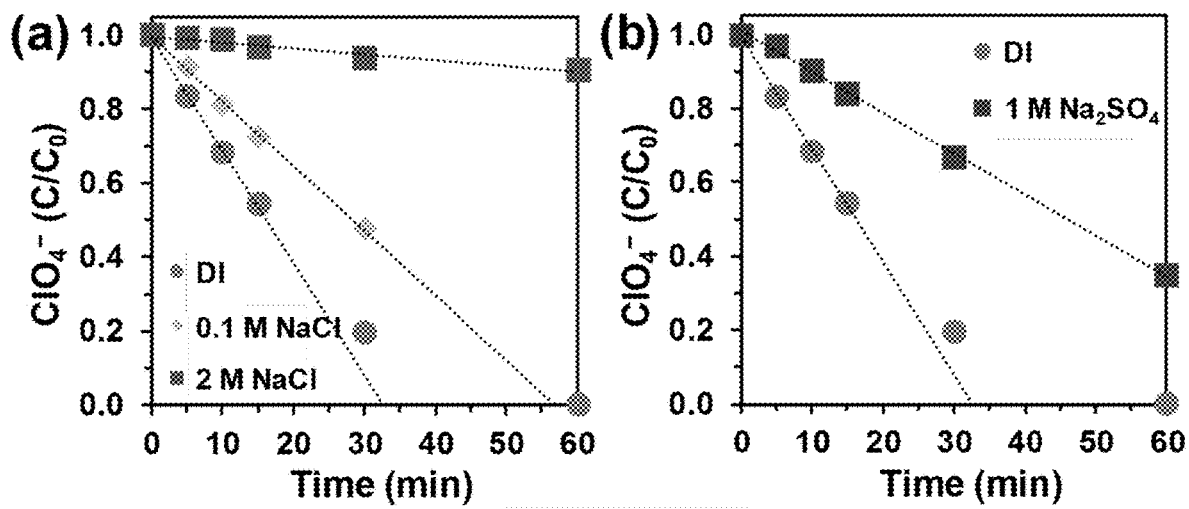
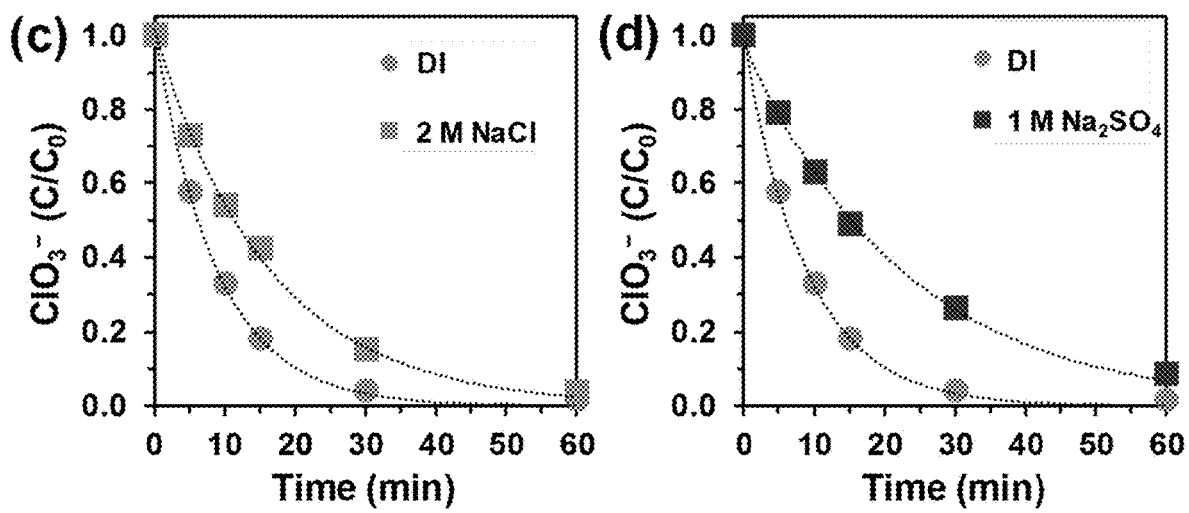
FIGS. 43A-43D

CATALYST FOR CONTAMINANT REDUCTION AND METHODS OF USE THEREOF

RELATED APPLICATIONS

This application claims priority to United States Provisional Patent Application No. 62/975,060, filed 11 Feb. 2020, and to U.S. Provisional Patent Application No. 63/002,616, filed 31 Mar. 2020. The entire content of these United States Provisional Patent Applications are hereby incorporated by reference herein.

BACKGROUND

Field of the Invention

The present invention relates to novel compositions and methods for the treatment of contaminated water. More specifically, the invention comprises processes for removing chlorate, bromate, perchlorate, chlorite, nitrate, nitrite, or iodate from aqueous solution by bimetallic heterogeneous catalysts.

Reduction of chlorate ($ClO_3^-$) has significant values in a variety of environmental and energy-related applications. Over 4 million tons of $NaClO_3$ are manufactured annually in the world for pulp bleaching, pyrotechnics, weed control, water disinfection, and many other applications (IMARC Group. *Sodium Chlorate Market: Global Industry Trends, Share, Size, Growth, Opportunity and Forecast* 2019-2024, 2019). The heavy application of chlorate leads to widespread environmental pollution, and the World Health Organization (WHO) has proposed a guideline for mitigating $ClO_3^-$ concentration in drinking water (0.7 mg $L^{-1}$) (World Health Organization, *Chlorite and Chlorate in Drinking-water: Background Document for Development of WHO Guidelines for Drinking-water Quality* 2005). On the other hand, the global production of $Cl_2$ has reached over 70 million tons per year through the electrochemical Chlor-Alkali processes, where on average 1 kg of $ClO_3^-$ is generated per ton of $Cl_2$ produced (Brinkmann, T. et al., *Best Available Techniques (BAT) Reference Document for the Production of Chlor-Alkali*. JRC Science and Policy Reports EUR. 2014). The undesirable $ClO_3^-$ byproduct has negative effects on the manufacturing processes and to the environment upon emission (Lakshmanan, S. et al., Water Science and Technology 2016, 74, 2819-2831). Therefore, at least 70,000 tons of $ClO_3^-$-must be treated in Chlor-Alkali plants per year. The typical waste brine from Chlor-Alkali processes contains up to 10 g $L^{-1}$ of $ClO_3^-$ and up to 5 M of NaCl. Other electrochemical technologies such as water splitting (Park, H. et al., Journal of Physical Chemistry C 2009, 113, 7935-7945), wastewater treatment (Cho, K et al., Environmental Science and Technology, 2014, 48, 2377-2384.), and direct HCl production from seawater desalination waste brine (Kumar, A. et al., Nature Catalysis, 2019, 2, 106.) can also produce various levels of undesirable $ClO_3^-$ at the anode. The World Health Organization (WHO) has proposed a guideline for mitigating the $ClO_3^-$ concentration below 0.7 mg $L^{-1}$ in drinking water (Chlorite and Chlorate in Drinking-water: Background Document for Development of WHO Guidelines for Drinking-water Quality 2005, WHO/SDE/WSH/05.08/86). The third Unregulated Contaminant Monitoring Rule (UCMR 3) by the United States Environmental Protection Agency (USEPA) includes $ClO_3^-$ as a contaminant to be monitored by public water systems, with the Minimum Reporting Level at 0.02 mg $L^{-1}$. Therefore, an effective and efficient approach for $ClO_3^-$ reduction will be highly beneficial for a wide scope of environmental and industrial endeavors.

In Chlor-Alkali plants, the $ClO_3^-$ byproduct can be reduced by either disproportionation under acidic reduction (Eq. 1) or catalytic reduction by $H_2$ (Eq. 2):

$$ClO_3^- + 6H^+ + 5Cl^- \rightarrow 3H_2O + 3Cl_2 \quad (1)$$

$$ClO_3^- + 3H_2 \rightarrow Cl^- + 3\,H_2O \quad (2)$$

Acid reduction requires >85° C., and pH 0 to achieve a partial (60-90%) removal of $ClO_3^-$ and involves large amounts of HCl and NaOH (for post-reaction neutralization). In comparison, the emerging catalytic reduction approach uses $H_2$ that is produced in excess from the Chlor-Alkali process (i.e., about 10% of the produced $H_2$ is emitted to the atmosphere), does not require highly acidic pH, and provides an almost complete $ClO_3^-$ removal ratio (i.e., >99%). Supported platinum group metal (PGM) catalysts have been examined. For instance, a United States patent issued to Santen et al. describes a method for chemically reducing $ClO_3^-$ with a heterogeneous rhodium/or platinum catalyst. See U.S. Pat. No. 6,270,682 (issued Aug. 7, 2001). The inventors have discovered that the overall catalytic performance depends closely on the selection of the support material. In addition, the effects of reaction temperature, catalyst loading, and aqueous pH were investigated. The preferred embodiment is capable of removing 96% of initial chlorate from a synthetic electrolysis solution (210 g/L of NaCl, 14 g/L chlorate). However, it requires high catalyst loadings to achieve a satisfying rate for $ClO_3^-$ reduction. Furthermore, in comparison to their performance in deionized water, rhodium catalysts are significantly inhibited by concentrated salts in brine.

The above discussion clearly indicates that it is highly desirable to develop a novel $ClO_3^-$ reduction catalyst (i) showing superior reactivity, stability, and robustness, (ii) using an Earth-abundant metal, and (iii) from facile preparation.

On the other hand, perchlorate ($ClO_4^-$) was artificially prepared for the first time in 1816. In the following two centuries, the chemistry of $ClO_4^-$ attracted widespread interests due to its explosive tendency and applications in munitions and pyrotechnics (D. R. Parker, Environ. Chem. 6, 10-27 (2009)). In the late $20^{th}$ century, as a ubiquitous additive in rocket propellants, various perchlorate salts were massively manufactured in the United States. At nearly the same time, enormous amounts of $ClO_4^-$ containing waste has been disposed of and released into environment without regulation, serving as a major source of $ClO_4^-$ that has been discovered in surface and ground water. In the natural environment, the $ClO_4^-$ anion is inert to most reducing processes and is not well retained by soil, with less than 10% of $ClO_4^-$ being adsorbed by the solid phase. See Id., C. W. Trumpolt et al., *Perchlorate: sources, uses, and occurrences in the environment*. 16 Remediation J.: The Journal of Environ. Cleanup Costs, Tech. & Techniques 65-89 (2005). Therefore, $ClO_4^-$ is capable of being transported long distance in water without significant degradation (P. Kumarathilaka et al., Chemosphere 150, 667-677 (2016)). The primary health concern associated with $ClO_4^-$ consumption by human beings is the inference with thyroid function via inhibition of iodide uptake, which results in insufficient thyroid hormone production (A. B. Kirk, Analytica Chimica Acta. 567, 4-12 (2006)). Animal testing of $ClO_4^-$ has also identified a series of additional developmental and reproductive toxicities (A. Srinivasan, T. Viraraghavan, Int. J. Environ. Res. Public Health. 6, 1418-1442 (2009)). Due to the confirmed toxicity of $ClO_4^-$, there has been growing concerns over its impact to drinking water quality standards and potential environmental impacts. In 2009, the U.S. EPA established an Interim Lifetime Drinking Water Health Advisory limit of 15 µg $L^{-1}$ for $ClO_4^-$. See EPA Federal Facilities Restoration and Reuse Office, Technical Fact Sheet—Perchlorate. In addition, several states have promulgated enforceable standards for $ClO_4^-$ in drinking water. For example, California has established 6 µg $L^{-1}$ of $ClO_4^-$ in drinking water and an action level of 18 µg $L^{-1}$ based on an evaluation of toxicity data by the EPA. Se Id.

Along with efforts being made in setting regulatory limits, there also has been intense interest in developing effective and efficient remediation strategies. Based upon their approach, reported $ClO_4^-$ treatment methods can be classified into physical, biological, and chemical approaches.

Previously, a United States patent issued to Cannon et al. describes a method for physically removing $ClO_4^-$ through passing the fluid over a functionalized granular activated carbon (GAC). See U.S. Pat. No. 6,881,348. The inventors have discovered that the activity level of GAC can be extended by more than sixteen times after preloaded with the cationic alkyl ammonium monomers. Moreover, the bed life of GAC can be substantially extended by introducing ammonia or nitrogen-containing substances into carbon matrix. The preferred embodiment may be capable of removing $ClO_4^-$ from a solution that contains 50 ppb of $ClO_4^-$ to an amount of 4 ppb for at least 3000-bed volumes. Other patented or reported methods include using ion-exchange (IX) column and reverse osmosis (RO) membrane. See H. P. Huq, J.-S. Yang, et al., Desalination. 204, 335-343 (2007): U.S. Pat. No. 6,878,286. These physical removal methods have been widely used in drinking water treatment processes. The removal of $ClO_4^-$ would be easily achieved by retrofitting existing processes in water treatment facilities. While physical removal is convenient and relatively fast, the intrinsic drawback of still having to dispose of concentrated $ClO_4^-$ still limits its large-scale application. Concentrated $ClO_4^-$ in the spent brine from IX regeneration and RO reject streams still needs further treatment for proper disposal.

In recent years, biological $ClO_4^-$ reduction has shown great promise for large-scale applications. (B. E. Logan, Environ. Sci. Technol. 35, 23, 482A-487A, 2001). The transformation of $ClO_4^-$ to nontoxic species can be achieved through anaerobic respiration of microorganisms, ee U.S. Pat. No. 6,077,429. Oxygen usually serves as a final electron acceptor in the process of microbial respiration. However, when oxygen is depleted or not available, the oxidation of organic compounds requires the use of alternative electron acceptors, such as nitrate, sulfate, and high-valence metal ions. While all aforementioned electron acceptors are not accessible to microbes, $ClO_4^-$ has a great potential for utilization as an alternate since the oxidation state of chlorine is +7 in $ClO_4^-$. (D. C. Herman, et al., J. Environ. Qual. 28, 1018-1024 (1999)). Several anaerobic microorganisms have been isolated and have shown capability to remove $ClO_4^-$ in a various range of $ClO_4^-$ concentrations. For instance, a specific bacterium, *Wolinella succinogenes*, described in a US patent has the ability to reduce high concentrations (>7000 mg $L^{-1}$) of $ClO_4^-$ with a specific $ClO_4^-$ degradation rate of 1492 mg perchlorate per hour per gram biomass (dry weight). See U.S. Pat. No. 6,077,432: W. Wallace, et al., J. Industrial Microbiology. 16, 68-72 (19%). Such a high concentration of $ClO_4^-$ is commonly seen in industrial wastewater. Another emerging concern is the presence of $ClO_4^-$ in drinking water supplies at moderate to low concentrations. A bacterium, perclace (ATCC 202172), isolated from activated sewage sludge was reported to be effective in removing $ClO_4^-$ from solutions with concentration of $ClO_4^-$ between 0.1 and 1000 mg $L^{-1}$. See U.S. Pat. No. 6,077,429. By optimizing nutrient and environment conditions, the anaerobic reactors loaded with specific bacteria may be able to treat a wide-range concentration of $ClO_4^-$ contaminated solutions. However, the major concern of implementing bioreactors in large scale is the requirement of long processing times for reduction of $ClO_4^-$ to required levels. Moreover, microbial activity is sensitive to contamination and environmental conditions. Therefore, additional investment is needed for field monitoring to maintain a suitable environment for the bacteria. In addition, biological remediation also has the inherent risk of microbial contamination of the product water.

Besides bioremediation, chemical reduction is another potential means to remove $ClO_4^-$. Compared with biological treatments, chemical reductions have higher operational flexibility, require less maintenance, can be operated intermittently, and raise no concerns over microbial contamination in treated water. Nonetheless, noncatalytic $ClO_4^-$ reductions using excess reagents, including zero-valent iron (Y. Xie et al., Separation and Purification Technol. 171, 164-173 (2016)), iron filings (A. M. Moore at al., Environ. Sci. & Technol. 37, 3189-3198 (2003)), and titanium (III) (F. R Duke, P. R. Quinney, J. of the Am. Chem. Soc. 76, 3800-3803 (1954)), have suffered from a series of challenges by feasibility (e.g., high temperature and/or pressure, introduction of new chemicals upon reaction) and economic justification. The use of heterogeneous hydrogenation catalysts, such as immobilized palladium nanoparticles on activated carbon (Pd/C), on alumina (Pd/$Al_2O_3$) and other supports, to catalyze the reduction of toxic oxyanions (e.g., $BrO_3^-$, $NO_2^-$, $NO_3^-$, $ClO_3^-$, and $ClO_4^-$) in water has been explored for more than a decade (X. Chen et al., Chem. Engr. J. 313, 745-752 (2017)). The unique and attractive feature of this approach is the clean conversion. When active H species (i.e., H*) is generated by $H_2$ activation on $M^0$ nanoparticles ($H_2 \rightarrow 2H^*$), the toxic $BrO_3^-$, $NO_2^-/NO_3^-$, and $ClO_3^-$ are reduced into $Br^-$, $N_2$ (if $NH_3$ formation is suppressed) and $Cl^-$, respectively, leaving $H_2O$ as the only byproduct. However, the reduction of $ClO_4^-$ by these hydrogenation metal catalysts alone is sluggish. High-valence rhenium (Re) oxo species have been known as active homogeneous catalyst in $ClO_4^-$ reduction (M. M. Abu-Omar, et al., Inorganic chemistry. 34, 6239-6240 (1995)). Under conditions not suitable for water treatment, oxygen atom transfer (OAT) from $ClO_4^-$ to Re center leads to the stepwise reduction of $ClO_4^-$ to $Cl^-$. To promote $ClO_4^-$ reduction, bimetallic heterogeneous catalysts have been developed by incorporating oxorhenium species or organometallic Re complexes with Pd on activated carbon support (Re—Pd/C). See J. Liu et al., Environ. Sci & Technol. 50, 11, 5874-5881 (2016); K. D. Hurley, et al., J. Am. Chem. Soc. 131, 14172-14173 (2009). Later, a US patent application publication by Rosei et al. described a similar approach to facilitate the $ClO_4^-$ reduction by rhenium-iridium heterogeneous catalyst (U.S. patent, App. Pub. US2016/0347634). The Re—Pd/C realizes a complete reduction of $ClO_4^-$ to $Cl^-$ under ambient conditions in pure water, and the optimized catalyst was superior to any other reported chemical reduction methods in activity, efficiency, and byproduct formation perspective. On the other hand, several aspects, including (1) the use of rare and precious metals and (2) the limited activity and substrate scope, need to be addressed before the implementation of Re-based heterogeneous catalysts in water treatment process.

Form above discussion, there is also a need to develop effective, robust, and economical systems for removing $ClO_4^-$ from water.

SUMMARY OF THE INVENTION

In accordance with the present invention, the inventors have now found that the immobilization of oxygen-atom transfer (OAT) transition metals (e.g., vanadium (V), tungsten (W), and molybdenum (Mo)) oxides onto hydrogenation catalysts provides a significant enhancement in the catalytic activity of $ClO_3^-$ reduction.

Some embodiments describe a heterogeneous catalyst for removing toxic oxyanions from a fluid. The catalyst contains an OAT transition metal oxide, a Group VIII (Group 8, Group 9, and Group 10) of the Periodic Table of the Element metal and support. The transition metal oxide and the Group VIII metal are physically immobilized onto the support, which allows the physical or chemical communication between the aforementioned two components. In certain embodiments, in the presence of acidic and/or reducing environment, the catalyst removes toxic oxyanions from the fluid (e.g., stepwise reduction of $ClO_4^-$ and/or $ClO_3^-$ to $Cl^-$).

In some catalysts, the OAT transition metal can be a Group VA (Group 5) or Group VIA (Group 6) of the Periodic Table of the Elements metal. For some catalyst embodiments, the OAT transition metal can be vanadium, tungsten, molybdenum or oxides thereof. In some embodiments, the OAT transition metal can be molybdenum.

In some catalysts, the support can comprise an oxide of a metal or a non-oxide. In some embodiments, the oxide of metal can comprise an oxide of a metal selected from the group consisting of silicon, aluminum, magnesium, titanium, cerium, zirconium, yttrium oxides, zeolites, and mixtures thereof. For some embodiments, the non-oxide can comprise activated carbon, charcoal, biochars, graphene, graphite, single-wall carbon nanotubes, multi-wall carbon nanotubes, and nanofibers, carbon nitride, or silicon carbide. In some catalysts, the support can comprise activated carbon. For some catalysts, the total amount of loading of OAT transition metal on the support can be from about 0.01 wt. % to about 20 wt. %, of the support.

Some embodiments describe a method of making a heterogeneous catalyst, where the method can comprise: combining a) an OAT transition metal, b) one or more of a Group VIII metal, and c) a support as a mixture (e.g., mixture of a), b), and c)) to create the heterogenous catalyst immobilized on the support. In some embodiments, the combining step comprises mixing.

In some embodiments, the method can comprise: obtaining an OAT transition metal, adding one or more of a Group VIII metal to create a mixture, adding a support, and immobilizing the heterogeneous catalyst. In some embodiments, the Group VIII metal and the support can be provided together (e.g., activated carbon matrix supplied with Pd/C) for combining with the OAT transition metal. In some methods, the step of obtaining an OAT transition metal can comprise obtaining mono-, poly- or heteropoly-oxometallates as OAT transition metal oxide precursors. In some methods, the OAT transition metal oxide precursor is reduced to obtain a lower valent metal oxide. For example, a Mo oxide precursor is reduced to obtain a lower valent Mo oxide. In some method embodiments, the molar ratio of the Group VIII metal to OAT transition metal for combining is from about 100:1 to about 1:100. In some embodiments, the total amount of support as measured by the weight of the OAT transition metal as compared to the weight of the support is from about 0.1 wt. % to about 10 wt %. Some methods can further comprise mixing the mixture for about 1 second to about 5 minutes (e.g., before immobilizing the mixture on the support). The method can also further comprise adjusting the pH of the mixture to a pH of from about 1 to about 6.4. In some methods, the method can further comprise mixing the mixture under a reducing atmosphere for about 10 minutes to about 48 hours.

The aforedescribed catalyst and associated methods are well suited for use in the removal of $ClO_3^-$ and/or other oxyanions from contaminated water, ion exchange brine, and Chlor-Alkali electrolysis solution. As a feature of the present invention, the catalytic reduction of $ClO_3^-$ can be directly used for industrial wastewater treatment or it can be coupled with any existing physical removal processes wherein the chemical transformation of $ClO_3^-$ to $Cl^-$ is required.

The catalysts can be used in treating contaminated water where the initial $ClO_3^-$ concentration is extremely high (1M or $8.3 \times 10^4$ ppm). In addition, the catalysts show very high activity in reducing 1 mM $ClO_3^-$ (83 ppm) in solutions containing 2 M NaCl. 5 M NaCl. 1 M $Na_2SO_4$, and 1 M NaBr, respectively. These results collectively indicate a potential application for IX resin regeneration. Moreover, the catalysts have achieved over 99.7% of $ClO_3^-$ removal in the synthetic Chlor-Alkali electrolysis solution (3.6 M NaCl and 170 mM $ClO_3^-$). The observed $ClO_3^-$ reduction activity outperforms the catalysts that are currently being used in the Chlor-Alkali industry. Most importantly, the active species in the new catalysts are oxidized species of earth-abundant transition metals, which significantly reduces the cost of catalyst.

Certain embodiments of the catalysts described above further comprise one or more nitrogen donor ligands, wherein the OAT transition metal is in the form of complex with the nitrogen donor ligand. Accordingly, certain embodiments of the methods for making the catalysts described above further comprise adding a nitrogen donor ligand(s). In certain embodiments, the catalysts comprising such OAT transition metal-nitrogen donor ligand complex have enhanced efficiency in removing toxic oxyanion (e.g., reducing $ClO_4^-$ to $Cl^-$) from the fluid.

In accordance with the present invention, the inventors have found that the immobilization of the mixture of oxygen-atom transfer (OAT) transition metals (e.g., vanadium (V), tungsten (W), and molybdenum (Mo)) oxides with mono-, bi-, or tri-dentate nitrogen-donor ligands (L) onto hydrogenation catalysts provides a significant enhancement in the catalytic activity of $ClO_4^-$ reduction.

Some embodiments describe a heterogeneous catalyst for removing impurities from a fluid, the catalyst comprising, an OAT transition metal in the form of a complex with one or more nitrogen donor ligands, a Group VIII (Group 8, Group 9, and Group 10) of the Periodic Table of the Elements metal, and a support, where the transition metal complex and the Group VIII metal can be in physical communication with the support either directly or indirectly through each other, whereby the catalyst chemically removes impurities from the fluid in the presence of a reducing atmosphere when the fluid is acidic.

In some catalysts, the OAT transition metal can be a Group VA (Group 5) or Group VIA (Group 6) of the Periodic Table of the Elements metal. For some catalyst embodiments, the OAT transition metal can be vanadium, tungsten, molybdenum, or oxides thereof. In some embodiments, the OAT transition metal can be molybdenum.

For some catalysts, the molar ratio of OAT transition metal to ligand can be from about 10:1 to about 1:10. In some catalyst embodiments, the molar ratio of OAT transition metal to ligand can be about 1:1. With some catalysts, the molar ratio between the Group VIII metal and OAT transition metal can be from about 100:1 to about 1:100. In some embodiments, the molar ratio between the Group VIII metal and OAT transition metal can be about 0.90.

In some catalysts, the support can comprise an oxide of metal or a non-oxide. In some embodiments, the oxide of metal can comprise an oxide of a metal selected from the group consisting of silicon, aluminum, magnesium, titanium, cerium, zirconium, yttrium oxides, zeolites, and mixtures thereof. For some embodiments, the non-oxide can comprise activated carbon, charcoal, biochars, graphene, graphite, single-wall carbon nanotubes, multi-wall carbon nanotubes, and nanofibers, carbon nitride, or silicon carbide. In some catalysts, the support can comprise activated carbon. For some catalysts the total amount of loading of OAT transition metal on the support can be from about 0.01 wt. % to about 20 wt. % of the support. For some the total amount of loading of OAT transition metal on the support can be from about 1 wt. % to about 15 wt. % of the support. For still some more the total amount of loading of OAT transition metal on the support can be about 5 wt. % of the support.

Some embodiments describe a method of making a heterogeneous catalyst, where the method can comprise: combining a) an OAT transition metal, b) a ligand (e.g., nitrogen donor ligand), c) one or more of a Group VIII metal, and d) a support as a mixture (e.g., mixture of a), b), c), and d)) to create the heterogenous catalyst immobilized on the support. In some methods, the OAT transition metal can be prepared from mono- poly- or heteropoly-oxometallates as OAT transition metal oxide precursors. For some methods, the molar ratio of OAT transition metal to ligand can be from about 10:1 to about 1:10. In some method embodiments, the molar ratio of the Group VIII metal to OAT transition metal is from about 100:1 to about 1:100. In some embodiments, the total amount of support as measured by the weight of the OAT transition metal as compared to the weight of the support is from about 0.01 wt. % to about 20 wt. %. Some methods can further comprise mixing the mixture for about 1 second to about 5 minutes. Some methods can also further comprise adjusting the pH of the mixture to a pH of from about 1 to about 6. In some methods, the method can further comprise mixing the mixture under a reducing atmosphere for about 10 minutes to about 48 hours.

The above discussed and many other features of the present invention will become better understood by reference to the following detailed description when taken in conjunction with the accompanying drawings.

BRIEF DESCRIPTION OF THE DRAWINGS

(FIG. 12a) Profiles, first-order fittings, and rate constants for the reduction of $ClO_3^-$ by Pd/C added with various POM precursors; (FIG. 12b) profiles of $ClO_3^-$ reduction by the $MoO_x$—Pd/C catalyst prepared by allowing variable time lengths after adding the $Na_2MoO_4$ precursor under 1 atm $H_2$ and before adding the $NaClO_3^-$ substrate; FIG. 12b shows the "catalyst preparation time" need no longer than 15 min but preferably no less than 5 min. The "preparation time" means the time after the Mo precursor was added into the water suspension of Pd/C under 1 atm $H_2$ atmosphere but before the addition of chlorate. A short time (e.g., <15 min) is needed to reduce the absorbed Mo(+VI) precursor into the active species for chlorate reduction. In comparison, one can see an induction period when only 5 min is used, because after the chlorate was added, the Mo species still need more time than 5 min to get reduced first. (FIG. 12c) chlorine mass balance: (FIG. 12d) effect of concentrated salts; (FIG. 12e) effect of proton concentrations; and (FIG. 12f) effect of Mo contents in catalyst. Unless specified, all reactions used 1 mM $ClO_3^-$, 0.2 g $L^{-1}$ $MoO_x$—Pd/C (nominally 5 wt % Mo from $Na_2MoO_4$), pH 3.0, 20° C. Inset (FIG. 12g) shows the reduction of (i) 1 M ClO3- in DI water and (ii) 170 mM $ClO_3^-$ in 3.6 M NaCl brine by 0.5 g $L^{-1}$ $MoO_x$—Pd/C.

(FIG. 13a) HAADF-STEM imaging of the $MoO_x$—Pd/C catalyst and EDX mapping of (FIG. 13b) C, (FIG. 13c) O, (FIG. 13d) Pd, and (FIG. 13e) Mo. (FIG. 13f) The combined Pd and Mo mapping showing the different distribution of the two elements.

(FIG. 14a) Mo 3d XPS spectra of $MoO_x$—Pd/C samples; (FIG. 14b) Mo K-edge XANES spectra of the reduced $MoO_x$—Pd/C and references, with the two arrows indicating the characteristic pre-edge peak for oxo-Mo$^{VI}$ species; (FIG. 14c) the correlation between Mo K-edge energies and valences for the references; (FIG. 14d) Mo 3d XPS spectrum of the solid residue from the dried aqueous solution of $Na_2MoO_4$ after hydrazine reduction; (FIG. 14e) Mo K-edge EXAFS spectra of the reduced $MoO_x$—Pd/C and references; and (FIG. 14f) the Fourier transforms. In XPS and EXAFS spectra, the dotted and solid lines represent collected signal and fit spectra, respectively.

(FIG. 34A) Microbial process for $ClO_4^-$ reduction: (FIG. 34B) electron transfer and metal centers in perchlorate reductase (Pcr); (FIG. 34C) proposed redox cycling of the Mo co-factor in Youngblut, M. D., et al., Perchlorate reductase is distinguished by active site aromatic gate residues. *J. Biol. Chem.* 2016, 291, 9190-9202; (FIG. 34D) a reported bioinspired iron complex for $ClO_4^-$ reduction; (FIG. 34E) a reported rhenium complex for $ClO_4^-$ reduction; (FIG. 34F) the general working mechanism of the new (L)MoOx-Pd/C catalyst in Example 80.

FIG. 36. Perchlorate Reduction Activity of Mo—Pd/C Catalysts Enabled by Various Nitrogen Ligands. Reaction conditions; 1 mM $ClO_4^-$ in water, 0.5 g L$^{-1}$ catalyst (5 wt % Mo and 5 wt % Pd on carbon), molar ratio of Ligand: Mo=1 (bidentate) or 2 (monodentate), pH 3.0, 1 atm $H^2$, 20° C. Entries 5 and 6 used 0.2 g L$^{-1}$ catalyst. Calculated using the degradation of the first 5% of 1 mM $ClO_4^-$ and four OAT cycles to reduce each $ClO_4^-$ into $Cl^-$.

(FIG. 39A) Chlorine balance during the reduction of $ClO_4^-$: (FIG. 39B) the effect of the different molar ratios of $(NH_2)_2$bpy:Mo; (FIG. 39C) the effect of Mo content in the catalyst (y-axis: apparent 0th-order rate constant divided by the catalyst loading); (FIG. 39D) performance for ten spikes of 1 mM $ClO_4^-$; (FIG. 39E) the ratio of immobilized ligand and Mo during the reduction of $ClO_4^-$; (FIG. 39F) the effect of solution pH. Default reaction conditions: 0.2 g $L^{-1}$ catalyst (5 wt % Mo in 5 wt % Pd/C, molar ratio of $(NH_2)_2$bpy:Mo=1:1), 1 mM $ClO_4^-$, pH 3.0, 1 atm $H_2$, 20° C.

FIGS. 43A-43D. Inhibition of the $ClO_4^-$ reduction using [$(NH_2)_2$bpy]$MoO_x$—Pd/C (panels FIG. 43a and FIG. 43b) and the $ClO_3^-$ reduction using ligand-free $MoO_x$—Pd/C (panels FIG. 43c and FIG. 43d) by chloride and sulfate anions. Dotted lines indicate the $0^{th}$- or $1^{st}$-order fittings using the data with $C/C_0$>0.2. Fitting results and catalyst activity comparisons are shown in Table 13. Reaction conditions: 0.2 g $L^{-1}$ catalyst (5 wt % Mo in 5 wt % Pd/C), 1 mM $ClO_4^-$ or $ClO_3^-$, pH 3.0, atm $H_2$, 20° C. "DI" indicates control solutions without additions of NaCl or $Na_2SO_4$.

(FIG. 45A-FIG. 45C) Mo 3d XPS spectra (empty dots) and fits (solid lines) of the [$(NH_2)_2$bpy]$MoO_x$—Pd/C catalyst; (FIG. 45D) the correlation between Mo K-edge XANES energies and valences for the catalyst and Mo references; (FIG. 45E) the EXAFS Fourier transforms (dotted lines) and their fits (solid lines): (FIG. 45F) a proposed structure of the reduced [$(NH_2)_2$bpy]$MoO_x$ species and one representative redox transformation for the catalytic reduction of $ClO_4^-$. (FIG. 45G-FIG. 45J) HAADF-STEM imaging of the [$(NH_2)_2$bpy]$MoO_x$—Pd/C catalyst and EDX mapping of Pd, Mo, and N. The two dotted areas show the heterogeneity of [$(NH_2)_2$bpy]$MoO_x$ species immobilized on both carbon support and Pd particles.

FIG. 49b and FIG. 49c show the magnified images.

DETAILED DESCRIPTION OF THE INVENTION

The details of one or more embodiments of the presently-disclosed subject matter are set forth in the accompanying description below. Other features, objects, and advantages of the presently-disclosed subject matter will be apparent from the specification, drawings, and claims.

The present invention pertains to heterogeneous catalysts for the chemical reduction of impurities in a fluid. In some embodiments, the fluid can be water, concentrated brine, or synthetic Chlor-Alkali electrolysis solution. In some embodiments, the impurities in the fluid that are removed can comprise halogen oxyanions, such as $ClO_4^-$ and $ClO_3^-$. In some embodiments, the impurities in the fluid that are removed can comprise halogen oxyanions, such as $ClO_4^-$, and $ClO_3^-$.

Heterogeneous Catalyst

In some embodiments, a heterogeneous catalyst can be described for removing impurities from water. For some catalysts, the heterogenous catalysts can comprise a plurality of metals, such as a bimetallic catalyst. For some embodiments, the heterogeneous catalyst can comprise a transition metal, a Group VIII (Group 8, Group 9, and Group 10) of the Periodic Table of the Elements metal, and a support, where the transition metal and the Group VIII metal are in physical communication with the support either directly or indirectly through each other. For some embodiments, the catalyst can comprise a transition metal in the form of a complex with one or more ligands, a Group VIII (Group 8, Group 9, and Group 10) of the Periodic Table of the Elements metal, and a support, where the transition metal complex and the Group VIII metal are in physical communication with the support either directly or indirectly through each other.

Figures 1A, 1B, 1C:
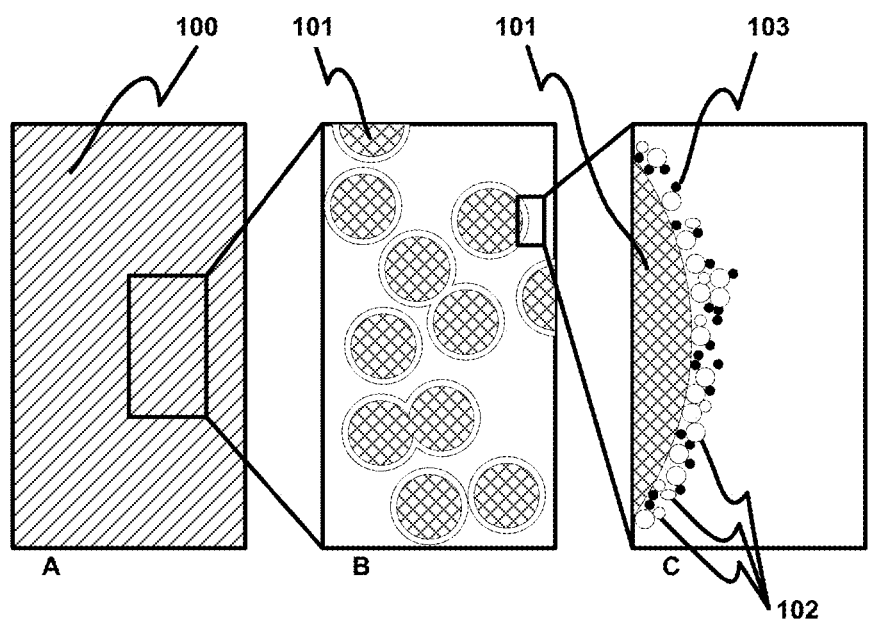
FIGS. 1A-1C is a graphical representation of one possible catalyst embodiment, (FIG. 1A) showing the catalyst, (FIG. 1B) zoomed in to show the support detail, (FIG. 1C) zoomed further in to show the transition metal and Group VIII metal detail.

A non-limiting example of a catalyst embodiment is shown in FIG. 1. The catalyst, 100, as shown comprises of supports, 101, a transition metal or a transition metal complex, 102, and a Group VIII metal, 103. In some embodiments, the transition metal can be an oxygen-atom transfer (OAT) transition metal. While not wanting to be limited by theory, the addition of transition metal or metal complex is thought to increase the catalytic hydrogenation activity of the Group VIII metals on the support, thus improving the performance of the catalyst irrespective of the support material. In some embodiments, the impurities removed can comprise halogen oxyanions. In some embodiments, the halogen oxyanions can comprise $ClO_3^-$. In some embodiments, the halogen oxyanions can comprise $ClO_4^-$. In some embodiments, the catalyst can be used in an environment where the fluid is acidic, or a pH of less than 7. In some embodiment, the catalyst can be used in an environment where the pH is in a range from a pH of about 1 to a pH of about 6, such as a pH of about 3. In some embodiments, the catalyst can be exposed to a reducing atmosphere.

Support

In some catalysts, the support accommodates the transition metal oxides and the Group VIII metal. In some catalysts, the support accommodates the transition metal complex and the Group VIII metal. The support serves as a substrate or carrier for catalyst immobilization. For some catalysts, the support can comprise oxides of metals or non-oxide support materials. For some catalysts, the support can comprise molecular sieves. For some supports, the oxides of metals can comprise oxides of metals selected from the group consisting of silicon, aluminum, magnesium, titanium, cerium, zirconium, yttrium oxides, zeolites, and mixtures thereof. In some supports, the non-oxide support materials can comprise carbon (including activated carbon, charcoal, biochars, graphene, graphite, single-wall carbon nanotubes, multi-wall carbon nanotubes, and nanofibers), carbon nitride, silicon carbide. In some embodiments, the support can comprise activated carbon.

In some embodiments, the support can be in various physical forms, particles (cylinders, spheres, dots), sheets, cylinders, and various other geometrical shapes known in the art for filter media. In some configurations, the particles can comprise a powder where the diameter of the particles ranges from about 20 microns to about 500 microns, or about 38 microns to about 200 microns. The diameter measured from determining a diameter of a representative sphere having the same volume. Such embodiments may be used in batch reactors or membrane reactors. In some embodiments, the particles can comprise granular spheres or pellets (e.g., rectangles, squares, or cylinders). In some embodiments, the spheres or pellets can range from micron-sized to centimeter-sized, or millimeter-sized, where the size is determined by the largest dimension. Some applications can include column or packed-bed reactors.

In some catalysts, the physical communication between the transition metal or complex thereof (e.g., OAT metal-nitrogen donor ligand complex), the Group VIII metal, and the support can be such that the transition metal or complex thereof, and Group VIII metal are immobilized on the support. In some embodiments, the transition metal or complex thereof can be in physical communication directly with the support. In some embodiments, the transition metal or complex thereof can be in indirect physical communication with the support, such as in direct physical communication with a Group VIII metal that is in turn in physical communication with the support or in direct physical communication with another transition metal or complex thereof that is in turn in direct physical communication with the support. For some catalysts, the physical communication of transition metal or complex thereof can be a combination of direct physical communication with the support and indirect physical communication with the support. In some embodiments, the Group VIII metal can be in physical communication directly with the support. In some embodiments, the Group VIII metal can be in indirect physical communication with the support, such as in direct physical communication with a transition metal or complex thereof that is in turn in physical communication with the support or in direct physical communication with another Group VIII metal that is in turn in direct physical communication with the support. For some catalysts, the physical communication of the Group VIII metal can be a combination of direct physical communication with the support and indirect physical communication with the support. Immobilization is such that the transition metal or complex thereof, and Group VIII metal adhere to the support and are not readily carried away when the support is suspended in water or by washing off the support with water. The physical communication between the moieties can be done by at least one of ionic bonding, covalent bonding, hydrogen bonding, metallic bonding, van der Waals' forces, electrostatic interaction, or pi-pi interactions. In some embodiments, the physical communication can be done via ionic bonding, electrostatic interaction, van der Waal's forces or pi-pi interaction.

Oxygen-Atom Transfer Transition Metal

In some embodiments, the OAT transition metal can comprise a Group VA (Group 5) or Group VIA (Group 6) of the Periodic Table of the Elements metal, such as vanadium, tungsten, molybdenum, or oxides thereof. In some embodiments, the OAT transition metal can comprise tungsten oxide. In some embodiments, the OAT transition metal can comprise vanadium oxide. In some embodiments, the OAT transition metal can comprise molybdenum oxide. While not wanting to be limited by theory, the addition of transition metal is thought to promote oxygen-atom transfer reactions. In certain embodiments, the transition metal oxide or oxometallate precursor has a metal to oxygen (e.g., oxo ligand) ratio range from about 1 to 4 to about 1 to 2. In certain embodiments, the transition metal oxide or oxometallate precursor may have metal to oxygen ratio of about 1 to 2. In certain embodiments, the transition metal oxide or oxometallate precursor may have metal to oxygen ratio of about 1 to 3. In certain embodiments, the transition metal oxide or oxometallate precursor may have metal to oxygen ratio of about 1 to 4 (e.g., $Na_2MoO_4$). In certain embodiments, the transition metal oxide or oxometallate precursor has a metal to oxygen ratio of about 3 to 10. In certain embodiments, the transition metal oxide or oxometallate precursor has a metal to oxygen ratio of about 7 to 24.

For some catalyst embodiments, the total amount of loading, as measured by the weight of the OAT transition metal as compared to the weight of the support, can range from about 0.01 wt. % to about 20 wt. % (e.g., 0.01 wt. %, 0.02 wt. %, 0.05 wt. %, 0.1 wt. %, 0.2 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 15 wt. %, or 20 wt. %) of the support. In certain embodiments, the total amount of loading of OAT transition metal on the support can be from about 0.1 wt. % to about 15 wt. %, about 1 wt. % to about 15 wt. %, about 1 wt. % to about 10 wt. % or about 2 wt. % to about 5 wt. %, such as about 2 wt. %, about 3 wt. %, about 4 wt. %, about 5 wt. %, about 6 wt. %, about 7 wt. %, about 8 wt. %, or about 10 wt. %. For some catalysts, the weight of the OAT transition metal as compared to the weight of the support can be about 5 wt. %.

Oxygen-Atom Transfer Transition Metal and Ligand Complex

Some heterogenous catalysts described herein further comprise a ligand (e.g., nitrogen donor ligand). For example, some catalysts comprise a mixture of an OAT transition metal and a ligand, where the ligand and the OAT transition metal form a complex. In some embodiments, the OAT transition metal can comprise a Group VA (Group 5) or Group VIA (Group 6) of the Periodic Table of the Elements metal, such as vanadium, tungsten, molybdenum, or oxides thereof. In some embodiments, the OAT transition metal can comprise tungsten. In some embodiments, the OAT transition metal can comprise vanadium. In some embodiments, the OAT transition metal can comprise molybdenum. While not wanting to be limited by theory, the addition of metal complexes is thought to promote oxygen-atom transfer reactions.

For some embodiments, the ligand can include a nitrogen-donor ligand. In some catalysts the ligand can comprise a monodentate ligand, a bidentate ligand, or a tridentate ligand. The nature of the nitrogen donor ligand in the catalyst is not critical, provided the catalyst has the useful properties described herein. In certain embodiments, the ligand can include one or more nitrogen-donor ligand(s).

The nitrogen donor ligand is a nitrogen containing organic compound. In certain embodiments, the nitrogen donor ligand is a compound having one or more heteroaryl group that comprise one or more nitrogen atom on the ring. In certain embodiments, the nitrogen donor ligand(s) is selected from ligands in Table 9. In certain embodiments, the nitrogen donor ligand(s) is selected from heteroaryl ligands (Examples 28-51) in Table 9. In certain embodiments, the nitrogen donor ligand(s) is selected from the group consisting of 4,4'-diamino-2,2'-bipyridine: 4,7-dimethyl-1,10-phenanthroline; and 2,2'-bipyrimidine.

For some catalysts, a monodentate, nitrogen-donor ligand can comprise a monodentate-capable compound of the following formulae:

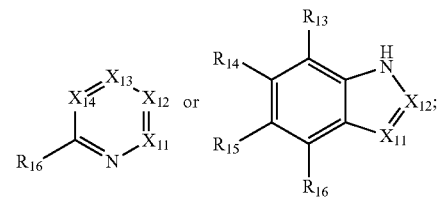

where:

$X_{11}$ can be C—$R_{11}$ or N, $X_{12}$ can be C—$R_{12}$ or N, $X_{13}$ can be C—$R_{13}$ or N, $X_{14}$ can be C—$R_{14}$ or N; and $R_{11}$ thru $R_{16}$ can be independently H, hydroxy, alkyl, alkenyl, alkynyl, alkoxy, halogen, amino, or cyano.

In some monodentate ligands, $R_{11}$ thru $R_{16}$ can be independently H, hydroxy, chloro, $C_{1-3}$ alkyl, $C_{1-3}$ alkoxy, or amino.

In some embodiments, the nitrogen-donor ligand can comprise a compound selected from the group consisting of the following formulae:

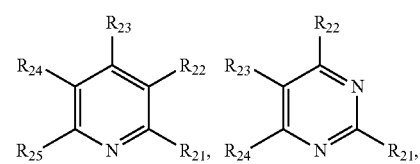

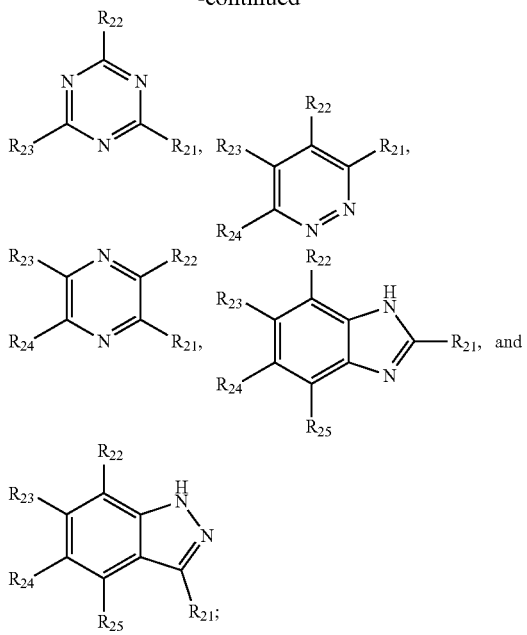

where $R_{21}$ thru $R_{25}$ can be independently H, hydroxy, alkyl, alkenyl, alkynyl, alkoxy, halogen, amino, or cyano. In some embodiments, $R_{21}$ thru $R_{25}$ can be independently H, hydroxy, chloro, $C_{1-3}$ alkyl, $C_{1-3}$ alkoxy, or amino. In some embodiments, $R_{21}$ thru $R_{25}$ can be independently H, hydroxy, chloro, methyl, methoxy, or amino.

For some catalysts, a bidentate, nitrogen-donor ligand can comprise a bidentate-capable compound of the following formulae:

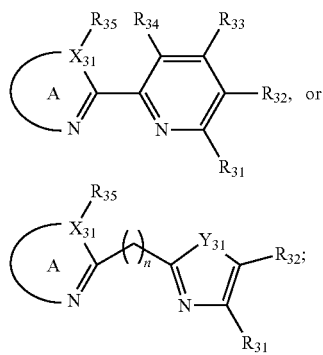

where:

A can be an optionally substituted heteroaryl selected from the group consisting of 2-pyridinyl, 2-pyrimidinyl, 2-benzimidazolyl, 4,5-dihydrooxazolyl, 2-oxazolyl, and 2-imidazolyl, where $X_{31}$ can be either C, O, S or N depending on the heteroaryl, where the hydrogen positions in the heteroaryl can be independently H, hydroxy, alkyl, alkenyl, alkynyl, alkoxy, halogen, amino, or cyano;

$Y_{31}$ can be either C, O, S or N, where the hydrogen positions in the heteroaryl that contains $Y_{31}$ can be independently H, hydroxy, alkyl, alkenyl, alkynyl, alkoxy, halogen, amino, or cyano:

$R_{31}$ thru $R_{33}$ can be independently H, hydroxy, alkyl, alkenyl, alkynyl, alkoxy, halogen, amino, or cyano; and $R_{34}$ and $R_{35}$ can be independently H, hydroxy, alkyl, alkenyl, alkynyl, alkoxy, alkenyloxy, halogen, amino, cyano, or together with the carbon which they are linked, form an alkyl or alkenyl of 1 to 2 carbon atoms where hydrogen in the link can be independently optionally substituted with H, hydroxy, alkyl, alkenyl, alkynyl, alkoxy, alkenyloxy, halogen, amino, cyano, or O or S for divalent positions, or, when 2 carbon atoms, both carbon positions can be optionally substituted with an additional linked alkyl or alkenyl to form an optionally substituted 4-6 carbon heteroaryl from 1 to 2 heteroatoms, where the heteroatom can be N, and where the hydrogen positions in the heteroaryl can be independently H, hydroxy, alkyl, alkenyl, alkynyl, alkoxy, halogen, amino, or cyano.

In some bidentate ligands, the hydrogen positions of the optionally substituted heteroaryl A can be independently H, hydroxy, chloro, $C_{1-3}$ alkyl, $C_{1-3}$ alkoxy, or amino. For some embodiments, $R_{31}$ thru $R_{33}$ can be independently H, hydroxy, chloro, $C_{1-3}$ alkyl, $C_{1-3}$ alkoxy, or amino. With some embodiments, $R_{34}$ thru $R_{35}$ can be independently H, hydroxy, chloro, $C_{1-3}$ alkyl, $C_{1-3}$ alkoxy, or amino. In some embodiments, for the optionally substituted 4-6 carbon heteroaryl from 1 to 2 heteroatoms, where the heteroatom can be N, the hydrogen positions in the heteroaryl can be independently H, hydroxy, chloro, $C_{1-3}$ alkyl, $C_{1-3}$ alkoxy, or amino.

In some embodiments, the nitrogen-donor ligand can comprise a compound selected from the group consisting of the following formulae:

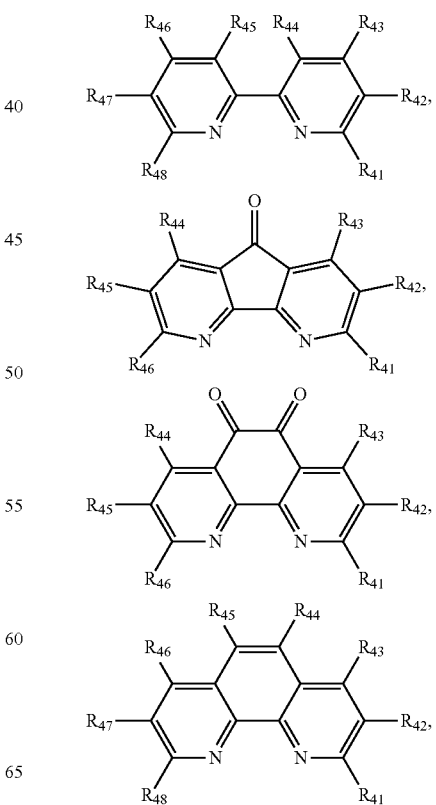

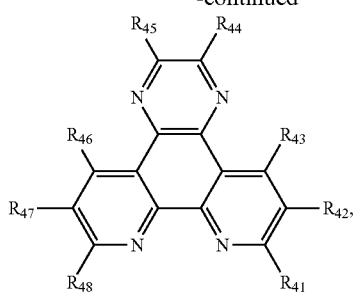

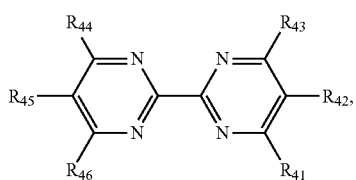

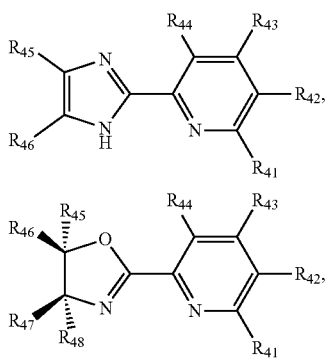

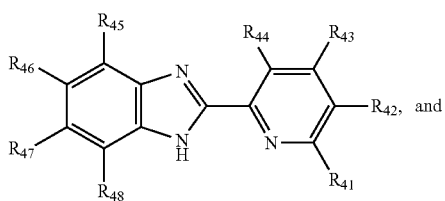

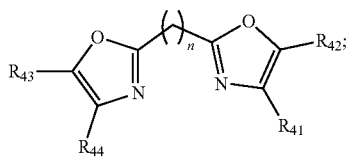

where $R_{41}$ thru $R_{48}$ can be independently H, hydroxy, alkyl, alkenyl, alkynyl, alkoxy, halogen, amino, or cyano. In some embodiments, $R_{41}$ thru $R_{48}$ can be independently H, hydroxy, chloro, $C_{1-3}$ alkyl, $C_{1-3}$ alkoxy, or amino. In some embodiments, $R_{41}$ thru $R_{48}$ can be independently H, hydroxy, chloro, methyl, methoxy, or amino.

In some embodiments, the ligand can comprise 4,4'-diamino-2,2'-bipyridine, or 4,4'-bis(dimethylamino)-2,2'-bipyridine. In some embodiments, the ligand can comprise 4,4'-diamino-2,2'-bipyridine.

In some embodiments, the nitrogen-donor ligand is a compound selected from the group consisting of the following formulae:

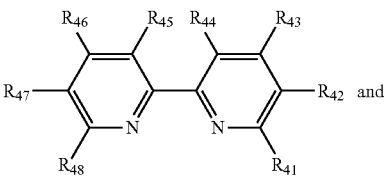

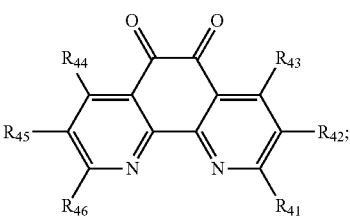

where $R_{41}$ thru $R_{48}$ can be independently H, hydroxy, alkyl, alkenyl, alkynyl, alkoxy, halogen, amino, or cyano. In some embodiments, $R_{41}$ thru $R_{48}$ can be independently H, hydroxy, chloro, $C_{1-3}$ alkyl, $C_{1-3}$ alkoxy, or amino. In some embodiments, $R_{41}$ thru $R_{48}$ can be independently H, hydroxy, chloro, methyl, methoxy, or amino. In some embodiments, $R_{41}$ thru $R_{48}$ can be independently H, hydroxy, $C_{1-3}$ alkyl, $C_{1-3}$ alkoxy, or amino, where amino is optionally substituted with one or more alkyl (e.g., $C_{1-3}$ alkyl).

In some embodiments, the nitrogen-donor ligand compound is selected form the group consisting of:

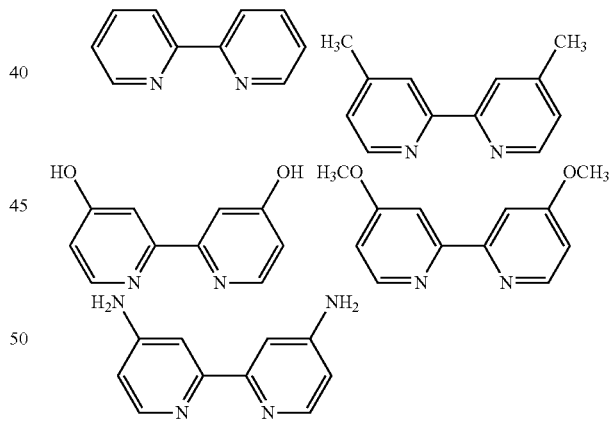

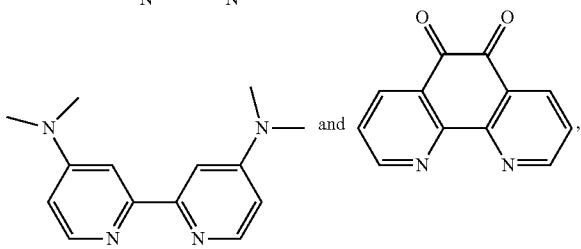

or a salt thereof.

In some embodiments, the nitrogen-donor ligand is a bipyridine compound having the following formula:

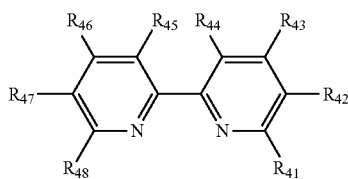

where $R_{41}$ thru $R_{48}$ can be independently H, hydroxy, alkyl, alkenyl, alkynyl, alkoxy halogen, amino, or cyano. In some embodiments, $R_{41}$ thru $R_{48}$ can be independently H, hydroxy, chloro, $C_{1-3}$ alkyl, $C_{1-3}$ alkoxy, or amino. In some embodiments, $R_{41}$ thru $R_{48}$ can be independently H, hydroxy, chloro, methyl, methoxy, or amino. In some embodiments. $R_{43}$ and $R_{46}$ of the bipyridine compound comprise one or more electron donating group(s). In some embodiments, $R_{43}$ and $R_{46}$ of the bipyridine compound can be independently H, hydroxy, $C_{1-3}$ alkyl, $C_{1-3}$ alkoxy, or amino, where amino is optionally substituted with one or more alkyl (e.g., $C_{1-3}$ alkyl). In some embodiments. $R_{41}$ and $R_{48}$ of the bipyridine compound are each H.

In some embodiments, the nitrogen-donor ligand compound is selected form the group consisting of:

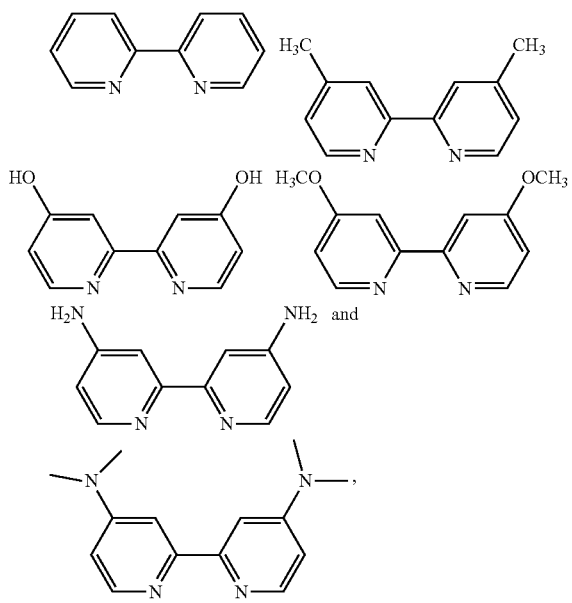

or a salt thereof.

For some catalysts, a tridentate, nitrogen-donor ligand can comprise a tridentate-capable compound of the following formulae:

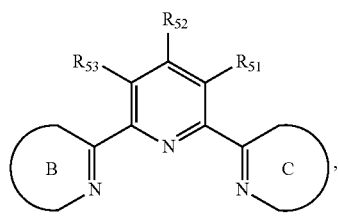

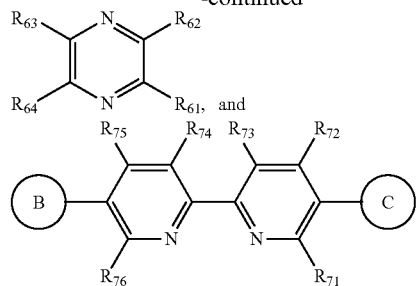

where:

B and C can be independently selected from optionally substituted heteroaryl selected from the group consisting of 2-pyridinyl, 2-pyrimidinyl, 2-benzimidazolyl, 4,5-dihydrooxazolyl, 2-oxazolyl, and 2-imidazolyl, where the hydrogen positions in the heteroaryl can be independently H, hydroxy, alkyl, alkenyl, alkynyl, alkoxy, halogen, amino, or cyano;

$R_{51}$ thru $R_{53}$ can be independently H, hydroxy, alkyl, alkenyl, alkynyl, alkoxy, halogen, amino, or cyano;

$R_{61}$ thru $R_{64}$ can be independently H, hydroxy, alkyl, alkenyl, alkynyl, alkoxy, halogen, amino, cyano, or an optionally substituted heteroaryl, where the heteroaryl can be selected from the group consisting of 2-pyridinyl, 2-pyrimidinyl, 2-benzimidazolyl, 4,5-dihydrooxazolyl, 2-oxazolyl, and 2-imidazolyl, where the hydrogen positions in the heteroaryl can be independently H, hydroxy, alkyl, alkenyl, alkynyl, alkoxy, halogen, amino, or cyano; and $R_{71}$ thru $R_{76}$ can be independently H, hydroxy, alkyl, alkenyl, alkynyl, alkoxy, halogen, amino, or cyano.

For some tridentate ligands, the hydrogen positions of the optionally substituted heteroaryls of B and C can be independently H, hydroxy, chloro, $C_{1-3}$ alkyl, $C_{1-3}$ alkoxy, or amino. In some embodiments, $R_{51}$ thru $R_{53}$ can be independently H, hydroxy, chloro. $C_{1-3}$ alkyl, $C_{1-3}$ alkoxy, or amino. In some embodiments, $R_{61}$ thru $R_{64}$ can be independently H, hydroxy, chloro, $C_{1-3}$ alkyl, $C_{1-3}$ alkoxy, or amino. In some ligands, $R_{71}$ thru $R_{76}$ can be independently H, hydroxy, chloro, $C_{1-3}$ alkyl, $C_{1-3}$ alkoxy, or amino.

In some embodiments, the nitrogen-donor ligand can comprise a compound selected from the group consisting of the following formulae:

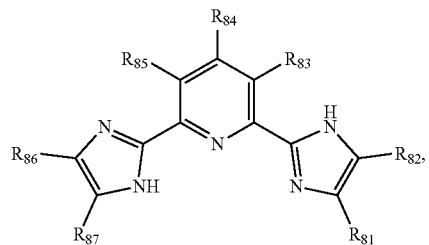

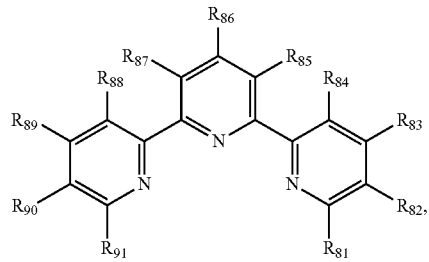

-continued

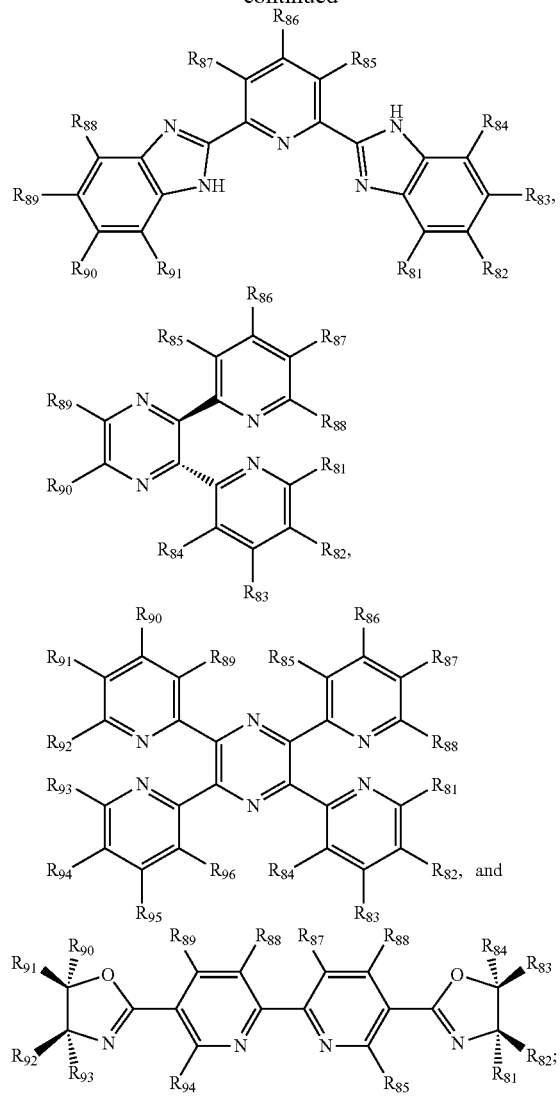

where $R_{81}$ thru $R_{96}$ can be independently H, hydroxy, alkyl, alkenyl, alkynyl, alkoxy, halogen, amino, or cyano. For some ligands, $R_{81}$ thru $R_{96}$ can be independently H, hydroxy, chloro, $C_{1-3}$ alkyl, $C_{1-3}$ alkoxy, or amino. In some ligands. $R_{81}$ thru $R_{96}$ can be independently H, hydroxy, chloro, methyl, methoxy, or amino.

In some catalysts, the molar ratio of the OAT transition metal to the ligand can vary from about 10:1, about 5:1, about 4:1 about 2:1, about 1:1, about 1:2, about 1:5, to about 1:10, or any combination thereof, such as about 2:1, about 1:1, about 1:2, or about 1:4. For some catalysts, the molar ratio of OAT transition metal to the ligand can be about 1:1.

For some catalyst embodiments, the total amount of loading, as measured by the weight of the OAT transition metal as compared to the weight of the support, can range from about 0.01 wt. % to about 20 wt. %, about 0.1 wt. % to about 15 wt. %, or about 1 wt. % to about 10 wt. % or about 5 wt. % to about 15 wt. %, or about 5 wt. % to about 10 wt. %, or about 2 wt. % to about 5 wt. %, such as about 2 wt. %, about 3 wt. %, about 4 wt. %, about 5 wt. %, about 6 wt. %, about 7 wt. %, about 8 wt. %, or about 10 wt. %. For some catalysts, the weight of the OAT transition metal as compared to the weight of the support can be about 5 wt. %. For some catalysts, the weight of the OAT transition metal as compared to the weight of the support can be at least about 2 wt. %, 3 wt. %, 4 wt. %, or 5 wt. %.

In certain embodiments, the nitrogen donor ligand compound is selected from the group consisting of

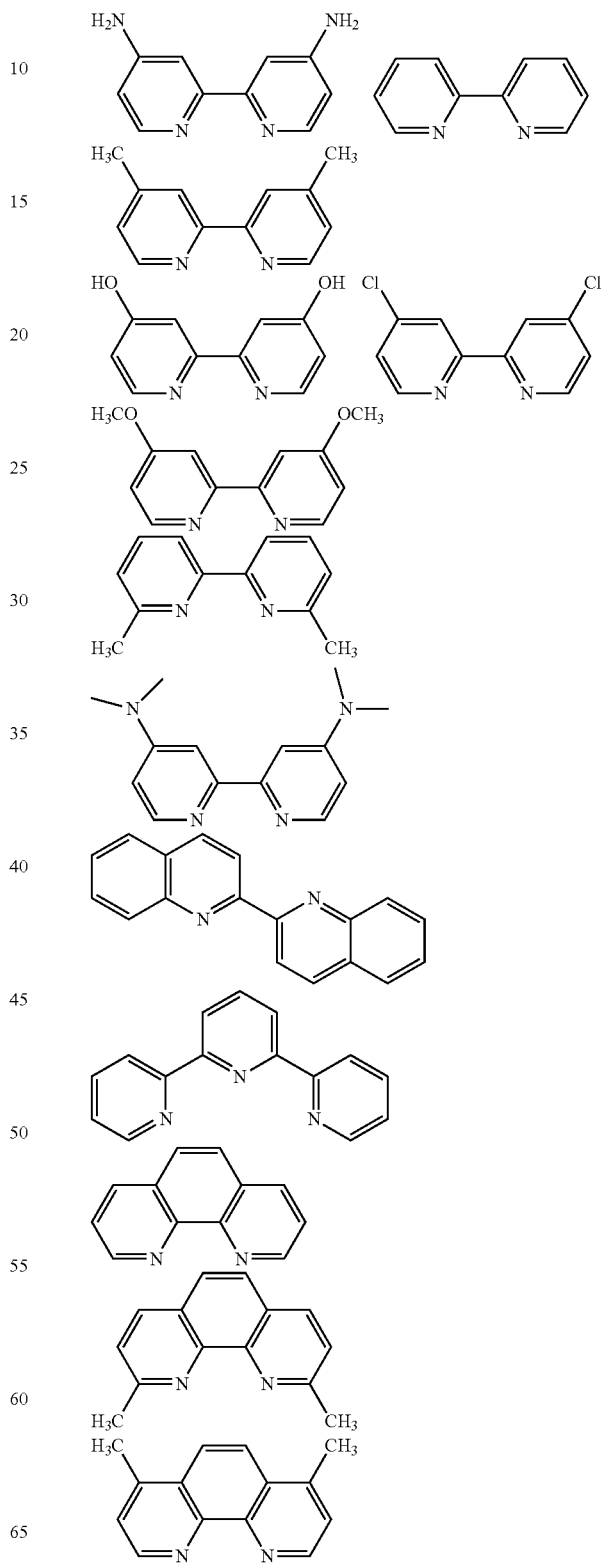

or a salt thereof.

Group VIII Metal

In some embodiments, the catalyst comprises a metal selected from Group VII (Group 8 Group 9, and Group 10) of the Periodic Table of the Elements. The Group VIII metal can be used for hydrogenation. In some embodiments, the Group VIII metal can comprise zero-valence iron, ruthenium, osmium, cobalt, rhodium, iridium, nickel, palladium or platinum. In some embodiments, the Group VIII metal can comprise zero valence ruthenium, palladium, platinum, rhodium, or iridium. In some embodiments, the Group VIII metal can comprise palladium.

In some catalysts, the Group VIII metal can comprise particles. In some embodiments, the Group VIII metal can comprise nanoparticles. In some embodiments, the average particle size of the Group VIII metal nanoparticles can vary from about 0.25-50 nm, about 0.5-30 nm, about 1-20 nm, about 1-15 nm, or any combination thereof. Some catalysts have the Group VIII metal in physical communication with at least one of the transition metal complexes or the support.

In some embodiments, the molar ratio between the Group VIII metal and OAT transition metal can be from about 100:1, about 50:1, about 25:1, about 10:1, about 5:1, about 9:4, about 2:1, about 3:2, about 1:1, about 1:2, about 1:5, to about 1:10, about 1:25, about 1:50, about 1:100, or any combination thereof, such as about 2.25:1, about 1.5:1, about 1.12:1, about 0.75:1, about 0.64:1, about 0.56:1, about 0.45:1. In some catalysts, the molar ratio can be about 1:1, or about a 0.90:1 molar ratio of the Group VII metal to OAT transition metal.

Heterogenous Catalyst Kit

Figure 18:
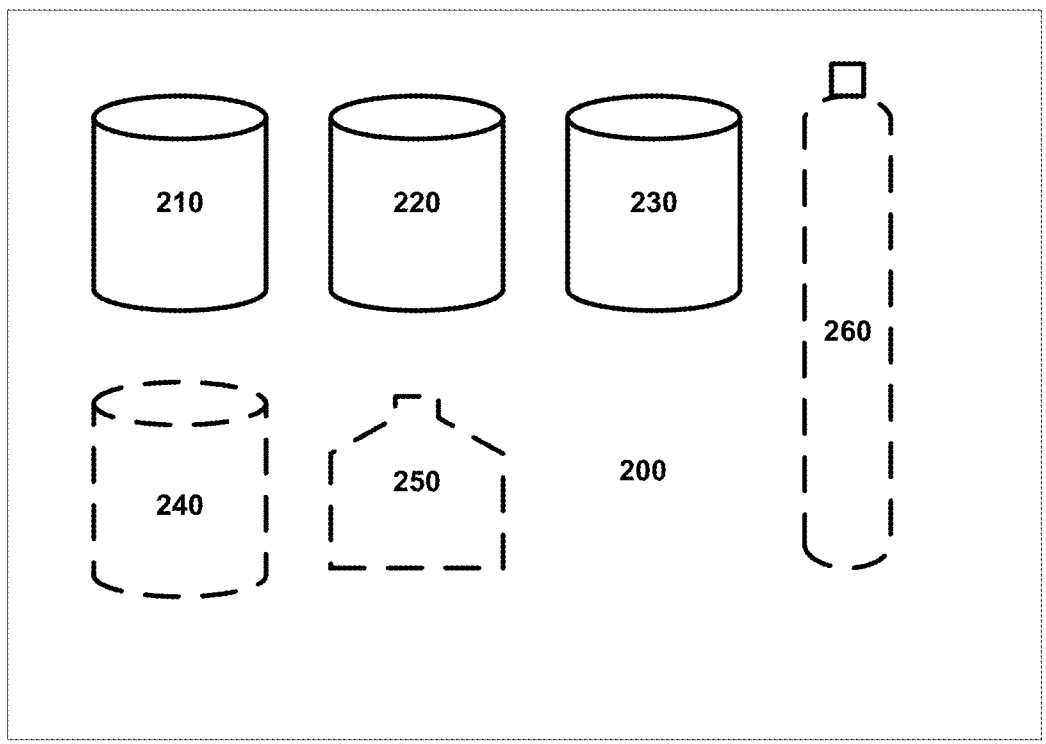
FIG. 18 is a depiction of an example kit embodiment for creating a heterogeneous catalyst. Such a kit may be used to create a catalyst remotely at a water treatment plant.

Some embodiments describe a kit that can be assembled onsite to create a catalyst. An example embodiment is shown in FIG. 18. In some embodiments, the kit, 200, can comprise the aforedescribed OAT transition metal, 210, the aforedescribed ligand, 220, the aforedescribed Group VIII metal, 230, and the aforedescribed support, 240. In some kit embodiments, the support may be provided in combination with the Group VIII metal. Some embodiments, the components can be in solid form to be individually activated in purified water. In some embodiments, the Group VIII metal can be combined with the support, such as Pd/C. In some embodiments, the components can be in aqueous solution form. In some embodiments, the solutions can be pre-adjusted to an activation pH that can be a pH of about 1 to about 6, a pH of about 2 to about 5.6, a pH of about 2 to about 4.75, or any combination thereof, such as a pH of 3.

Some kit embodiments can additionally comprise an acid, 250, to adjust the pH and activate the chemical reaction and kit, where the components are stored in a pH neutral condition. In some embodiments, the acid can comprise hydrochloric acid or sulfuric acid. In some embodiments, the assembled kit when exposed to a reducing atmosphere, such as hydrogen gas, can reduce halogen oxyanions, such as $ClO_4^-$ or $ClO_3^-$. In some embodiments, the kit can additionally comprise a vessel containing a reducing atmosphere source. 260. In some embodiments, the vessel can comprise a hydrogen gas source. In some embodiments, vessel can comprise a source for creating hydrogen gas when combined with a catalyst, such as a chemical hydride (e.g., formic acid). In some embodiments, the catalyst supplied in the kit can also decompose the chemical hydride. In some embodiments, the kit can further comprise a separate catalyst for decomposing the chemical hydride. Separate catalysts for decomposing the chemical hydride can comprise those known in the art for decomposing formic acid.

Some embodiments describe a kit for making a catalyst, comprising an OAT transition metal solution, a ligand solution, a Group VIII metal with support solution, where the components are added to form the catalyst. In some kits, the OAT transition metal solution can comprise molybdenum. In some kit embodiments, the Group VIII metal with support solution can comprise palladium on carbon. For some kits, the ligand solution can comprise 4,4'-diamino-2,2-bipyridine or 4,4'-bis(dimethylamino)-2,2'-bipyridine.

Heterogenous Catalyst Reactor

Figure 2:
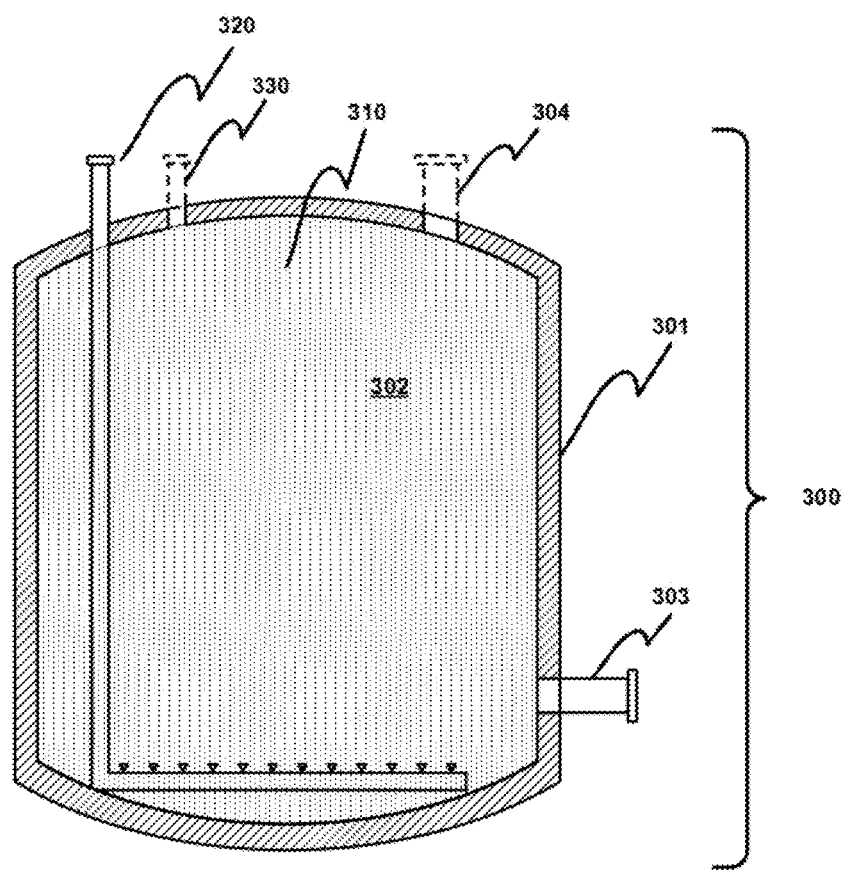
FIG. 2 is an example embodiment of a reactor for removing impurities from a fluid. Such a reactor may be installed locally at a water treatment plant.

Some embodiments describe a reactor that can be used to remove contaminants from unprocessed fluid. An example embodiment is shown in FIG. 2. In some embodiments, the contaminant reduced can comprise halogen oxyanions, such as $ClO_4^-$ and/or $ClO_3^-$. In some embodiments, the reactor, 300, can comprise a container, 301, defining a reaction plenum. 302, with at least one orifice, 303, defining an inlet and an outlet, where the fluid to be processed enters through the inlet and exits through the outlet once the contaminants have dropped to a desired level. In some reactors, the inlet orifice can become the outlet with external pressure manipulation. In other reactors, there are a plurality of orifices, at least one for the inlet and at least one for the outlet, 304. In some reactors, the reaction plenum can enclose the aforedescribed heterogenous catalyst, 310.

In some reactors, the outlet orifice can additionally comprise a membrane, where the orifice is occluded by a membrane such that any fluid being transported through the orifice must pass through the membrane. In some embodiments, the membrane can comprise a microfiltration membrane, where the membrane allows the fluid to pass but retains the catalyst.

For some reactors, the catalyst loading can range from about 20 mg/L to about 2000 mg/L, about 50 mg/L to about 1500 mg/L, about 100 mg/L to about 1000 mg/L, about 150 mg/L to about 500 mg/L, or any combination thereof, such as about 200 mg/L.

For some reactor embodiments, the container can additionally comprise an additional orifice defining an inlet, 320, for controlling the internal atmosphere of the reactor plenum. In some reactors, the inlet can be used to supply a reducing gas into the reaction plenum to provide a source of hydrogen. Some reactors can additionally comprise an outlet, 330, for the venting of the internal atmosphere. In some reactors, the reducing gas can comprise hydrogen gas. In some embodiments, the hydrogen gas can be directly supplied. In some embodiments, the hydrogen gas can be the byproduct of a reaction of a chemical hydride that creates hydrogen gas, such as formic acid. In some reactors the reducing gas can be supplied at 1 atm, at about 25° C.

Method of Making a Heterogeneous Catalyst

Some embodiments describe a method of making a heterogeneous catalyst, where the method can comprise: combining a) an OAT transition metal, b) one or more of a Group VIII metal, and c) a support as a mixture (e.g., mixture of a), b), and c)) to create the heterogenous catalyst immobilized on the support.

In some methods, the OAT transition metal is obtainable from mono-, poly- or heteropoly-oxometallates as OAT transition metal oxide precursors. Thus, the OAT transition metal can be prepared from mono- poly- or heteropoly-oxometallates as OAT transition metal oxide precursors.

In some embodiments, the methods include: preparing an OAT transition metal, adding one or more of a Group VIII metal to create a mixture, adding a support, and immobilizing the heterogeneous catalyst. In some embodiments, the Group VIII metal and the support can be provided together (e.g., activated carbon matrix supplied with Pd/C) for combining with the OAT transition metal.

In some methods, the step of preparing an OAT transition metal can comprise obtaining an OAT transition metal oxide precursor. Mono-, poly- and heteropoly-oxometallates can be used as an OAT transition metal oxide precursor. Examples include but are not limited to: molybdates of lithium, sodium, potassium, or ammonium, polyoxomolybdates with different degrees of oxo-cluster aggregations, phosphomolybdic acid and its alkaline metal salts, silicomolybdic acid and its alkaline metal salts, tungstates of lithium, sodium, potassium, or ammonium, and polytungstates with different degrees of oxo-cluster aggregations, phosphotungstic acid, and its alkaline metal salts, and silicotungstic acid and its alkaline metal salts, vanadates of lithium, sodium, potassium, or ammonium, and polyvanadates with different degrees of oxo-cluster aggregations, and vanadyl sulfate. In some methods, the OAT transition metal oxide precursor is reduced to obtain a lower valent metal oxide. For example, a Mo oxide precursor is reduced to obtain a lower valent Mo oxide. Thus, in certain embodiments, the method further comprises reducing the OAT transition metal oxide precursor (e.g., a Mo oxide precursor) to a lower valent metal oxide (e.g., a lower valent Mo oxide).

In certain embodiments, the Mo oxide precursor comprises a $Mo^{VI}$ species (e.g., $Na_2MoO_4$). In certain embodiments, the heterogenous catalyst comprises a lower valent Mo oxide and a residue of the Mo oxide precursor. In certain embodiments, the heterogenous catalyst comprises one or more Mo species selected from the group consisting of $Mo^{II}$, $Mo^{III}$, $Mo^{IV}$, $Mo^{V}$, and $Mo^{VI}$. In certain embodiments, the heterogenous catalyst comprises a $Mo^{V}$ species. In certain embodiments, the heterogenous catalyst comprises a $Mo^{IV}$ species. In certain embodiments, the heterogenous catalyst comprises $Mo^{V}$ species and $Mo^{IV}$ species. In certain embodiments, the heterogenous catalyst comprises a Mom species. In certain embodiments, the heterogenous catalyst comprises a $Mo^{II}$ species. In certain embodiments, the heterogenous catalyst comprises $Mo^{II}$, $Mo^{III}$, $Mo^{IV}$, $Mo^{V}$, and $Mo^{VI}$. In certain embodiments, the heterogenous catalyst comprises $Mo^{II}$, $Mo^{III}$, $Mo^{IV}$ and $Mo^{V}$. In certain embodiments, the heterogenous catalyst comprises $Mo^{III}$, $Mo^{IV}$ and $Mo^{V}$. In certain embodiments, the heterogenous catalyst comprises $Mo^{II}$, $Mo^{IV}$ and $Mo^{V}$.

In certain embodiments, the average valence of the OAT transition metal (e.g., average valence of Mo species) in the heterogeneous catalyst has a range of about 3.5 to about 5.5 (e.g., 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, or 5.4). In certain embodiments, the average valence of the OAT transition metal (e.g., Mo) has a range of about 4 to about 5. In certain embodiments, the average valence of the OAT transition metal (e.g., Mo) has a range of about 4.1 to about 4.7. In certain embodiments, the average valence of the OAT transition metal (e.g., Mo) has a range of about 4.2 to about 4.6. In certain embodiments, the average valence of the OAT transition metal (e.g., Mo) has a range of about 4.3 to about 4.5. In certain embodiments, the average valence of the OAT transition metal (e.g., Mo) is about 4.3 or 4.4.

In some embodiments, the method further comprises combining a ligand (e.g., nitrogen donor ligand) with the OAT transition metal, Group VIII metal, and support as a mixture to create the heterogenous catalyst immobilized on the support. Accordingly, methods described herein may further comprise adding a ligand (e.g., nitrogen donor ligand).

Figure 19:
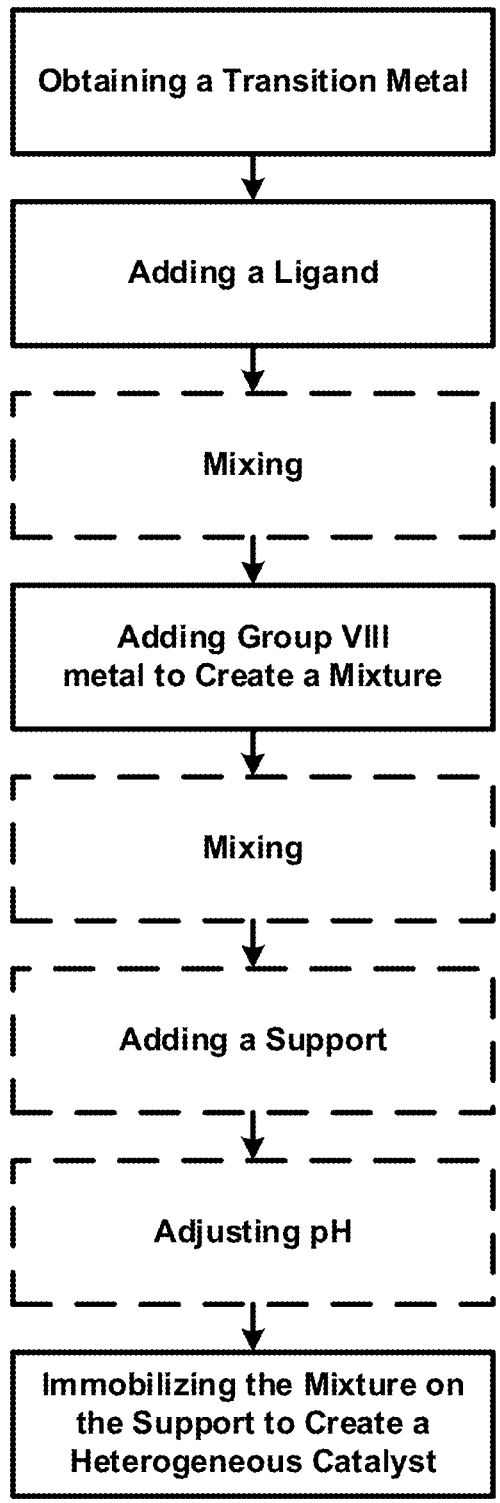
FIG. 19 is a process diagram depicting one possible embodiment of a method for making a heterogenous catalyst; the optional steps are shown as dashed boxes and vary depending on the specific process.

An exemplary method that further comprises adding a ligand to form a transition metal complex is shown in FIG. 19. In some embodiments, the method comprises: obtaining an OAT transition metal, adding a ligand, adding one or more of a Group VIII metal to create a mixture, adding a support, and immobilizing the heterogenous catalyst. In some embodiments, the method can additionally comprise adding a support. In some embodiments, the method further comprises mixing the OAT transition metal and the ligand before the addition of the Group VIII metal. In other methods, mixing is done after introduction of the Group VIII metal, as a single batch reaction. In some methods, the step of obtaining an OAT transition metal can comprise obtaining an OAT transition metal oxide precursor as described herein. While not wanting to be limited by theory, it is thought that the metal complexes can be formed in-situ by combining the OAT transition metal oxides with the organic ligands (e.g., nitrogen donor ligand).

In some methods, the step of adding a ligand can comprise adding one or more of the aforedescribed mono-dentate, bi-dentate, or tridentate ligands. In some embodiments, the step of adding a ligand can comprise adding 4,4'-diamino-2,2'-bipyridine, or 4,4'-bis(dimethylamino)-2,2'-bipyridine. In some methods, the step of adding a ligand can comprise adding 4,4'-diamino-2,2'-bipyridine.

For some methods, the steps of adding an OAT transition metal oxide precursor and adding a ligand can be such that the molar ratio of the OAT transition metal to the ligand can be from about 10:1, about 5:1, about 2.1, about 1:1, about 1:2, about 1:5, to about 1:10, or any combination thereof. For some methods, the molar ratio of OAT transition metal to the ligand can be about 1:1.

In some embodiments, adding one or more of a Group VIII metal to the OAT transition metal or complex (e.g., OAT transition metal-nitrogen donor ligand complex) can comprise adding zero-valence iron, ruthenium, osmium, cobalt, rhodium, iridium, nickel, palladium or platinum. In some embodiments, the Group VIII metal can comprise zero valence ruthenium, palladium, platinum, rhodium, or iridium. In some embodiments, adding one or more of a Group VIII metal can comprise adding palladium, such as palladium on carbon (Pd/C).

For some methods, adding one or more of a Group VIII metal can be done such that the molar ratio of the Group VIII metal to OAT transition metal can vary from about 100:1, about 50:1, about 25:1, about 10:1, about 5:1, about 2.1, about 1:1, about 1:2, about 1:5, to about 1:10, about 1:25, about 1:50, about 1:100, or any combination thereof. For some methods, the molar ratio of Group VIII metal to OAT transition metal can be about 1:1, or a molar ratio of 0.9.

In some embodiments, the step of adding the support to the mixture can be combined with the step of adding a Group VIII metal to the transition metal or complex to create a mixture, where the Group VIII metal and support are added in the same step. In other embodiments, the support and the Group VIII metal can be provided separately and would have distinct steps. In some methods, the support can be provided entirely with the Group VIII metal, so a separate support additive to the mixture may not be required if the desired ratios are achieved. In some method embodiments, adding a support can comprise adding a support comprising oxides of metals or non-oxide support materials. Some steps comprise adding molecular sieves. For some steps, the step of adding oxides of metals can comprise adding oxides of metals selected from the group consisting of silicon, aluminum, magnesium, titanium, cerium, zirconium, yttrium oxides, zeolites, or mixtures thereof. In some steps, the step of adding non-oxide support materials can comprise obtaining carbon (including activated carbon, charcoal, biochars, graphene, graphite, single-wall carbon nanotubes, multi-wall carbon nanotubes, and nanofibers), carbon nitride, silicon carbide. In some steps, activated carbon is added. In some embodiments, the support added can be in various physical forms, particles (cylinders, spheres, dots), sheets, cylinders, and various other geometrical shapes known in the art for filter media.

In some embodiments, adding the support or adding one or more of a Group VIII metal with the support can comprise adding enough support such that the total amount of support, as measured by the weight of the OAT transition metal as compared to the weight of the support, can range from about 0.01 wt. % to about 20 wt. %, about 0.1 wt. % to about 15 wt. %, or about 1 wt. % to about 10 wt. %, or about 5 wt. % to about 10 wt. %, or about 5 wt. % to about 15 wt. %, or about 2 wt. % to about 5 wt. %, such as about 5 wt. % of OAT transition metal to support.

Some methods can further comprise mixing the mixture. Mixing can be achieved by convention steps known in the art such as: agitation, stirring, sonication, and the like. In some mixing steps the mixture can be sonicated to homogenize the mixture. In some embodiments, the mixture can be mixed from about 1 second to about 5 minutes, about 2 seconds to about 2 minutes, about 5 seconds to about 1 minute, or any combination thereof, such as about 1 minute.

Some methods can additionally comprise the step of adjusting the pH of the mixture. In some embodiments, adjusting the pH can comprise adding acid. In some embodiments the acid can be hydrochloric acid or sulfuric acid. In some embodiments, the desired pH can be a pH that ranges from a pH of about 1 to about 6, a pH of about 2 to about 5.6, a pH of about 2 to about 4.75, or any combination thereof. In some embodiments, the desired pH can be about 3.

In some embodiments, the methods further comprise mixing the resulting reaction under a reducing atmosphere for immobilization on the support. In some embodiments, mixing under a reducing atmosphere can be done for a duration ranging from about 5 minutes to about 48 hours (e.g., 5, 6, 7, 8, 9, 10, 11, 12, 13, 14, 15, 16, 17, 18, 19, 20, or 25 minutes, or 0.5, 1, 2, 3, 4, 5, 10, 15, 20, 25, 30, 35, or 40 hours), about 6 minutes to 20 minutes, about 7 minutes to 18 minutes, about 8 minutes to 16 minutes, about 9 minutes to 15 minutes, about 10 minutes to 13 minutes, about 11 minutes to 24 hours, about 12 minutes to 2 hours, about 15 minutes to about 1 hour, about 15 minutes to about 2 hours, about 20 minutes to about 45 minutes, or about 25 minutes to about 35 minutes. In some embodiments, mixing under a reducing atmosphere can be done for a duration ranging from 10 minutes to about 48 hours, about 1 minutes to 24 hours, about 12 minutes to 2 hours, about 15 minutes to about 1 hour, about 20 minutes to about 45 minutes, about 25 minutes to about 35 minutes, or any combination thereof, such as about 30 minutes. In some embodiments, mixing can comprise agitating, bubbling, stirring the mixture by means known in the art. In some embodiments, mixing can be accomplished by stirring the mixture at a rate of about 200 rpm to about 5000 rpm, about 500 rpm to about 2000 rpm, or about 1000 rpm. In some embodiments, the reducing atmosphere can comprise hydrogen gas. In some embodiments, the hydrogen gas can be directly supplied. In some embodiments, the hydrogen gas can be the byproduct of a reaction of a chemical hydride that creates hydrogen gas, such as formic acid. In some steps, the hydrogen gas can be at a pressure of 1 atm. In some embodiments, the resulting product can be used in situ or it may be filtered and purified. In some embodiments, the result is a heterogeneous catalyst.

Method of Treating Contaminated Water/Brine

Figure 20:
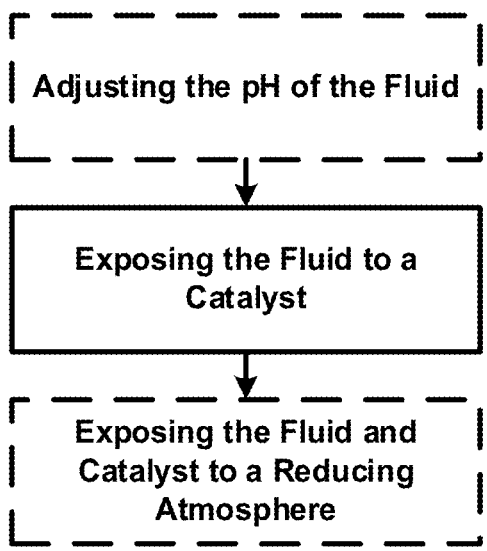
FIG. 20 is a process diagram depicting one possible embodiment for using a heterogenous catalyst described herein to remove impurities from a fluid, the optional steps are shown as dashed boxes and are present depending on the configuration of catalyst.

Some method embodiments describe the treatment of unprocessed fluid using the aforedescribed heterogeneous catalyst to remove chemical impurities. An example method is depicted in FIG. 20. For some treatment methods, the impurity can comprise a halogen oxyanion. In some embodiments, the halogen oxyanion can comprise $ClO_3^-$. In some treatments, the fluid being treated is a waste brine containing high concentrations of $ClO_3^-$ In some embodiments, the halogen oxyanion can comprise $ClO_4^-$. In some treatments, the fluid being treated is waste brine containing high concentrations of $ClO_4^-$. Some treatment methods comprise exposing the unprocessed fluid to the afore-described catalyst to create a processed fluid. In some methods, the product of treatment of waste brine containing high concentrations of $ClO_3^-$ is $Cl^-$. In some methods, the product of treatment of waste brine containing high concentrations of $ClO_4^-$, is $Cl^-$.

Some treatments further comprise adjusting the pH of the unprocessed fluid before exposure. In some pH adjustment steps, the resulting pH is between a pH of about 1 to about 6, a pH of about 2 to about 5.6, a pH of about 2 to about 4.75, or any combination thereof, such as a pH of about 3.

Some exposing steps further comprise exposing the unprocessed fluid and heterogeneous catalyst to a reducing atmosphere. In some exposing steps, the reducing atmosphere is hydrogen gas. In some steps, the hydrogen gas can be directly supplied. For some embodiments, the hydrogen gas can be the byproduct of a reaction of a chemical hydride that creates hydrogen gas, such as formic acid and hydrazine. In some exposing steps, the reducing atmosphere is 1 atm. In certain embodiments, the fluid is exposed to the heterogeneous catalyst at a temperature range of about 1° C. to about 100° C. (e.g., 5° C., 10° C., 15° C., 20° C., 25° C., 30° C., 35° C., 40° C., 45° C., 50° C., 55° C., 60° C., 75° C., 80° C., 85° C., 90° C., or 95° C.). In certain embodiments, the fluid is exposed to the heterogeneous catalyst at a temperature range of about 2° C. to about 50° C. In certain embodiments, the fluid is exposed to the heterogeneous catalyst at a temperature range of about 3° C. to about 40° C. In certain embodiments, the fluid is exposed to the heterogeneous catalyst at a temperature range of about 4° C. to about 30° C. In certain embodiments, the fluid is exposed to the heterogeneous catalyst at a temperature range of about 5° C. to about 25° C. In certain embodiments, the fluid is exposed at about 25° C., or room temperature.

In some embodiments, exposing can comprise passing the unprocessed solution through a plenum containing the catalyst such that the solution is exposed to the catalyst for a duration of at least about 2 minutes. In some embodiments, exposing can comprise passing the unprocessed solution through a plenum containing the catalyst such that the solution is exposed to the catalyst for a duration ranging from about 2 minutes to about 72 hours, about 3 minutes to about 48 hours, about 4 minutes to about 24 hours, 5 minutes to about 6 hours, about 10 minutes to about 4 hours, about 20 minutes to about 3 hours, about 30 minutes to about 2 hours, about 45 minutes to about 1 hour, or any combination thereof, such as about 30 minutes, 1 hour, 2 hours, 3 hours, or 4 hours. In some embodiments, the unprocessed solution is exposed to the catalyst until the concentration of impurities is below the target concentration. In some methods, the target concentration is below about 6 ppb, below about 2 ppb, or below about 1 ppb.

Accordingly, some treatment methods can be described as comprising: adjusting the pH of the fluid to a pH of about 1 to about 6, exposing the fluid to a catalyst as described herein and to a reducing atmosphere for about 5 minutes to about 6 hours, whereby the concentration of chemical impurities can be reduced. For some treatment methods, the pH can be adjusted to a pH of about 2 to about 5.6. In some method embodiments, the reducing atmosphere can be hydrogen gas. For some embodiments, the atmosphere can be at a pressure of about 1 atm, at 25° C. In some treatments, a chemical impurity removed can be $ClO_4^-$. For some treatments, the concentration of $ClO_4^-$ can be reduced below 6 ppb.

While not wanted to be limited by theory, it is asserted that when hydrogen gas is used as the electron donor, the bimetallic catalysts are capable of chemically transforming detrimental oxyanions into less detrimental halide anions through the oxygen atom transfer reaction at ambient temperature and pressure. The resulting conversion is environmentally friendly with water as the main by-product.

The aforedescribed catalyst, kit, reactor and associated methods are well suited for use in the removal of $ClO_4^-$ and/or other oxyanions from contaminated water. As a feature of the present invention, the catalytic reduction of $ClO_4^-$ can be directly used for industrial waste water treatment or it can be coupled with any existing physical removal processes wherein the chemical transformation of $ClO_4^-$ to $Cl^-$ is required. The catalysts can be used in treating contaminated water where the initial $ClO_4^-$ concentration is extremely high (100 mM or $10^4$ ppm). In addition, the catalysts show very high activity in reducing 1 mM $Cl_4^-$ (100 ppm) in 2 percent brine (0.4 M NaCl), indicating a potential application for IX resin regeneration. Moreover, the catalysts do not lose any activity upon air exposure, which is well suited for intermittent operation processes and promotes shipping, handling, and recycling operations. Most importantly, the active species in the new catalysts are oxidized species of earth-abundant transition metals, which significantly reduces the cost of catalyst and the need of precious metals for water and wastewater treatment applications.

The term "aromatic" refers to a cyclically conjugated molecular entity with a stability, due to delocalization, significantly greater than that of a hypothetical localized structure, such as the Kekulé structure.

Unless otherwise indicated, when a chemical structural feature such as aryl is referred to as being "optionally substituted," it is meant that the feature may have no substituents (i.e. be unsubstituted) or may have one or more substituents. A feature that is "substituted" has one or more substituents. The term "substituent" has the ordinary meaning known to one of ordinary skill in the art. In some embodiments, the substituent is a such as hydroxy, alkoxy, mercapto, alkyl, cycloalkyl, substituted cycloalkyl, heterocyclic, substituted heterocyclic, aryl, substituted aryl, heteroaryl, substituted heteroaryl, aryloxy, substituted aryloxy, halogen, cyano, nitro, amino, amido, aldehyde, acyl, oxyacyl, carboxyl, sulfonyl, sulfonamide, sulfuryl. In some embodiments, the substituent is a halogen, or has from 1-20 carbon atoms, from 1-10 carbon atoms, or has a molecular weight of less than about 500, about 300, or about 200. In some embodiments, the substituent has at least 1 carbon atom or at least 1 heteroatom and has about 0-10 carbon atoms and about 0-5 heteroatoms independently selected from: N, O, S, F, Cl, Br, I, and combinations thereof.

As used herein, the term "alkyl" refers to a moiety comprising carbon, hydrogen, and containing no double or triple bonds having between about 1 and about 20 carbon atoms. An alkyl can be linear, branched, cyclic or any combination thereof. Examples include methyl, ethyl, propyl, isopropyl, cyclopropyl, n-butyl, iso-butyl, tert-butyl, cyclo-butyl, pentyl isomers, cyclo-pentyl, and the like. An alkyl and be substituted or unsubstituted, where when substituted the hydrogen is replaced by a substituting group. For example, hydroxide may be substituted on the end of an alkyl to form a hydroxy-alkyl moiety. In certain embodiments of the invention, alkyl refers to $C_{1-3}$ alkyl.

The term "alkenyl" refers to straight-chained or branched moiety comprising carbon, hydrogen, and having at least one carbon-carbon double bond, and having between about 2 and about 12 carbon atoms. In certain embodiments of the invention, alkenyl refers to $C_{2-3}$ alkenyl.

The term "alkynyl" refers to a straight-chained or branched moiety comprising carbon, hydrogen, and having at least one carbon-carbon triple bond, and having between about 2 and 12 carbon atoms. In certain embodiments of the invention, alkenyl refers to $C_{2-3}$ alkynyl.

The term "amino" refers to a branched moiety comprising a nitrogen and two R groups, where the R groups can independently be hydrogen or optionally substituted. In some embodiments, the amino can comprise R groups that can independently be H, or alkyl, such as —N(Me)$_2$, —N(Me/Et), —N(Et)$_2$, etc.

The term "aryl" refers to aromatic groups having between about 5 and about 14 carbon atoms. An aryl can be a single aromatic ring system or can be multiple aromatic rings fused together into single system.

As used herein, the term "$C_{X-Y}$" or "$C_X-C_Y$" refers to a carbon chain having from X to Y carbon atoms. For example, $C_{1-10}$ alkyl includes fully-saturated hydrocarbon chains having 1, 2, 3, 4, 5, 6, 7, 8, 9, or 10 carbon atoms.

The term "heteroaryl" as used herein refers to a single aromatic ring that has at least one atom other than carbon in the ring, wherein the atom is selected from the group consisting of oxygen, nitrogen and sulfur. "heteroaryl" also includes multiple condensed ring systems that have at least one such aromatic ring which multiple condensed ring systems are further described below. Thus, "heteroaryl" includes single aromatic rings of from about 1 to 6 carbon atoms and about 1-4 heteroatoms selected from the group consisting of oxygen, nitrogen and sulfur. The sulfur and nitrogen atoms may also be present in an oxidized form provided the ring is aromatic. Exemplary heteroaryl ring systems include but are not limited to pyridyl, pyrimidinyl, oxazolyl or furyl. "Heteroaryl" also includes multiple condensed ring systems (e.g., ring systems comprising 2, 3 or 4 rings) wherein a heteroaryl group, as defined above, is condensed with one or more rings selected from cycloalkyl, aryl, heterocycle, and heteroaryl. It is to be understood that the point of attachment for a heteroaryl or heteroaryl multiple condensed ring system can be at any suitable atom of the heteroaryl or heteroaryl multiple condensed ring system including a carbon atom and a heteroatom (e.g., a nitrogen).

The term "alkoxy" refers to an alkyl groups attached to the remainder of the molecule via an oxygen atom ("oy"). In certain embodiments of the invention, alkoxy refers to $C_{1-3}$ alkoxy.

As used herein, the term "denticity" or "dentate" refers to the number of donor groups in a single ligand that bind to a central atom in a coordination complex. For example, a mono dentate ligand as a single donor group, a bi-dentate ligand has two donor groups, and a tridentate ligand has three donor groups.

The term "transition metal-donor ligand complex" or"transition metal complex" is a molecule with a central metal ion that is surrounded by one or more ligands. Ligands are ions or molecules that contain one or more pairs of electrons being shared with the central metal.

Embodiments

The following embodiments are specifically contemplated by this disclosure.

Embodiment 1. A heterogeneous catalyst for removing impurities from a fluid, the catalyst comprising: an oxygen atom transfer (OAT) transition metal, a Group VIII metal, and a support, where the transition metal and the Group VIII metal are in physical communication with the support either directly or indirectly through each other.

Embodiment 2. The catalyst of Embodiment 1, where the OAT transition metal is a Group VA or Group VIA metal.

Embodiment 3. The catalyst of Embodiment 1 or 2, where the OAT transition metal is vanadium, tungsten, molybdenum or oxides thereof.

Embodiment 4. The catalyst of Embodiment 1, 2, or 3, where the OAT transition metal is molybdenum.

Embodiment 5. The catalyst of Embodiment 1, 2, 3, or 4, where the molar ratio between the Group VIII metal and OAT transition metal is from 100:1 to 1:100.

Embodiment 6. The catalyst of Embodiment 1, 2, 3, 4, or 5, where the support comprises an oxide of a metal or a non-oxide.

Embodiment 7. The catalyst of Embodiment 1, 2, 3, 4, 5, or 6, where the oxide of metal comprises an oxide of a metal selected from the group consisting of silicon, aluminum, magnesium, titanium, cerium, zirconium, yttrium oxides, zeolites, and mixtures thereof.

Embodiment 8. The catalyst of Embodiment 1, 2, 3, 4, 5, or 6, where the non-oxide comprises activated carbon, charcoal, biochars, graphene, graphite, single-wall carbon nanotubes, multi-wall carbon nanotubes, and nanofibers, carbon nitride, or silicon carbide.

Embodiment 9. The catalyst of Embodiment 1, 2, 3, 4, 5, 6, or 8, where the support comprises activated carbon.

Embodiment 10. The catalyst of Embodiment 1, 2, 3, 4, 5, 6, 7, 8, or 9, where the total amount of loading of OAT transition metal on the support is from 0.01 wt. % to 20 wt. % of the support.

Embodiment 11. The catalyst of Embodiment 1, 2, 3, 4, 5, 6, 7, 8, 9, or 10, where the total amount of loading of OAT transition metal on the support is from 1 wt. % to 15 wt. % of the support (e.g., 5 wt. % of the support).

Embodiment 12. The catalyst of Embodiment 1, 2, 3, 4, 5, 6, 7, 8, 9, 10, or 11, whereby the catalyst can chemically remove impurities ($ClO_4^-$ and/or $ClO_3^-$) from the fluid in the presence of a reducing atmosphere when the fluid is acidic.

Embodiment 13. A method of making a heterogeneous catalyst for removing impurities from a fluid, the method comprising: obtaining an OAT transition metal, adding one or more of a Group VIII metal to create a mixture, adding a support, and immobilizing the mixture on the support to create a heterogeneous catalyst.

Embodiment 14. The method of Embodiment 13, where the step of obtaining an OAT transition metal comprises obtaining mono-, poly- or heteropoly-oxometallates as OAT transition metal oxide precursors.

Embodiment 15. The method of Embodiment 13 or 14, where the step of adding one or more of a Group VIII metal comprises adding a Group VIII metal so that the molar ratio of the Group VIII metal to OAT transition metal is from 100:1 to 1:100.

Embodiment 16. The method of Embodiment 13, 14, or 15, where the step of adding the support comprises adding a support so that the total amount of support as measured by the weight of the OAT transition metal as compared to the weight of the support is from 0.01 wt. % to 10 wt. %.

Embodiment 17. The method of Embodiment 13, 14, 15, or 16, further comprising mixing the mixture for 1 second to 5 minutes before immobilizing the mixture on the support.

Embodiment 18. The method of Embodiment 13, 14, 15, 16, or 17, further comprising adjusting the pH of the mixture to a pH of from 1 to 6.

Embodiment 19. The method of Embodiment 13, 14, 15, 16, 17, or 18, where the step of immobilizing the mixture on the support to create a heterogeneous catalyst further comprises mixing the mixture under a reducing atmosphere for 10 minutes to 48 hours.

Embodiment 20. A method of treating a fluid to remove chemical impurities, comprising exposing the fluid to a catalyst of Embodiment 1, 2, 3, 4, 5, 6, 7, 8, 9, 10, 11, or 12, whereby the concentration of chemical impurities is reduced. For example, a method of treating unprocessed fluid to remove chemical impurities, comprising adjusting the pH of the fluid to a pH of 1 to 6, exposing the fluid to a catalyst of Embodiment 1, 2, 3, 4, 5, 6, 7, 8, 9, 10, 11, or 12, and to a reducing atmosphere for 5 minutes to 6 hours, whereby the concentration of chemical impurities is reduced.

Embodiment 21. The method of Embodiment 20, where the pH of the fluid is adjusted to a pH of 2 to 5.6.

Embodiment 22. The method of Embodiment 20 or 21, where exposing the fluid to the catalyst further comprises exposing the fluid to a reducing atmosphere (e.g., hydrogen gas).

Embodiment 23. The method of Embodiment 20, 21, or 22, where the atmosphere is 1 atm. at 25° C.

Embodiment 24. The method of Embodiment 20, 21, 22, or 23, where a chemical impurity removed is $ClO_3^-$.

Embodiment 25. A heterogeneous catalyst comprising an oxygen atom transfer (OAT) transition metal, a Group VIII metal, and a support, wherein the transition metal and the Group VIII metal are in physical communication with the support either directly or indirectly through each other.

Embodiment 26. A heterogeneous catalyst for removing impurities from a fluid comprising an oxygen atom transfer (OAT) transition metal, a Group VIII metal, and a support, wherein the transition metal and the Group VIII metal are in physical communication with the support either directly or indirectly through each other.

Embodiment 27. A heterogeneous catalyst comprising an oxygen atom transfer (OAT) transition metal, a Group VIII metal, and a support, wherein the heterogeneous catalyst is prepared by:

(1) adding one or more Group VIII metals to an OAT transition metal to create a mixture, and (2) immobilizing the mixture on a support.

Embodiment 28. A heterogeneous catalyst comprising an oxygen atom transfer (OAT) transition metal, a Group VIII metal, and a support, wherein the transition metal and the Group VIII metal are in physical communication with the support either directly or indirectly through each other and wherein the heterogeneous catalyst is prepared by:

(1) adding the Group VIII metal to the OAT transition metal to create a mixture, and (2) immobilizing the mixture on a support.

Embodiment 29. A heterogeneous catalyst prepared by a method described herein.

The following catalyst embodiments that further comprise nitrogen donor ligand(s) are also contemplated by this disclosure:

Embodiment 30. A heterogeneous catalyst for removing impurities from a fluid, the catalyst comprising: an oxygen-atom transfer (OAT) transition metal in the form of a complex with one or more nitrogen donor ligands, a Group VIII metal, and a support, where the transition metal complex and the Group VIII metal are in physical communication with the support either directly or indirectly through each other.

Embodiment 31. The catalyst of Embodiment 30, where the OAT transition metal is a Group VA or Group VIA metal.

Embodiment 32. The catalyst of Embodiment 30 or 31, where the OAT transition metal is vanadium, tungsten, molybdenum or oxides thereof.

Embodiment 33. The catalyst of Embodiment 30, 31, or 32, where the OAT transition metal is molybdenum.

Embodiment 34. The catalyst of Embodiment 30, 31, 32, or 33, where the nitrogen donor ligand is a compound selected from the following formulae:

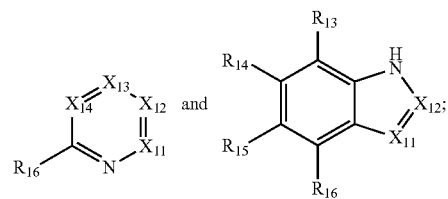

where:
$X_{11}$ is C—$R_{11}$ or N, $X_{12}$ is C—$R_{12}$ or N, $X_{13}$ is C—$R_{13}$ or N, $X_{14}$ is C—$R_{14}$ or N; and $R_{11}$ thru $R_{16}$ are independently H, hydroxy, alkyl, alkenyl, alkynyl, alkoxy, halogen, amino, or cyano.

Embodiment 35. The catalyst of Embodiment 30, 31, 32, 33, or 34, where the nitrogen donor ligand is:

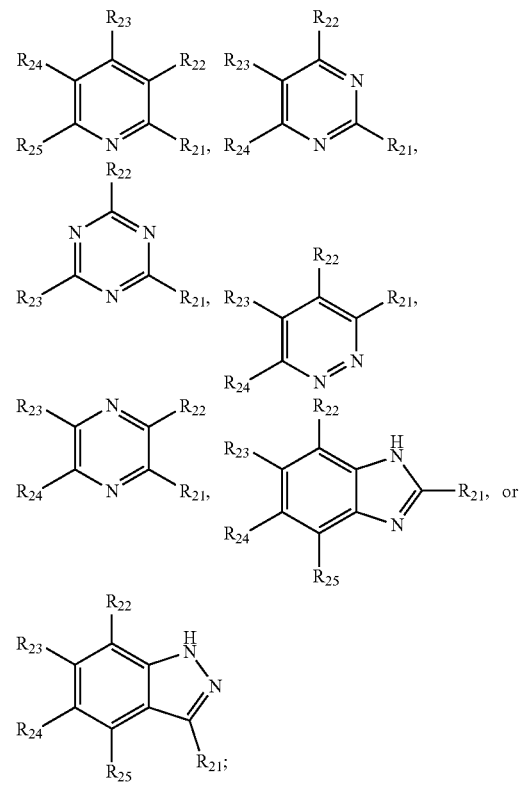

where $R_{21}$ thru $R_{25}$ are independently H, hydroxy, alkyl, alkenyl, alkynyl, alkoxy, halogen, amino, or cyano.

Embodiment 36. The catalyst of Embodiment 30, 31, 32, 33, 34, or 35, where $R_{21}$ thru $R_{25}$ are independently H, hydroxy, chloro. $C_{1-3}$ alkyl, $C_{1-3}$ alkoxy, or amino.

Embodiment 37. The catalyst of Embodiment 30, 31, 32, or 33, where the nitrogen donor ligand is a compound selected from the following formulae:

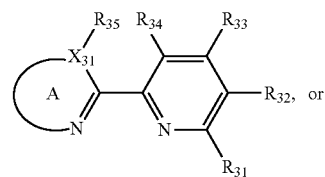

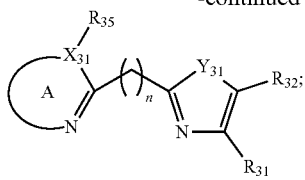

where:

A is an optionally substituted heteroaryl selected from the group consisting of 2-pyridinyl, 2-pyrimidinyl, 2-benzimidazolyl, 4,5-dihydrooxazolyl, 2-oxazolyl, and 2-imidazolyl, where $X_{31}$ is either C, O, S or N depending on the heteroaryl, where the hydrogen positions in the heteroaryl are independently H, hydroxy, alkyl, alkenyl, alkynyl, alkoxy, halogen, amino, or cyano;

$Y_{31}$ can be either C, O, S or N, where the hydrogen positions in the heteroaryl that contains $Y_{31}$ can be independently H, hydroxy, alkyl, alkenyl, alkynyl, alkoxy, halogen, amino, or cyano;

$R_{31}$ thru $R_{33}$ are independently H, hydroxy, alkyl, alkenyl, alkynyl, alkoxy, halogen, amino, or cyano;

$R_{34}$ and $R_{35}$ are independently H, hydroxy, alkyl, alkenyl, alkynyl, alkoxy, alkenyloxy, halogen, amino, cyano, or together with the carbon which they are linked, form a carbon alkyl or alkenyl of 1 to 2 carbon atoms where hydrogen in the link is independently optionally substituted with H, hydroxy, alkyl, alkenyl, alkynyl, alkoxy, alkenyloxy, halogen, amino, cyano, or O or S for divalent positions, or, when 2 carbon atoms, both carbon positions are optionally substituted with an additional linked alkyl or alkenyl to form an optionally substituted 4-6 carbon heteroaryl from 1 to 2 heteroatoms, where the heteroatom is N, and where the hydrogen positions in the heteroaryl are independently H, hydroxy, alkyl, alkenyl, alkynyl, alkoxy, halogen, amino, or cyano.

Embodiment 38. The catalyst of Embodiment 30, 31, 32, 33, or 37, where the nitrogen donor ligand is:

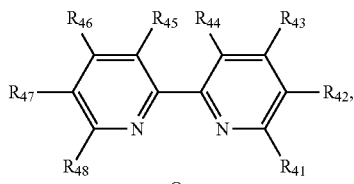

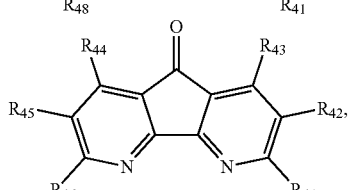

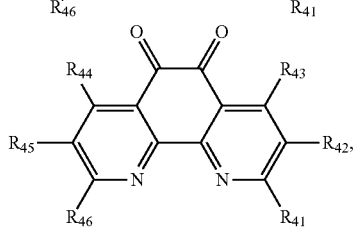

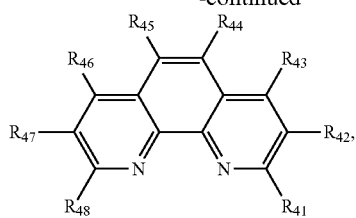

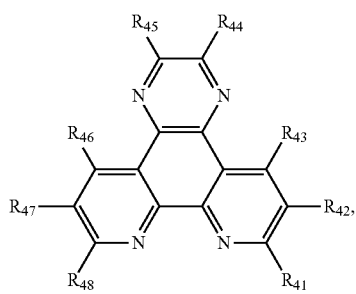

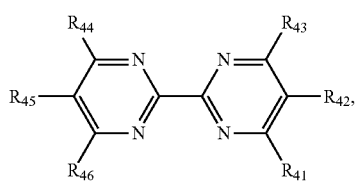

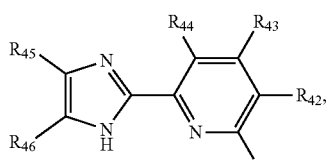

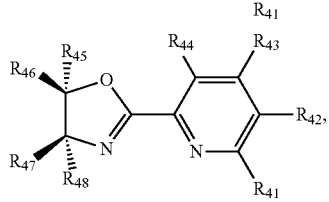

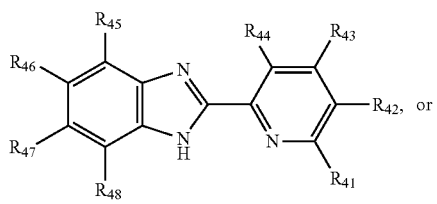

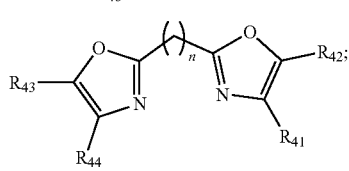

where $R_{41}$ thru $R_{48}$ are independently H, hydroxy, alkyl, alkenyl, alkynyl, alkoxy, halogen, amino, or cyano.

Embodiment 39. The catalyst of Embodiment 30, 31, 32, 33, 37, or 38, where $R_{41}$ thru $R_{48}$ is independently H, hydroxy, chloro. $C_{1-3}$ alkyl, $C_{1-3}$ alkoxy, or amino.

Embodiment 40. The catalyst of Embodiment 30, 31, 32, or 33, where the nitrogen donor ligand is a compound selected from the following formulae:

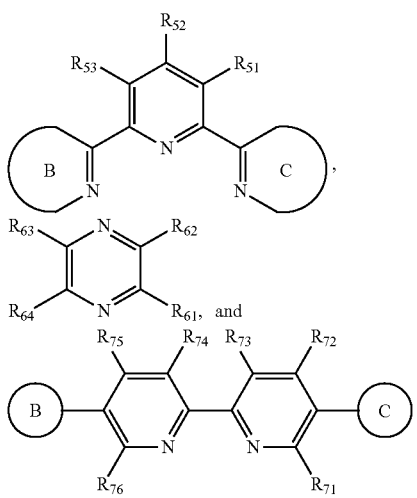

where:
B and C are independently selected from optionally substituted heteroaryl selected from the group consisting of 2-pyridinyl, 2-pyrimidinyl, 2-benzimidazolyl, 4,5-dihydrooxazolyl, 2-oxazolyl, and 2-imidazolyl, where the hydrogen positions in the heteroaryl are independently H, hydroxy, alkyl, alkenyl, alkynyl, alkoxy, halogen, amino, or cyano;
$R_{51}$ thru $R_{53}$ are independently H, hydroxy, alkyl, alkenyl, alkynyl, alkoxy, halogen, amino, or cyano;
$R_{61}$ thru $R_{64}$ are independently H, hydroxy, alkyl, alkenyl, alkynyl, alkoxy, halogen, amino, cyano, or an optionally substituted aryl, where the aryl is selected from the group consisting of the group consisting of 2-pyridinyl, 2-pyrimidinyl, 2-benzimidazolyl, 4,5-dihydrooxazolyl, 2-oxazolyl, and 2-imidazolyl, where the hydrogen positions in the heteroaryl are independently H, hydroxy, alkyl, alkenyl, alkynyl, alkoxy, halogen, amino, or cyano; and
$R_{71}$ thru $R_{76}$ are independently H, hydroxy, alkyl, alkenyl, alkynyl, alkoxy, halogen, amino, or cyano.

Embodiment 41. The catalyst of Embodiment 30, 31, 32, 33, or 40 where the nitrogen donor ligand is:

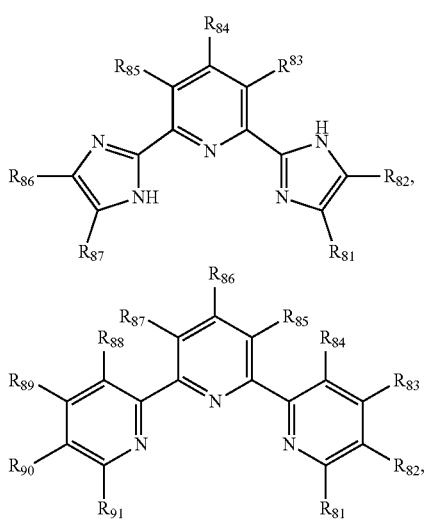

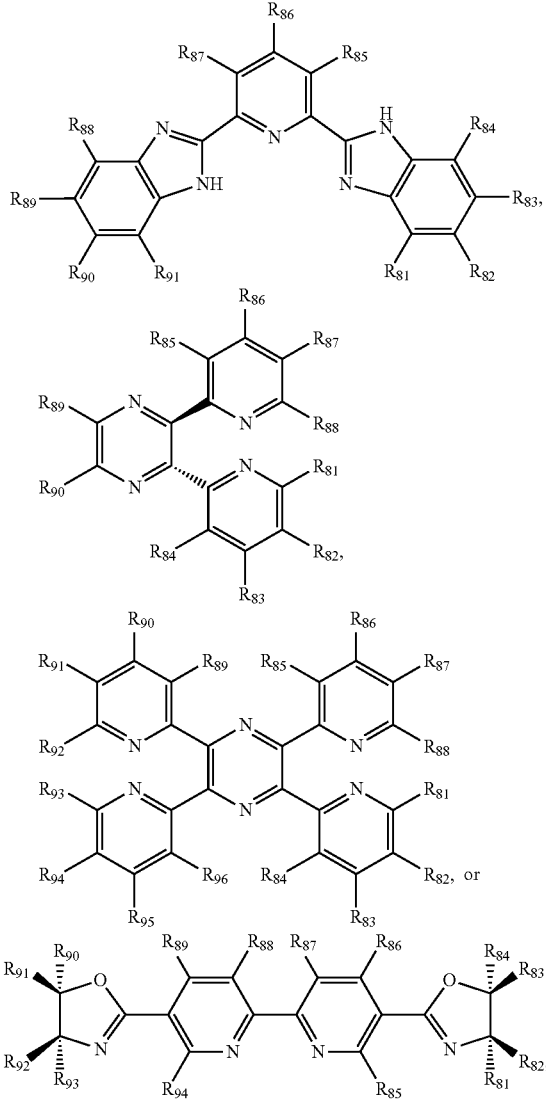

where $R_{81}$ thru $R_{96}$ are independently H, hydroxy, alkyl, alkenyl, alkynyl, alkoxy, halogen, amino, or cyano.

Embodiment 42. The catalyst of Embodiment 30, 31, 32, 33, 40, or 41, where $R_{81}$ thru $R_{96}$ are independently H, hydroxy, chloro, $C_{1-3}$ alkyl, $C_{1-3}$ alkoxy, or amino.

Embodiment 43. The catalyst of Embodiment 30, 31, 32, 33, 34, 35, 36, 37, 38, 39, 40, 41, or 42, where the molar ratio of OAT transition metal to ligand is from 10:1 to 1:10.

Embodiment 4. The catalyst of Embodiment 30, 31, 32, 33, 34, 35, 36, 37, 38, 39, 40, 41, 42, or 43, where the molar ratio of OAT transition metal to ligand is 1:1.

Embodiment 45. The catalyst of Embodiment 30, 31, 32, 33, 34, 35, 36, 37, 38, 39, 40, 41, 42, 43, or 44, where the molar ratio between the Group VIII metal and OAT transition metal is from 100:1 to 1:100.

Embodiment 46. The catalyst of Embodiment 30, 31, 32, 33, 34, 35, 36, 37, 38, 39, 40, 41, 42, 43, 44, or 45, where the molar ratio between the Group VIII metal and OAT transition metal is 0.90.

Embodiment 47. The catalyst of Embodiment 30, 31, 32, 33, 34, 35, 36, 37, 38, 39, 40, 41, 42, 43, 44, 45, or 46, where the support comprises an oxide of metal or a non-oxide.

Embodiment 48. The catalyst of Embodiment 30, 31, 32, 33, 34, 35, 36, 37, 38, 39, 40, 41, 42, 43, 44, 45, 46, or 47, where the oxide of metal comprises an oxide of a metal selected from the group consisting of silicon, aluminum, magnesium, titanium, cerium, zirconium, yttrium oxides, zeolites, and mixtures thereof.

Embodiment 49. The catalyst of Embodiment 30, 31, 32, 33, 34, 35, 36, 37, 38, 39, 40, 41, 42, 43, 44, 45, 46, 47, or 48, where the non-oxide comprises activated carbon, charcoal, biochars, graphene, graphite, single-wall carbon nanotubes, multi-wall carbon nanotubes, and nanofibers, carbon nitride, or silicon carbide.

Embodiment 50. The catalyst of Embodiment 30, 31, 32, 33, 34, 35, 36, 37, 38, 39, 40, 41, 42, 43, 44, 45, 46, 47, 48, or 49, where the support comprises activated carbon.

Embodiment 51. The catalyst of Embodiment 30, 31, 32, 33, 34, 35, 36, 37, 38, 39, 40, 41, 42, 43, 44, 45, 46, 47, 48, 49, or 50, where the total amount of loading of OAT transition metal on the support is from 0.01 wt. % to 20 wt. % of the support.

Embodiment 52. The catalyst of Embodiment 30, 31, 32, 33, 34, 35, 36, 37, 38, 39, 40, 41, 42, 43, 44, 45, 46, 47, 48, 50, or 51, where the total amount of loading of OAT transition metal on the support is from 1 wt. % to 15 wt. % of the support (e.g., 5 wt. % of the support).

Embodiment 53. The catalyst of Embodiment 30, 31, 32, 33, 34, 35, 36, 37, 38, 39, 40, 41, 42, 43, 44, 45, 46, 47, 48, 50, 51, or 52, whereby the catalyst can chemically remove impurities from the fluid in the presence of a reducing atmosphere when the fluid is acidic.

Embodiment 54. A kit for making a catalyst, comprising an OAT transition metal solution, a ligand solution, a Group VIII metal with support solution, where the components are added to form the catalyst.

Embodiment 55. The kit of Embodiment 54, where the OAT transition metal solution comprises molybdenum.

Embodiment 56. The kit of Embodiment 54 or 55, where the Group VIII metal with support solution comprises palladium on carbon.

Embodiment 57. The kit of Embodiment 54, 55, or 56 where the ligand solution comprises 4,4'-diamino-2,2'-bipyridine or 4,4'-bis(dimethylamino)-2,2'-bipyridine.

Embodiment 58. A heterogenous catalytic reactor for removing halogen oxyanions, the reactor comprising a container defining a reaction plenum, with at least one orifice defining an inlet and an outlet, where the fluid to be processed enters through the inlet and exits through the outlet once the contaminants have dropped to a desired level, where the reaction plenum encloses the heterogenous catalyst of Embodiment 30, 31, 32, 33, 34, 35, 36, 37, 38, 39, 40, 41, 42, 43, 44, 45, 46, 47, 48, 50, 51, 52 or 53.

Embodiment 59. The reactor of Embodiment 58, where the catalyst loading is from 20 mg/L to 2000 mg/L.

Embodiment 60. A method of making a heterogeneous catalyst for removing impurities from a fluid, the method comprising: obtaining an OAT transition metal, adding a ligand, adding one or more of a Group VIII metal to create a mixture, adding a support, and immobilizing the mixture on the support to create a heterogenous catalyst.

Embodiment 61. The method of Embodiment 60, where the step of obtaining an OAT transition metal comprises obtaining mono-poly- or heteropoly-oxometallates as OAT transition metal oxide precursors.

Embodiment 62. The method of Embodiment 60 or 61, where the steps of obtaining an OAT transition metal and adding a ligand is done where the molar ratio of OAT transition metal to ligand is from 10:1 to 1:10.

Embodiment 63. The method of Embodiment 60, 61, or 62, where the step of adding one or more of a Group VIII metal comprises adding a Group VIII metal so that the molar ratio of the Group VIII metal to OAT transition metal is from 100:1 to 1:100.

Embodiment 64. The method of Embodiment 60, 61, 62, or 63, where the step of adding the support comprises adding a support so that the total amount of support as measured by the weight of the OAT transition metal as compared to the weight of the support is from 0.01 wt. % to 20 wt. %.

Embodiment 65. The method of Embodiment 60, 61, 62, 63, or 64, further comprising mixing the mixture for 1 second to 5 minutes before immobilizing the mixture on the support.

Embodiment 66. The method of Embodiment 60, 61, 62, 63, 64, or 36, further comprising adjusting the pH of the mixture to a pH of from 1 to 6.

Embodiment 67. The method of Embodiment 60, 61, 62, 63, 64, 65, or 66, where the step of immobilizing the mixture on the support to create a heterogenous catalyst further comprises mixing the mixture under a reducing atmosphere for 10 minutes to 48 hours.

Embodiment 68. A method of treating a fluid to remove chemical impurities, comprising exposing the fluid to a catalyst of any one of Embodiments 30 to 53, whereby the concentration of chemical impurities (e.g., $ClO_4^-$) is reduced. For example, a method of treating unprocessed fluid to remove chemical impurities comprising: adjusting the pH of the fluid to a pH of 1 to 6, exposing the fluid to a catalyst of Embodiment 30, 31, 32, 33, 34, 35, 36, 37, 38, 39, 40, 41, 42, 43, 44, 45, 46, 47, 48, 50, 51, 52 or 53, and to a reducing atmosphere for 5 minutes to 6 hours, whereby the concentration of chemical impurities is reduced.

Embodiment 69. The method of Embodiment 68, where the pH is adjusted to a pH of 2 to 5.6.

Embodiment 70. The method of Embodiment 68 or 69, where the reducing atmosphere is hydrogen gas.

Embodiment 71. The method of Embodiment 68, 69, or 70, where the atmosphere is 1 atm. at 25° C.

Embodiment 72. The method of Embodiment 68, 69, 70, or 71, where a chemical impurity removed is $ClO_4^-$.

Embodiment 73. The method of Embodiment 68, 69, 70, 71, or 72, where the concentration of $ClO_4^-$ is reduced below 6 ppb.

EXAMPLES

The examples of synthesis of catalysts with various combinations of metal oxides and hydrogenation metals on support and their benefits are hereafter reported and are intended to be illustrative of the embodiments of the disclosure but are not intended to limit the scope or underlying principles in any way.

Example 1-8: Synthesis of a Catalyst Based on Molybdenum and Tungsten Oxides and Pd on a Carbon Support The preparation method described for preparing $Na_2MoO_4$—Pd/C was applied to preparing catalysts for the molybdenum and tungsten oxide precursors. A 3 g $L^{-1}$ stock solution of $Na_2MoO_4$ was prepared by dissolving 150 mg $Na_2MoO_4$ into 50 ml DI water. A typical 0.2 g $L^{-1}$ bimetallic heterogeneous catalyst (of 5 wt. % Mo) was prepared in a 50 ml pear-shaped flask by consecutively adding 10 mg of Pd/C (5 wt. % Pd), 0.36 ml of $Na_2MoO_4$ stock solution (containing 0.5 mg Mo), and a magnetic stir bar to 50 ml of DI water.

Then, the pH of the resulting solution was adjusted to 3.0 with 2N $H_2SO_4$. The flask was then sealed with a rubber stopper and sonicated for 1 minute. For catalysts other than $Na_2MoO_4$—Pd/C, the amount of metal stock solution used is summarized in Table 1.

TABLE 1

Variation of Ligand and OAT Transition Metal to Ligand Molar Ratio for Selected Catalysts.

| Example | Metal precursors | Metal Stock Sol. (mL) |
|---|---|---|
| Example 1 | $Na_2MoO_4$ | 0.36 |
| Example 2 | $(NH_4)_6Mo_7O_{24}$ | 0.29 |
| Example 3 | $H_3PMo_{12}O_{40}$ | 0.26 |
| Example 4 | $H_3SiMo_{12}O_{40}$ | 0.26 |
| Example 5 | $Na_2WO_4$ | 0.27 |
| Example 6 | $H_3SiW_{12}O_{40}$ | 0.22 |
| Example 7 | $H_3PW_{12}O_{40}$ | 0.22 |
| Example 8 | $3Na_2WO_4 \cdot 9WO_3$ | 0.27 |

The aqueous suspension was then stirred at 1000 rpm under a reducing atmosphere of 1 atm $H_2$ gas (supplied by two 16-gauge diameter, 6-in length needles as gas inlet and out to the fume hood, respectively) for at least 30 minutes to allow the transfer and immobilization of Moor W species from bulk phase into the activated carbon matrix supplied with the Pd/C. Although the carbon supplied with the Pd/C was utilized, a separate carbon matrix can be utilized.

Generally, hydrogenation metals on supports (powder), metal oxides (stock solutions), ligands (stock solutions), and Milli-Q water (pH=3) are added sequentially into around-bottom flask. The sequence of adding metal oxides and ligands does not have a significant effect on the catalytic activity. The mixture will be shaken and sonicated for 1 min, and then stirred for at least 30 mins with 1 atm $H_2$ sparging to allow the transfer and immobilization of active species from bulk phase into the support matrix.

Example 9-15: Synthesis of a Catalyst Based on Molybdenum Oxides and Pd on a Carbon Support with Various Mo Loadings Catalysts were synthesized to test the effects of Mo loading on the catalytic activity. The preparation methods were done in the same manner as Example 1-8 but except for the following modifications to Molybdenum loading shown in Table 2. Instead of 0.36 ml of $Na_2MoO_4$ stock solution (containing 0.5 mg Mo), the amount of stock solution was varied to adjust the mass percentage of molybdenum.

TABLE 2

Variation of OAT Transition Metal (Mo) Loading for Selected Catalysts.

| Example | Mo wt. % (to support) | Mo Stock Sol. (μL) | Pd wt. % (to support) |
|---|---|---|---|
| Example 1 | 5 | 360 | 5 |
| Example 9 | 0.1 | 7.2 | 5 |
| Example 10 | 0.2 | 14.4 | 5 |
| Example 11 | 0.4 | 28.8 | 5 |
| Example 12 | 0.5 | 36 | 5 |
| Example 13 | 1 | 72 | 5 |
| Example 14 | 2 | 144 | 5 |
| Example 15 | 10 | 720 | 5 |

Examples 16-19: Synthesis of a Catalysts Based on Molybdenum Oxides and Pd on a Carbon Support with Varying pH Additional catalysts were synthesized to test the effects of pH on the catalytic activity. For the sensitivity study, The preparation methods were done in the same manner as Example 1-8 but with the exception that after mixing, the pH of the resulting solution was adjusted to the value in Table 3 instead of pH of 3.0.

TABLE 3

Variation of pH of the final solution.

| Example | Mo wt. % (to support) | Mo Stock Sol. (mL) | Pd wt. % (to support) | pH of Final Mixture |
|---|---|---|---|---|
| Example 1 | 5 | 0.36 | 5 | 3 |
| Example 16 | 5 | 0.36 | 5 | 1 |
| Example 17 | 5 | 0.36 | 5 | 2 |
| Example 18 | 5 | 0.36 | 5 | 4.7 |
| Example 19 | 5 | 0.36 | 5 | 6.4 |

Example 20: Comparison of Catalysts Prepared from Examples 1-8

Figure 3:
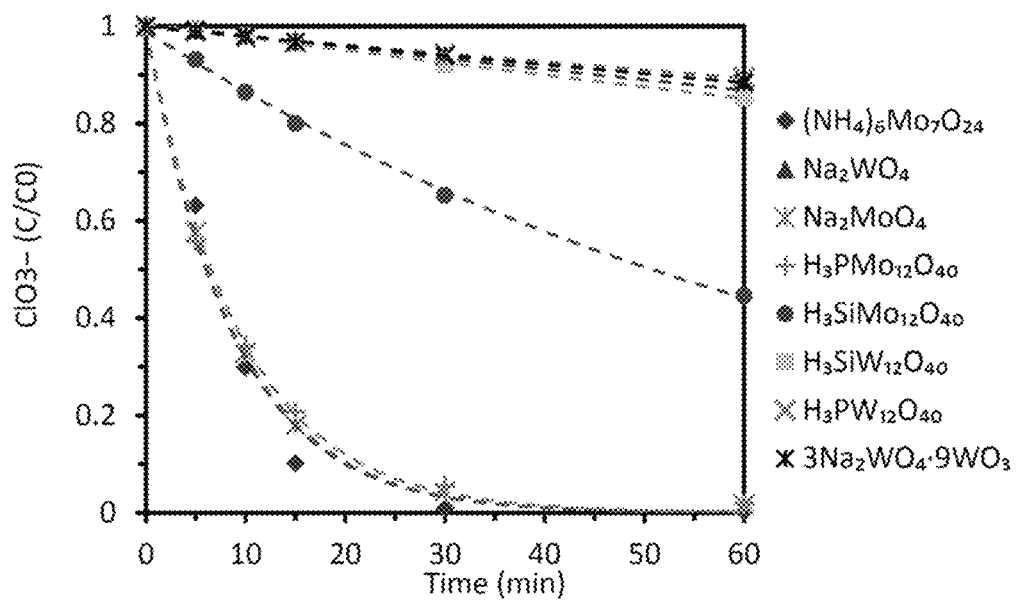
FIG. 3 is a graph showing the reduction profile of 1 mM $ClO_3^-$ with catalysts prepared from example 1-8. The reactions were conducted at a pH of 3, 1 atm $H_2$, and 25° C. The loading of the catalysts is 0.2 g $L^{-1}$ 9 with a Mo or W loading of 5% by weight.

For each catalyst from Examples 1-8, a $ClO_3^-$ reduction reaction was conducted for each example to investigate the catalytic activity. The experiment was conducted under 1 atm $H_2$ flow, at a pH of 3, and room temperature. 1 mM $ClO_3^-$ reduction was initiated by adding 0.25 ml $NaClO_3^-$ stock solution (20 mM) to 50 ml of the respective catalyst suspension. During the reduction, in periodic intervals of 5 minutes, 10 minutes. 15 minutes, 30 minutes, and 1 hour, aliquots of solution were periodically collected through the $H_2$ outlet and immediately filtered (0.22 μm cellulose membrane) to quench reactions prior to analysis. Concentrations of $Cl^-$ and $ClO_3^-$ in the samples were determined by ion chromatography (Dionex ICS-5000 system with a 25 μL sample injection loop, and IonPac AS 19 column, 30° C. column temperature, 20 mM NaOH eluent, 1.0 mL min-flow rate, and a conductivity detector). The results obtained for Examples 1-8 are shown in FIG. 3.

From the results, it was verified that catalysts prepared from mono- and poly-oxomolybdate precursors including $Na_2MoO_4$, $(NH_4)_6Mo_7O_{24}$, and $H_3PMo_{12}O_{40}$ showed very high and similar activity, which are orders of magnitude higher than that of pure Pd/C. In comparison, the four $W^{VI}$ precursors provided little activity enhancement.

Example 21: Effects of OAT Transition Metal Loading, Catalysts from Examples 1, 9-15

Figure 7:
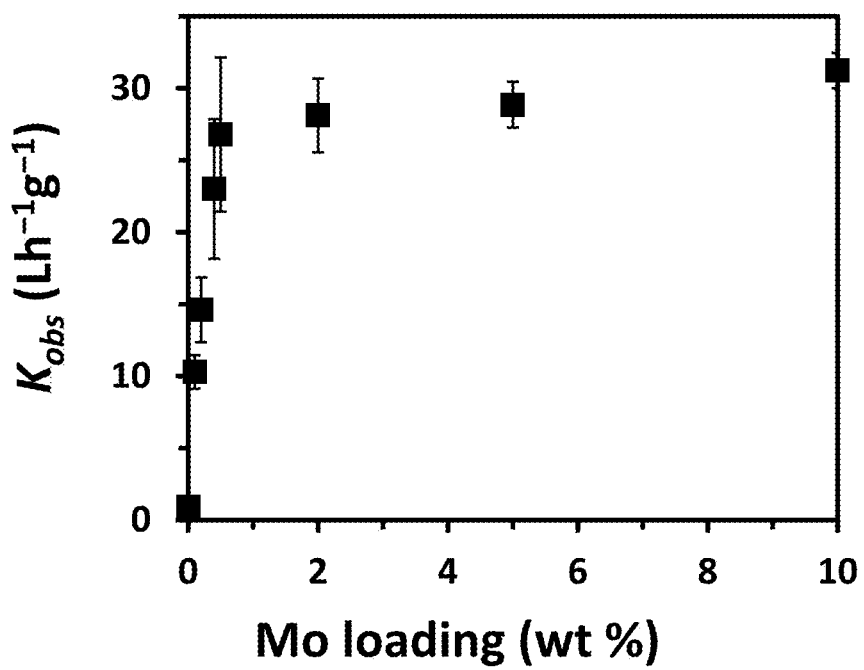
FIG. 7 is a graph showing the relationship between the observed reaction rate constant and Mo loadings (0.1%-10%). Reactions were conducted at a pH of 3, 1 atm $H_2$, and 25° C.

To characterize the effects of OAT transition metal loading to catalytic performance, 1 mM $ClO_3^-$ reductions were conducted with catalysts from Examples 1, 9 thru 15. The reactions were conducted in the same manner as Example 20 with the exception that the catalysts used were the catalysts prepared in Examples 1, 9 thru 15. The results obtained are shown in FIG. 7.

The results obtained show that the rate constants for 1 mM $ClO_3^-$ reduction increase with respect to Mo loading from 0 to 0.5 wt %, and then plateaued. It was noted that molybdenum loading above 1 wt % of the support did not provide an appreciable increase in catalytic activity.

Example 22A: Effect of pH on Performance, Catalysts from Examples 1, 16-19

Figure 8:
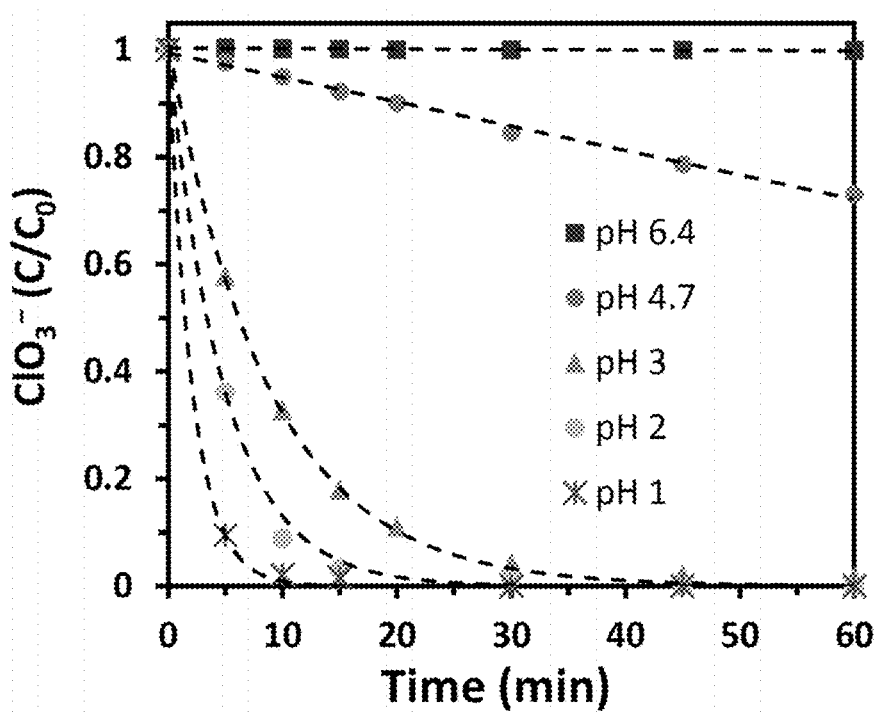
FIG. 8 is a plot showing the effect of proton concentrations. The reactions were conducted at 1 atm $H_2$ and 25° C. with 0.2 g $L^{-1}$ $Na_2MoO_4$—Pd/C (5 wt. % Mo. 5 w. % Pd).
Figure 9:
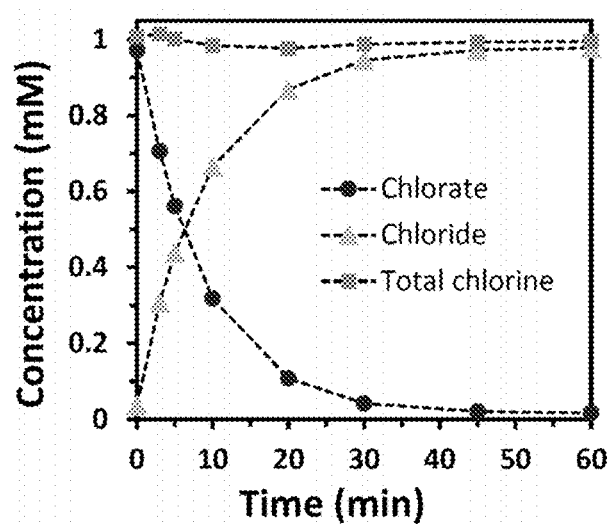
FIG. 9 is a graph depicting the chlorine mass balance during 1 mM $ClO_3^-$ by 0.2 g $L^{-1}$ $Na_2MoO_4$—Pd/C (5 wt. % Mo, 5 wt. % Pd) at 25° C., and pH of 3 under continuous 1 atm $H_2$ sparging.

To examine the effect of varying pH of the final catalyst, catalysts from Examples 1, 16 thru 19, were measured to determine their ability to reduce $ClO_3^-$. The reactions were conducted in the same manner as Example 20 with the exception that the catalysts used were the catalysts prepared in Examples 1, 16 thru 19. The results obtained are shown in FIG. 8.

As shown, the rate of the catalytic reaction depends on the pH of the reaction environment. In acidic media, a higher rate of $ClO_3^-$ reduction was observed at lower pH. Within the range of a pH of 1 to a pH of 6.4, a pH of 1 provided the highest catalyst activity.

Example 22B: Endurance Testing—Reduction of Concentrate $ClO_3^-$ Solution

Figure 6:
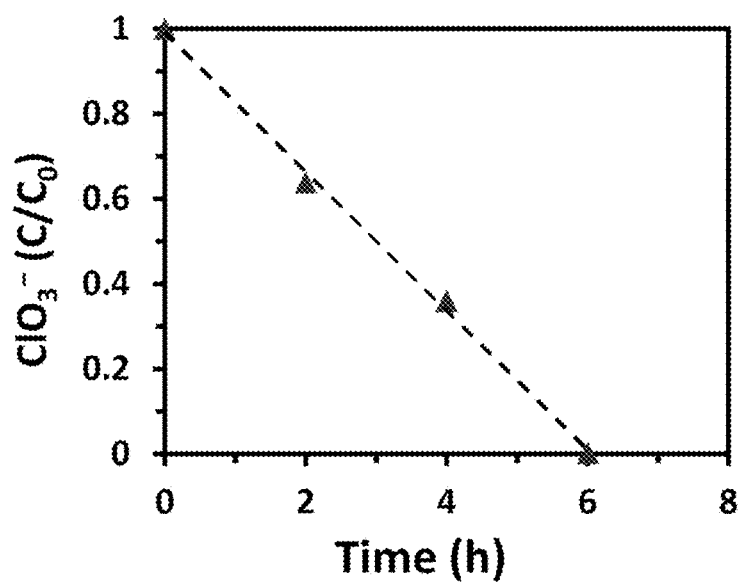
FIG. 6 is a plot showing the reduction profile of 1 M $ClO_3^-$ with catalysts prepared from example 12. The reactions were conducted at a pH of 3, 1 atm $H_2$, and 25° C. The loading of the catalysts is 0.5 g $L^{-1}$ with a Mo loading of 5% by weight.

To test the endurance of the catalyst, a catalyst made by Example 12 was challenged by 1 M $ClO_3^-$ solution. The reaction was conducted on Example 12 in the same manner as Example 20 with the exception that the 0.25 ml $NaClO_3^-$ stock solution (200 mM) amount was varied such that 1 M $ClO_3^-$ was present in the suspension. The reduction profile is shown in FIG. 6.

The reaction was surprisingly rapid. The concentration of $ClO_3^-$ went below the detection limit of ion chromatography within 6 h. Assuming the Mo sites reacted with all $ClO_x^-$ (x=3, 2, and 1) substrates, at pH 3 the corresponding TON for each Mo atom has already reached 115,130 within 6 h (i.e., TOF=19,200 $h^{-1}$). We note that if not all immobilized Mo atoms involved in the surface reaction, the actual TOF on reactive Mo sites is expected to be even higher than 19,200 h.

Figure 4:
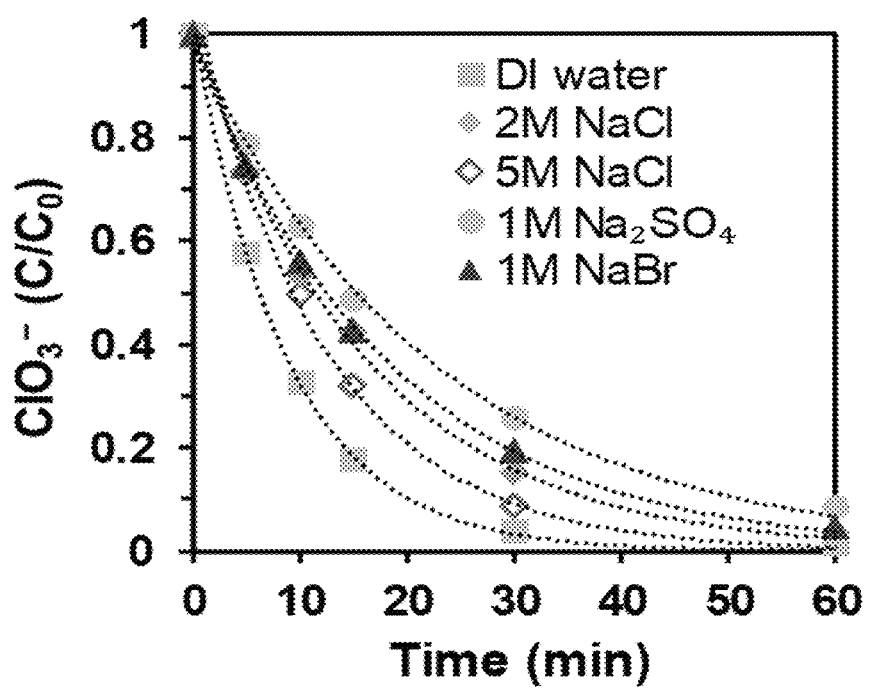
FIG. 4 is a graph of the reduction profiles of 1 mM $ClO_3^-$ by 0.2 g $L^{-1}$ $Na_2MoO_4$—Pd/C (5 wt. % Mo. 5 wt. % Pd) in the presence of deionized water, 2 M $Cl^-$, 5 M $Cl^-$, 1 M $Br^-$, and 1 M $SO_4^{2-}$. The reactions were conducted at a pH of 3, 1 atm $H_2$, and 25° C.

Example 23: Brine Treatment Testing—Reductions of $ClO_3^-$ in Synthetic Brines To examine the resilience of the catalyst under brine conditions, the catalytic performance of Mo—Pd/C was further evaluated in synthetic brines with the presence of 2 M chloride, 5 M chloride, 1 M sulfate, or 1 M bromide anion ions. The reactions were conducted on an Example 12 catalyst in the same manner as Example 20 with the exception that the catalyst suspension was added with corresponding sodium salts manipulated so that the solution contained DI water (Milli Q) 2 M chloride, 5 M chloride, 1 M sulfate, or 1 M bromide anion ions, respectively. The performance of the catalyst in the presence of other ions is depicted in FIG. 4. Based on the results, the catalyst held a very high activity for reducing 1 mM $ClO_3^-$ in various synthetic brines.

Figure 5:
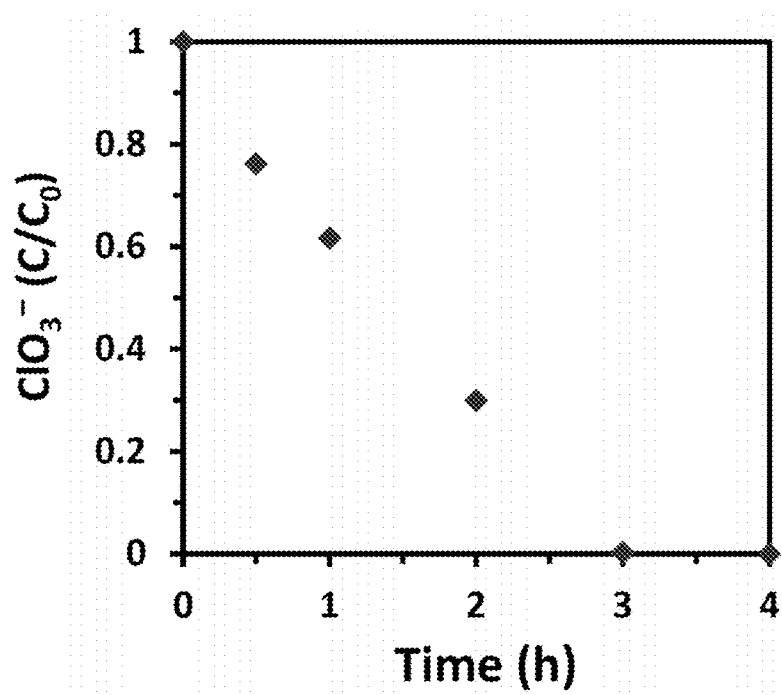
FIG. 5 is a figure describing the reduction profiles of 170 mM $ClO_3^-$ by 0.5 g $L^{-1}$ $Na_2MoO_4$—Pd/C (5 wt. % Mo, 5 wt. % Pd) in the presence of 3.6 M NaCl (synthetic Chlor-Alkali electrolysis solution). The reactions were conducted at a pH of 3, 1 atm $H_2$, and 25° C.

Example 24: Brine Treatment Testing—Reductions of $ClO_3^-$ in Synthetic Chlor-Alkali Electrolysis Solution To examine the resilience of the catalyst under the Chlor-Alkali electrolysis solution, the catalytic performance of Mo—Pd/C was also evaluated in synthetic Chlor-Alkali electrolysis solution with the presence of 3.6 M chloride and 0.17 M $ClO_3^-$. The reaction was conducted on an Example 12 catalyst in the same manner as Example 20 with the exception that the catalyst suspension was manipulated so that the solution contained DI water (Milli Q), 3.6 M chloride and 0.17 M $ClO_3^-$. The performance of the catalyst in the presence of other ions is depicted in FIG. 5. The Mo—Pd/C catalyst achieved >99.9% reduction of $ClO_3^-$ in 3 hours, with the TOF >6400 $h^{-1}$. Therefore, the reductively immobilized Mo species in Pd/C hold unique and superior properties for $ClO_3^-$ reduction.

Figure 10:
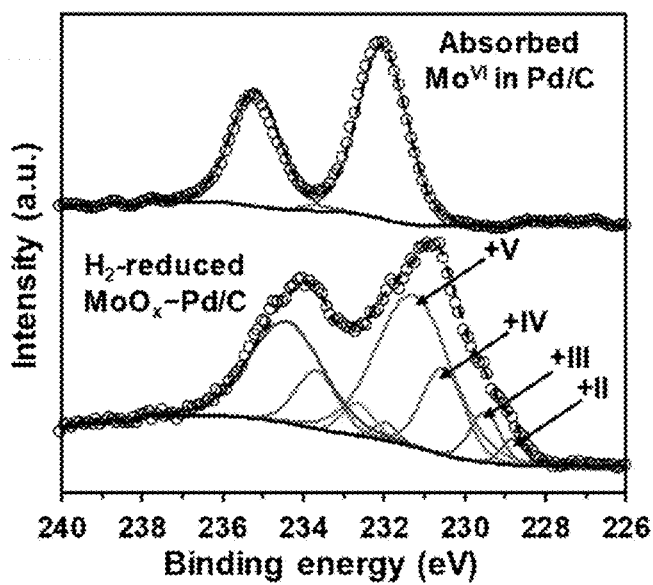
FIG. 10 is a plot showing the X-ray photoelectron spectroscopy spectra for unreduced and reduced $Na_2MoO_4$—Pd/C (5 wt. % Mo, 5 wt. % Pd) catalyst. The catalyst was reduced at a pH of 3, 1 atm $H_2$, and 25° C.

Example 25: Spectroscopic Characterization—Oxidation States of Molybdenum Species on the Pd/C Support To understand the highly active Mo species formed upon reductive immobilization of metal precursors, the catalyst prepared from Example 1 was isolated by filtration and dried in an anaerobic glove bag, and then transferred into anaerobic sample holders for X-ray Photoelectron Spectroscopy (XPS) analysis. The XPS spectrum of the $H_2$-reduced catalyst is shown in FIG. 10. Upon deconvolution, four Mo doublets are identified. Comparing the binding energy of $3d_{5/2}$ peak with the previously reported results shows that four doublets correspond to $Mo^V$, $Mo^V$, $Mo^{III}$, and $Mo^{II}$ species. Therefore, a mixture of $Mo^V$, $Mo^{IV}$, $Mo^{III}$, and $Mo^{II}$ oxides are present on the Pd/C support.

Figure 11:
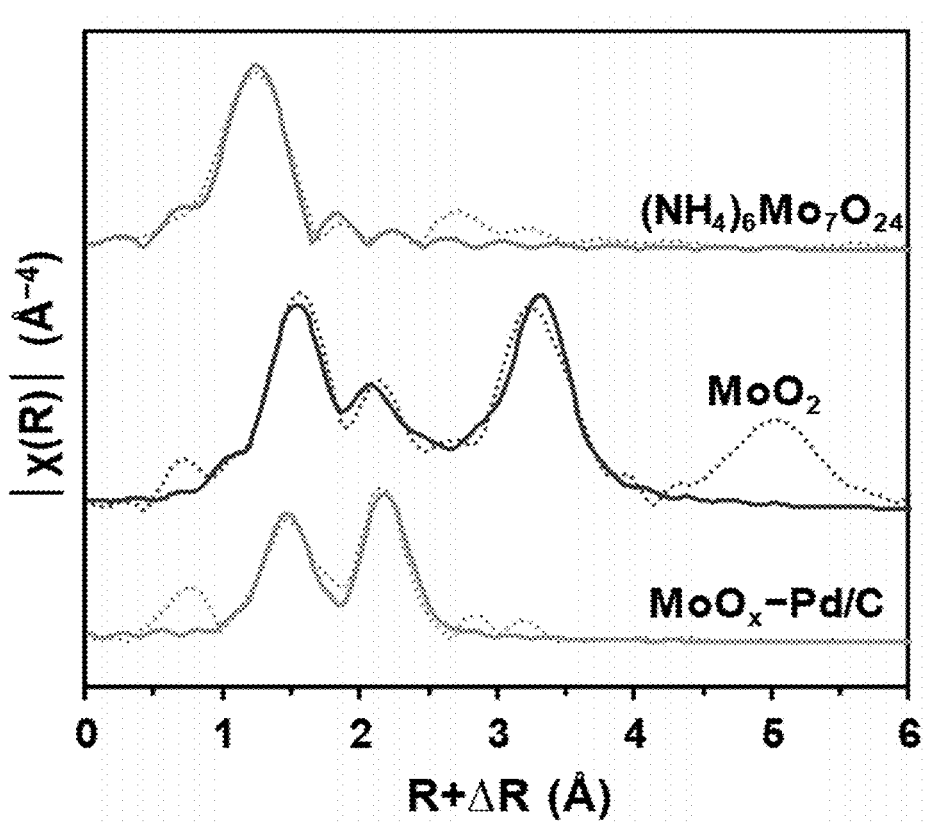
FIG. 11 is a plot showing the Fourier transforms of Mo K-edge Extended X-ray Absorption Fine Structure spectrum for reduced $Na_2MoO_4$—Pd/C (5 wt. % Mo. 5 wt. % Pd) catalyst and Mo standards. The catalyst was reduced at a pH of 3, 1 atm $H_2$, and 25° C.

Example 26: Spectroscopic Characterization—EXAFS Analysis as a Probe for Local Coordination Environment of Molybdenum Atom To investigate the local coordination environment of Molybdenum atom, the catalyst prepared from Example 1 was isolated by filtration and dried in an anaerobic glove bag, and then transferred into anaerobic sample holders for Extended X-ray Absorption Fine Structures (EXAFS) analysis. FIG. 11 depicts the Fourier transforms of the Mo K-edge EXAFS spectrum. The shell-by-shell fitting parameters and references are summarized in Table 4.

The sample exhibits two main peaks at 1.5 and 2.2 Å (R+ΔR). Shell-by-shell fitting (Table 4) shows that the two peaks correspond to two atomic shells $Mo^{IV}$—O (2.03 Å) and $Mo^{IV}$—$Mo^{IV}$ (2.56 Å), respectively. The overall CN of 6.1 for Mo—O shell indicates that most reduced Mo atoms are in the octahedral $MoO_6$ coordination structure. The overall CN of 1.7 for Mo—Mo shell confirms the polymeric structures for reductively immobilized $Mo^{IV}$ and $Mo^V$ species.

TABLE 4

Mo K-edge EXAFS Shell-by-shell Fitting Parameters of Catalyst (Example 1) and References.

| Sample | Shell | $CN^a$ | $R (Å)^b$ | $\sigma^2 (Å^2)^c$ | $\Delta E (eV)^d$ | R-factor |
|---|---|---|---|---|---|---|
| $(NH_4)_6Mo_7O_{24}$ | Mo—O | 4 | 1.74 (0.01) | 0.004 (0.002) | −4.0 (3.3) | 0.012 |
| $MoO_2$ | Mo—O | 6 | 1.99 (0.01) | 0.002 (0.001) | −1.4 (2.0) | 0.023 |
| | Mo—Mo | 1 | 2.52 (0.01) | 0.001 (0.001) | | |
| | Mo—Mo | 1 | 3.12 (0.01) | 0.002 (0.001) | | |
| | Mo—Mo | 8 | 3.70 (0.01) | 0.004 (0.001) | | |

TABLE 4-continued

Mo K-edge EXAFS Shell-by-shell Fitting Parameters of Catalyst (Example 1) and References.

| Sample | Shell | CN[a] | R (Å)[b] | $\sigma^2$ (Å$^2$)[c] | ΔE (eV)[d] | R-factor |
|---|---|---|---|---|---|---|
| MoO$_x$—Pd/C | Mo—O | 0.4 (0.3) | 1.67 (0.04) | 0.002 | −4.1 (2.9) | 0.030 |
| | Mo—O | 6.1 (1.9) | 2.03 (0.02) | 0.010 (0.004) | | |
| | Mo—Mo | 1.7 (0.6) | 2.56 (0.01) | 0.005 (0.002) | | |

[a]Coordination number;
[b]Interatomic distance;
[c]Debye-Waller factor;
[d]Energy shift.
During the EXAFS shell-by-shell fitting for the two references, the CNs were fixed at theoretical values according to their crystal structures.

Example 27: Catalytic Reduction of Aqueous Chlorate with MoO$_x$ Immobilized on Pd/C Chlorate (ClO$_3^-$) is an undesirable byproduct in the gigantic-scale Chlor-Alkali process, a heavily used chemical in various industrial and agricultural applications, and a toxic pollutant monitored by public water utilities. Catalytic reduction of ClO$_3^-$ into Cl$^-$ by H$_2$ is of great interest for both emission control and water purification, but platinum group metal catalysts are either sluggish or severely inhibited by halide anions. Here we report on the facile preparation, robust performance, and mechanistic discussion of a MoO$_x$—Pd/C catalyst for aqueous ClO$_3^-$ reduction. Under 1 atm H$_2$ and room temperature, the Na$_2$MoO$_4$ precursor is rapidly immobilized from aqueous solution onto Pd/C as a mixture of low-valent Mo oxides. The catalyst completely reduces ClO$_3^-$ into Cl$^-$, with a >19200 h$^{-1}$ turnover frequency for the oxygen atom transfer (OAT) on individual Mo sites. The addition of Mo to Pd/C not only enhances the catalytic activity for >40 folds but also provides strong resistance to concentrated salts. Reaction kinetics. X-ray spectroscopic characterizations, and comparative studies in a homogeneous solution or with other oxyanion substrates collectively suggest that the catalytic site for ClO$_3^-$ reduction is the surface-immobilized low-valent MoO$_x$ species. This work demonstrates a great promise of using earth-abundant metals to enable new functionalities of hydrogenation catalysts and innovate environmental and energy technologies.

Introduction

Catalytic reduction of the toxic chlorate (ClO$_3^-$) has significant values for both industrial sustainability and environmental protection. More than 4 million tons of KClO$_3$ are manufactured worldwide each year by the electrochemical Chlorate Process (Karlsson et al., Chemical reviews, 116 (5): 2982-3028, (2016); Group, I., Sodium Chlorate Market: Global Industry Trends, Share, Size, Growth, Opportunity and Forecast 2019-2024. (April 2019)). Heavy applications of chlorate in various industrial and agricultural applications (e.g., pulp bleaching, weed control, pyrotechnics, and water disinfection) leads to widespread environmental pollution (United States Environmental Protection Agency, EPA-810-R-16-013 (December 2016)) and emerging challenges for water systems. The World Health Organization (WHO) has proposed a guideline for mitigating the ClO$_3^-$ concentration below 0.7 mg L$^{-1}$ in drinking water (WHO/SDE/WSH/ 05.08/86 (2005)). The third Unregulated Contaminant Monitoring Rule (UCMR3) by the United States Environmental Protection Agency (USEPA) includes ClO$_3^-$ as a contaminant to be monitored by public water systems, with the Minimum Reporting Level at 0.02 mg L$^{-1}$. On the other hand, the global production of Cl$_2$ has reached over 70 million tons per year through the electrochemical Chlor-Alkali Process (Karlsson et al., Chemical reviews, 116 (5): 2982-3028, (2016)), where on average 1 kg of ClO$_3^-$ is generated per ton of Cl$_2$ produced (Ibl et al., Journal of The Electrochemical Society, 115 (7): 713-720, (1968); Landolt et al., Electrochimica Acta, 15 (7): 1165-1183. (1970); Brinkmann et al., Industrial Emissions Directive, 2010/75/EU (Integrated Pollution Prevention and Control). Luxembourg: Publications Office of the European Union, (2014); Macounová et al., Journal of The Electrochemical Society, 165 (14): E751-E758, (2018)). The undesirable ClO$_3^-$ byproduct has negative effects both on the manufacturing processes and to the environment upon emission (Brinkmann et al., Industrial Emissions Directive, 2010/75/EU (Integrated Pollution Prevention and Control), Luxembourg: Publications Office of the European Union, (2014): Lakshmanan et al., Water Science and Technology, 74 (12): 2819-2831, (2016)). Therefore, at least 70,000 tons per year of ClO$_3^-$ must be treated in Chlor-Alkali plants. Typical waste brines from Chlor-Alkali Process contain up to 10 g L$^{-1}$ of ClO$_3^-$ and up to 5 M of NaCl (Van Santen et al., U.S. Pat. No. 6,270,682; Brinkmann et al., Industrial Emissions Directive, 2010/75/EU (Integrated Pollution Prevention and Control), Luxembourg: Publications Office of the European Union, (2014); Lakshmanan et al., Water Science and Technology, 74 (12): 2819-2831, (2016)). Other emerging electrochemical technologies such as water splitting (Park et al., The Journal of Physical Chemistry C, 113 (18): 7935-7945, (2009)), wastewater treatment (Cho et al., Environmental science & technology, 48 (4): 2377-2384, (2014)), and direct HCl production from seawater desalination waste brine (Kumar et al., Nature Catalysis, 2 (2): 106. (2019)) also produce various levels of undesirable ClO$_3^-$ at the anode (Ibl et al., Journal of The Electrochemical Society, 115 (7): 713-720, (1968): Landolt et al., Electrochimica Acta, 15 (7): 1165-1183, (1970)). Therefore, an efficient and robust approach for ClO$_3^-$ reduction will be beneficial for a wide scope of industrial and environmental endeavors.

In Chlor-Alkali plants, the ClO$_3^-$ byproduct is treated by either disproportionation under acidic conditions (Eq. 1) or catalytic reduction by H$_2$ (Eq. 2):

$$ClO_3^- + 6H^+ + 5Cl^- \rightarrow 3H_2O + 3Cl_2 \quad (1)$$

$$ClO_3^- + 3H_2 \rightarrow Cl^- + 3H_2O \quad (2)$$

The disproportionation reaction requires >85° C., and pH 0 (i.e., 1 M of H$^+$) to achieve a partial (60-90%) removal of ClO$_3^-$. The pH adjustment involves large amounts of HCl and NaOH (Brinkmann et al., Industrial Emissions Directive, 2010/75/EU (Integrated Pollution Prevention and Control), Luxembourg: Publications Office of the European Union, (2014)). In comparison, the catalytic reduction allows an almost complete conversion of ClO$_3^-$ to Cl$^-$ and requires orders of magnitude less acid (i.e., pH 2-4) (Brinkmann et al., Industrial Emissions Directive, 2010/75/EU (Integrated Pollution Prevention and Control), Luxembourg: Publications Office of the European Union, (2014)). In particular, H$_2$ gas is produced in excess at the cathode of Chlor-Alkali Process: about 10% of H$_2$ is emitted to the atmosphere. Supported platinum group metal (PGM) catalysts have been examined; however, they exhibit limited activity and require high catalyst loadings to achieve a satisfying reaction rate (Van Santen et al., (2001); Kuznetsova et al., *Applied Catalysis A: General*, 427 8-15, (2012); Chen et al., *Chemical Engineering Journal*, 313 745-752, (2017)). Furthermore, PGM catalysts are severely inhibited by concentrated salts in brine (Van Santen et al., (2001); Kuznetsova et al., *Applied Catalysis A: General*, 427 8-15, (2012); Liu et al., *Environmental science & technology*, 49 (21): 12932-12940, (2015)). It is thus highly desirable to develop a $ClO_3^-$ reduction catalyst with the following features: (i) showing high activity and robustness, (ii) using an earth-abundant metal, and (iii) from a facile preparation.

Polyoxometalates (POMs) of Group 6 Mo and W have a series of fascinating redox properties, which has been used in various chemical catalysis (Wang et al., *Chemical reviews*, 115 (11): 4893-4962, (2015)). A century ago, molybdate was used as a homogeneous catalyst to reduce $ClO_3^-$ by $I^-$ for iodometric analysis (Kolthoff, *Zeitschr. f. anal. Chem.*, 60 448-457, (1921)). Molybdate was later used in the catalytic polarographic reduction of $ClO_3^-$ to determine Mo contents in metals (Kolthoff et al., *Journal of Electroanalytical Chemistry* (1959), 5 (1): 2-16, (1963)). For the reduction of $ClO_3^-$ in drinking water sources and brines, an ideal approach is to immobilize Mo species as an active site and utilize $H_2$ as a clean and readily available electron donor. In this example, by utilizing a Pd/C catalyst platform and conducting a series of material characterizations, we show that $Mo^{VI}$ POMs can be transformed into a heterogeneous $MoO_x$—Pd/C catalyst, which is highly active and robust for $ClO_3^-$ reduction under various challenging conditions.

Results and Discussion

Figures 12A, 12B, 12C, 12D, 12E, 12F, 12G:
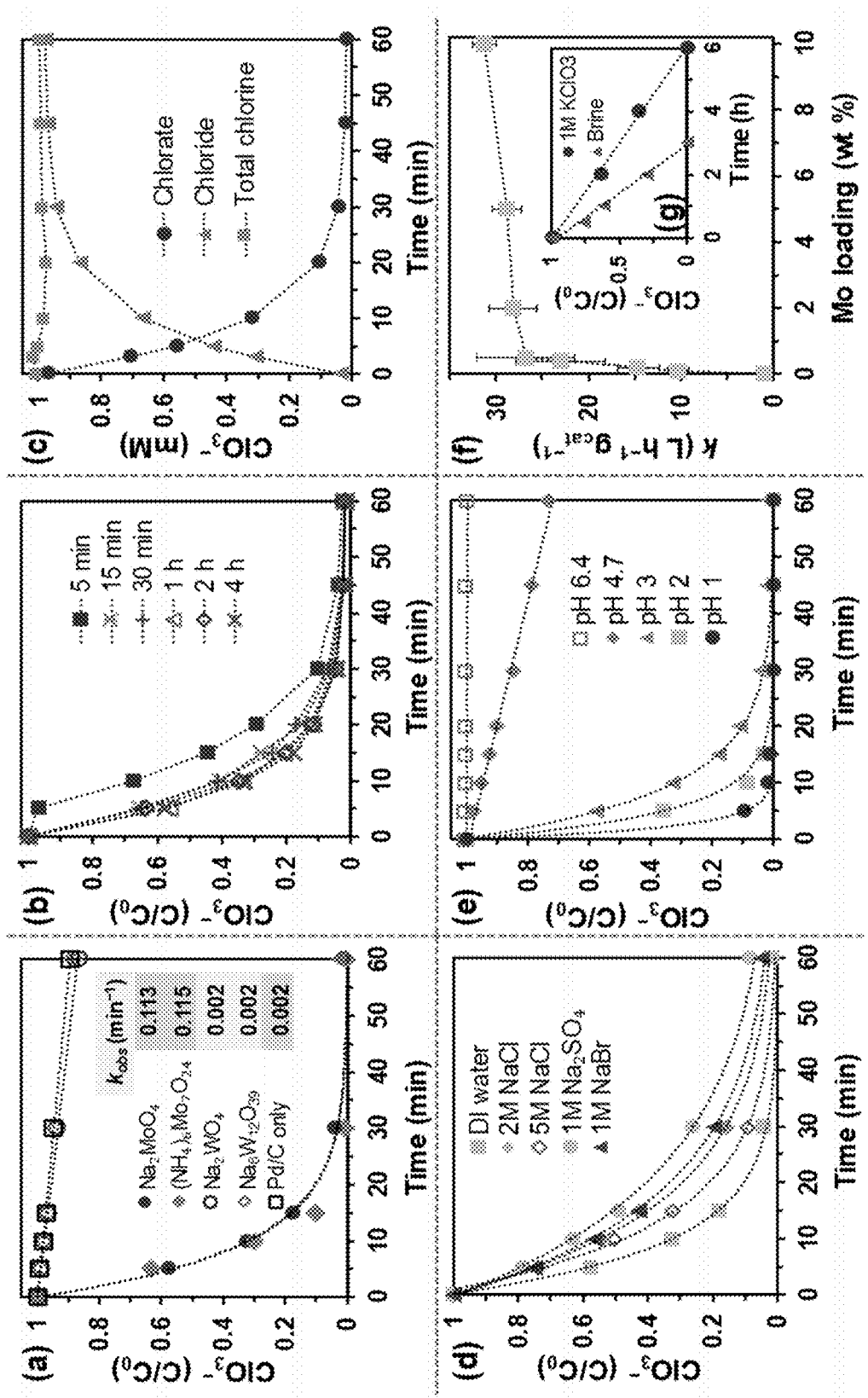
FIGS. 12A-12G.

Catalyst Preparation. We developed a simple and straightforward method to immobilize and activate Mo sites on Pd/C. Previous studies have identified that $Re^{VII}O_4^-$ can be fully absorbed on the Pd/C surface upon the reduction by Pd-activated $H_2$ into $Re^V$ and $Re^I$ oxides ($ReO_x$—Pd/C) (Choe et al., *Environmental science & technology*, 44 (12): 47164721, (2010); Choe et al., *The Journal of Physical Chemistry C*, 118 (22): 11666-11676, (2014)). We hypothesized that $Mo^{VI}$ POM precursors could be immobilized and reduced to lower-valent $MoO_x$ species on Pd/C. Hence, two $Mo^{VI}$ POM precursors were added into the water suspension of Pd/C at room temperature (20° C.), with 1 atm $H_2$ in the headspace of the reactor flask. After 2 h of stirring. 1 mM of $NaClO_3^-$ was added into the suspension to probe the catalytic activity. As shown in FIG. 12a, the addition of $Na_2Mo^{VI}O_4$ and $(NH_4)_6Mo^{VI}_7O_{24}$ provided high $ClO_3^-$ reduction activities. The pseudo-first-order rate constants are 55-fold higher than that of the original Pd/C. In comparison, the two $W^{VI}$ POM precursors, $Na_2W^{VI}O_4$ and $Na_6W^{VI}_{12}O_{39}$, provided little activity enhancement.

The immobilization and activation of Mo are both rapid. Inductively coupled plasma mass spectrometry (ICP-MS) analysis of the aqueous phase found >96% of Mo adsorbed into Pd/C within 5 min under air. X-ray photoelectron spectroscopy (XPS) characterization observed only $Mo^V$ in the Pd/C (see Characterization of Mo speciation section). After 1 atm $H_2$ was supplied to the water suspension of $Mo^{VI}$—Pd/C, high activity of $ClO_3^-$ reduction was observed. Prior to the addition of $NaClO_3$, if $Mo^{VI}$—Pd/C was exposed to $H_2$ for only 5 min, the profile of $ClO_3^-$ reduction had an induction period at the beginning (FIG. 12b). However, the exposure to $H_2$ for 15 min or longer eliminated this induction period, providing similar $ClO_3^-$ reduction kinetics. Thus, the reduction of adsorbed $Mo^{VI}$ by Pd-activated $H_2$ is required to enable $ClO_3^-$ reduction. This process is rapid by taking only 15 min at ambient pressure and temperature. Detailed characterizations of the lower-valent Mo species are provided in later sections.

Upon $H_2$ exposure for 15 min to 2 h, the Mo immobilization ratio was further increased to 99.9%, even for a 10 wt % loading of Mo element. Throughout the $ClO_3^-$ reduction, <0.3% of total Mo was detected by ICP-MS in the aqueous solution. Thus, the carbon support of Pd/C has a high capacity to accommodate $MoO_x$ species. It also appears that the $ClO_3^-$ reduction occurred on the heterogeneous catalyst-water interface. In contrast, the same Pd/C material provided poor sorption capacity for $WO_x$ species. ICP-MS analysis showed that only 24% of the added W (5 wt % if fully absorbed in Pd/C) was immobilized after $H_2$ exposure for 2 h. The reduced W species in solution showed a blue color, which faded within one minute after air exposure. Therefore, the reductive immobilization method applies to $Mo^{VI}$ POMs for the highly active $MoO_x$—Pd/C catalyst. In aqueous solutions, $Mo^{VI}$ POMs have dynamic speciations depending on pH. Both $Na_2MoO_4$ and $(NH_4)_6Mo_7O_{24}$ added in an acidic solution (e.g., pH 3) transform into a mixture of $Mo_8O_{26}^{4-}$. $H_3Mo_8O_{28}^{5-}$, $HMo_7O_{24}^{5-}$, $H_2Mo_6O_{21}^{4-}$, and other minor polymeric species (Oyerinde et al., *Inorganica Chimica Acta*, 361 (4): 1000-1007, (2008)). To avoid introducing the unnecessary $NH_4^+$, we used $Na_2MoO_4$ as the Mo precursor for the following experiments.

Catalyst performance. The $MoO_x$—Pd/C catalyst outperforms all reported PGM catalysts in terms of the activity for $ClO_3^-$ reduction and the robustness in concentrated brines. At 20° C., a loading of 0.2 g $L^{-1}$ catalyst in water achieved >99.9% reduction of 1 mM $ClO_3^-$ within 1 h (FIG. 12a). The rate constant is substantially higher than those of most PGM catalysts at the same or higher temperatures (Table 5). The mass balance between $ClO_3^-$ and $Cl^-$ throughout the reaction (FIG. 12c) indicates minimal accumulation of partially deoxygenated intermediates (e.g., $ClO_2^-$). In real-world situations, $ClO_3^-$ needs to be reduced in acidic and/or brine matrices, such as Chlor-Alkali waste brines (Kuznetsova et al., *Applied Catalysis A: General*, 427 8-15, (2012); Lakshmanan et al., *Water Science and Technology*, 74 (12): 2819-2831, (2016)), ion-exchange resin regeneration wastes (McAdam et al., *Separation and Purification Technology*, 62 (2): 264-272, (2008)), and HCl produced from waste brine electrolysis (Kumar et al., *Nature Catalysis*, 2 (2): 106, (2019)). Therefore, the performance of $MoO_x$—Pd/C catalyst was further challenged in solutions containing 2M and 5M NaCl. 1M $Na_2SO_4$, and 1M NaBr, respectively. All concentrated salts did not result in a significant activity loss (FIG. 12d and Table 5, entries 1-5). We note that $Br^-$ is a much stronger inhibitor than $Cl^-$ for $Pd^0$ and $Rh^0$ catalysts (Van Santen et al., (2001); Liu et al., *Environmental science & technology*, 49 (21): 12932-12940, (2015)). In our previous study, the same Pd/C was significantly inhibited by halide anions at low concentrations (Table 5, entries 8-12) (Liu et al., *Environmental science & technology*, 49 (21): 12932-12940, (2015)). Similarly, although a Rh/C catalyst exhibited high activity in a deionized water matrix (Table 5, entry 13) (Chen et al., *Chemical Engineering Journal*, 313 745-752, (2017)), the performance was significantly affected by $Cl^-$ and $Br^-$ (Table 5, entries 20-24) (Van Santen et al., U.S. Pat. No. 6,270,682). Although an Ir/C catalyst showed similar $ClO_3^-$ reduction kinetics to the $MoO_x$—Pd/C in concentrated brine (Table 5, entry 17 versus 7), the reaction temperature was much higher (70° C.).

TABLE 5

Performance of $ClO_3^-$ Reduction by $MoO_x$—Pd/C and Reported PGM Catalysts.

| Entry | Catalyst | Catalyst loading | pH | Temp | Initial $ClO_3^-$ concentration | Other salts added in solution | Time | $ClO_3^-$ removal ratio | $1^{st}$-order rate constant[a] (L h$^{-1}$ g$_{cat}^{-1}$) | Ref. |
|---|---|---|---|---|---|---|---|---|---|---|
| | | | | | $MoO_x$—Pd/C catalyst | | | | | |
| 1 | (5 wt % Mo | 0.2 g L$^{-1}$ | 3 | 20° C. | 84 mg L$^{-1}$ | DI[b] | 1 h | 99.9% | 33.9 | |
| 2 | 5 wt % Pd) | | | | (1 mM) | 2M NaCl | 1 h | 97% | 18.3 | |
| 3 | $MoO_x$—Pd/C | | | | | 5M NaCl | 1 h | 99.9% | 24.6 | |
| 4 | | | | | | 1M NaBr | 1 h | 95% | 16.5 | |
| 5 | | | | | | 1M Na$_2$SO$_4$ | 1 h | 91% | 13.5 | |
| 6 | (0.5 wt % Mo 5 wt % Pd) | 0.5 g L$^{-1}$ | 3 | 20° C. | 84,000 mg L$^{-1}$ (1M) | DI, KCl built up to 1M | 6 h | 99.7% | 0.33M h$^{-1}$ g$_{cat}^{-1c}$ | |
| 7 | $MoO_x$—Pd/C | | | | 14,280 mg L$^{-1}$ (0.17M) | 3.6M NaCl | 3 h | 99.8% | 0.11M h$^{-1}$ g$_{cat}^{-1c}$ | |
| | | | | | PGM catalysts | | | | | |
| 8 | 5 wt % Pd/C | 0.5 g L$^{-1}$ | 3 | 20° C. | 84 mg L$^{-1}$ (1 mM) | DI | 8 h | 96% | 0.79 | 17 |
| 9 | | | | | | 10 mM NaCl | 8 h | 81% | 0.41 | 17 |
| 10 | | | | | | 100 mM NaCl | 8 h | 49% | 0.17 | 17 |
| 11 | | | | | | 1M NaCl | 8 h | 43% | 0.14 | 17 |
| 12 | | | | | | 10 mM NaBr | 8 h | 42% | 0.13 | 17 |
| 13 | 5 wt % Rh/C | 0.5 g L$^{-1}$ | 3 | 20° C. | 84 mg L$^{-1}$ (1 mM) | DI | ¼ h | 99.3% | 46 | 15 |
| 14 | 5 wt % Ru/C | | | | | | 1 h | 43% | n.a.[d] | 15 |
| 15 | 5 wt % Pt/C | | | | | | 1 h | 14% | 0.33 | 15 |
| 16 | 1 wt % Ir/C | | | | | | 1 h | 45% | 1.2 | 15 |
| 17 | 5 wt % Ir/C | 2.5 g L$^{-1}$ | 3.8 | 70° C. | 22,000 mg L$^{-1}$ (0.26M) | 3.2M NaCl | ¾ h | 100% | 0.14M h$^{-1}$ g$_{cat}^{-1}$ | 16 |
| 18 | 0.5 wt % Rh/SiC | 0.5 g L$^{-1}$ | 4 | 70° C. | 1000 mg L$^{-1}$ (12 mM) | DI | 2 h | 85% | 1.9[e] | 11 |
| 19 | 0.5 wt % Pt/SiC | | | | | | 2 h | 90% | 2.3 | 11 |
| 20 | 0.5 wt % Rh/SiC | 0.5 g L$^{-1}$ | 2 | 50° C. | 1000 mg L$^{-1}$ (12 mM) | DI | 2 h | 35% | 0.43 | 11 |
| 21 | | | | | | 3.6M NaCl | 2 h | 10% | 0.11 | 11 |
| 22 | 0.5 wt % Rh/ZrO$_2$ | 2 g L$^{-1}$ | 4 | 70° C. | 1000 mg L$^{-1}$ (12 mM) | DI | 2 h | 89% | 0.55 | 11 |
| 23 | | | | | | 0.85M NaCl | 2 h | 45% | 0.15 | 11 |
| 24 | | | | | | 78 mM NaBr | 2 h | 27% | 0.079 | 11 |

[a]Normalized to the mass of whole catalyst (metal + support) for cross-comparison of catalysts with variable metal contents;
[b]Containing HCl or H$_2$SO$_4$ used for pH adjustment;
[c]Zero-order kinetics due to the concentrated $ClO_3^-$ substrate, this reaction used the same high flow rate of H$_2$ (0.1 L per minute) as used for entries 18-24.
[d]The reaction did not follow first- or zero-order kinetics and the catalyst showed significant loss of activity during reaction;
[e]First-order rate law reasonably assumed for initial $ClO_3^-$ concentration at 12 mM (entries 18-24).
[f]Ref. 17 refers to Liu, J. et al., *Environmental science & technology.* 2015, 49, (21), 12932-12940; Ref. 15 refers to Chen, X. et al., *Chemical Engineering Journal.* 2017, 313, 745-752; Ref. 16 refers to Kuznetsova, L. I. et al., *Applied Catalysis A: General* 2012, 427, 8-15; Ref. 11 refers to Van Santen et al., U.S. Pat. No. 6,270,682.

Higher rates of $ClO_3^-$-reduction were observed at lower pH (FIG. 12e), suggesting that a proton-assisted mechanism is necessary for the deoxygenation of $ClO_3^-$. We note that the pH dependence may be attributed to the reactivities of active sites rather than the surface charge of the catalyst support (Chen et al., *Chemical Engineering Journal*, 313 745-752, (2017); Clark et al., *ACS Catalysis*, 10 (1): 494-509, (2019)). Instead, the protonation of an O atom in the $ClO_3^-$ that is bound by the lower-valent Mo may assist the structural distortion (Liu et al., *Inorganic Chemistry*, 23 (21): 3418-3420, (1984)). This structural change lowers the LUMO of Mo-bound $ClO_3^-$ and thus promotes the electron transfer from Mo to Cl. Alternatively, the proton possibly provides an ancillary hydrogen bonding (Hurley et al., *Environmental science & technology*, 41 (6): 2044-2049, (2007)) to facilitate the coordination of $ClO_3^-$ to Mo. Thus, the $MoO_x$—Pd/C catalyst described herein can be highly robust in reducing $ClO_3^-$ in acidic brines (Kumar et al., *Nature Catalysis*, 2 (2): 106, (2019)).

The first-order rate constant for 1 mM $ClO_3^-$ reduction showed an apparent increase with respect to Mo loading from 0 to 0.5 wt % and then plateaued at higher Mo loadings (FIG. 12f). Further discussion on the effects of Mo loading is provided in the Mechanistic Insights section. Because the build-up of Cl$^-$ is not an issue for $MoO_x$—Pd/C, we further challenged the catalyst with 0.5 wt % Mo loading to treat highly concentrated 1M of $ClO_3^-$ at pH 3.0. The reaction was rapid and completed within 6 h (FIG. 12g, see inset). A zero-order kinetics was observed, and the reaction rate became controlled by the H$_2$ availability. Assuming the Mo sites reacted with all $ClO_x^-$ (x=3, 2, and 1) substrates, at pH 3 the corresponding turnover number (TON) for each Mo atom has already reached 115,130 within 6 h (i.e., Turnover frequency (TOF)=19,200 h$^{-1}$). We note that if not all immobilized Mo atoms involve in the surface reaction, the actual TOF on reactive Mo sites is expected to be even higher than 19,200 h$^{-1}$. As shown in FIG. 12e, much higher TOF can also be expected at pH<3.

We prepared a solution mimicking a real Chlor-Alkali waste brine sample (0.17 M of $ClO_3^-$ in 3.6 M of NaCl) (Van Santen et al., (2001)). A 0.5 g L$^{-1}$ loading of $MoO_x$—Pd/C catalyst achieved >99.8% reduction of $ClO_3^-$ in 3 hours (FIG. 12g and Table 5, entry 7). To examine the catalyst stability and reusability, we added multiple spikes of 180 mM $ClO_3^-$, for up to 20 spikes (the final product thus became 3.6 M NaCl), into the suspension of 0.5 g L$^{-1}$ catalyst. The built-up of concentrated Cl$^-$ only resulted in slight activity inhibition (zero-order rate constants shown in Table 6). The Mo and Pd contents in catalysts collected after 5, 10, and 20 spikes were rather consistent (Table 6), indicating negligible leaching of metals into the aqueous phase. A catalyst recycling operation using "filtration-collection-redispersion" resulted in a slightly decreased performance, most probably due to the loss of a non-recoverable fraction of catalyst on the filter paper. Therefore, the reductively immobilized $MoO_x$ species in Pd/C showed high activity, robustness, and stability for catalytic $ClO_3^-$ reduction.

TABLE 6

Metal Contents in the Freshly Prepared and Used $MoO_x$—Pd/C Catalysts.[a]

| Catalyst Sample | Mo Content | Pd Content | Mo wt %: Pd wt %[b] | Zero-order initial rate constant[c] (M h$^{-1}$ g$_{cat}^{-1}$) |
|---|---|---|---|---|
| Fresh catalyst | 4.48% | 5.73% | 0.782 | 0.271 (in DI water) |
| After 5 spikes | 4.38% | 5.51% | 0.795 | 0.186 (in 0.9M NaCl)[d] |
| After 10 spikes | 4.19% | 5.61% | 0.747 | 0.141 (in 1.8M NaCl)[d] |
| After 20 spikes | 4.39% | 5.70% | 0.771 | 0.130 (in 3.6M NaCl)[d] |

Figure 15:
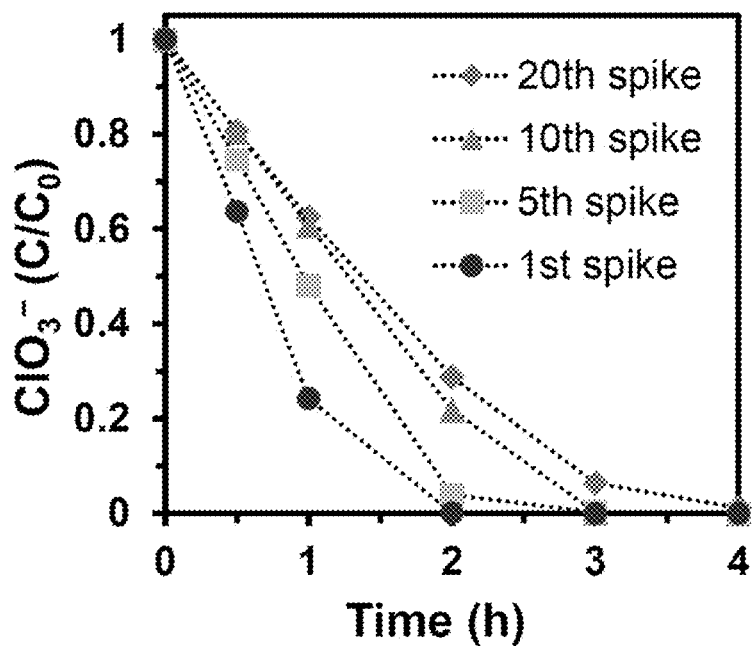
FIG. 15. Multiple-spike experiment, the single batch reactor was added a total of 20 spikes of 180 mM $NaClO_3$, so a total of 3.6M $NaClO_3$ that was completely reduced into 3.6 M NaCl. The catalyst loading is 0.5 g/L, pH=3 by HC adjustment at the very beginning. The pH did not change during the reaction because no acid is consumed. For each spike, the reaction was allowed for at least 4 h so that each spike of chlorate was completely reduced before the next spike. The reaction became slightly slower for the later spikes because of the slow accumulation of concentrated NaCl. This figure is a strong support for the catalyst robustness. The data in Table 6 shows that no metal leached from the catalyst after the long time use under high substrate concentration and very high salt concentrations.
Figure 16:
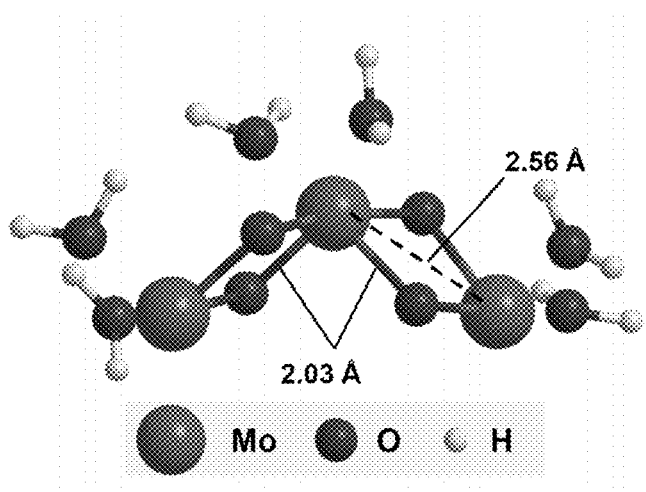
FIG. 16. Proposed Mo local structure based on EXAFS data fit.

[a]The nominal content for Mo and Pd elements in the freshly prepared catalyst are both 5 wt %. The calculated Mo content assuming the addition of "$MoO_4$" in Pd/C is ~4.62%. Each spike introduced 180 mM $ClO_3^-$. At least 4 h of reaction (1 atm $H_2$, 20° C., initial pH = 3 by adding 1 mM HCl) was allowed for each spike. The catalyst powder was collected in an anaerobic glove bag by filtering off the aqueous solution, rinsing the catalyst powder cake on the filter paper with DI water, and drying in a 100° C. sand bath.
[b]Because the Mo:Pd mass content ratio is rather consistent, the fluctuation of the absolute values of Mo and Pd contents in these samples should either be within the range of system errors of elemental analysis for heterogeneous materials or be attributed to the residual NaCl salt in the dried catalyst samples.
[c]From the linear fitting of all data points with $C/C_0$ >0.2 (see FIG. 15 for details).
[d]The NaCl is generated from the reduction of $ClO_3^-$ from all previous spikes (180 mM each).

Figures 13A, 13B, 13C, 13D, 13E, 13F:
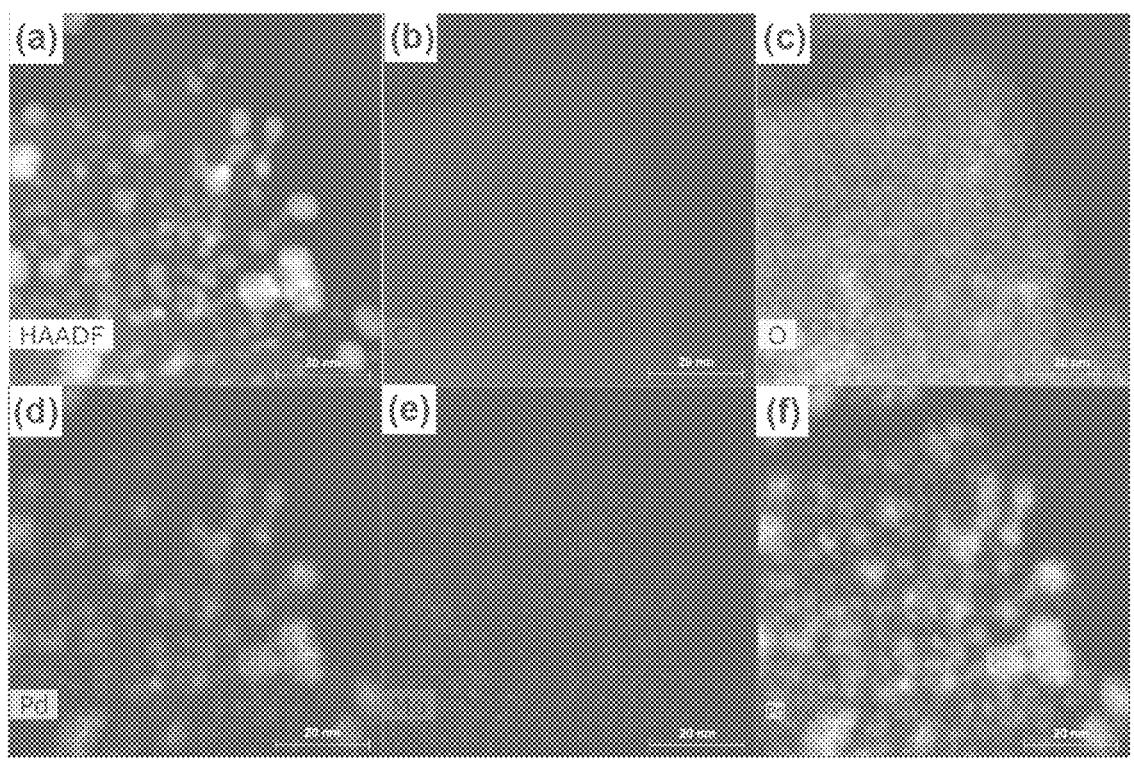
FIGS. 13A-13F.

Characterization of Mo speciation. Because the reductively immobilized Mo species are sensitive to air, we collected the $MoO_x$—Pd/C catalyst samples in anaerobic glove bag. ICP-MS analysis of the filtrate solutions detected no Pd and <0.1% of the total Mo suggesting that most metals stayed inside the carbon support. High-angle annular dark field scanning transmission electron microscopy (HAADF-STEM) observed Pd nanoparticles with 1-8 nm sizes (FIG. 13a). Individual elements of C, O, Pd, and Mo were observed by the energy-dispersive X-ray (EDX) elemental mapping (FIGS. 13b-13e). Mo was present throughout the catalyst particle rather than preferred aggregation on or near Pd nanoparticles (FIG. 13f).

Figures 14A, 14B, 14C, 14D, 14E, 14F:
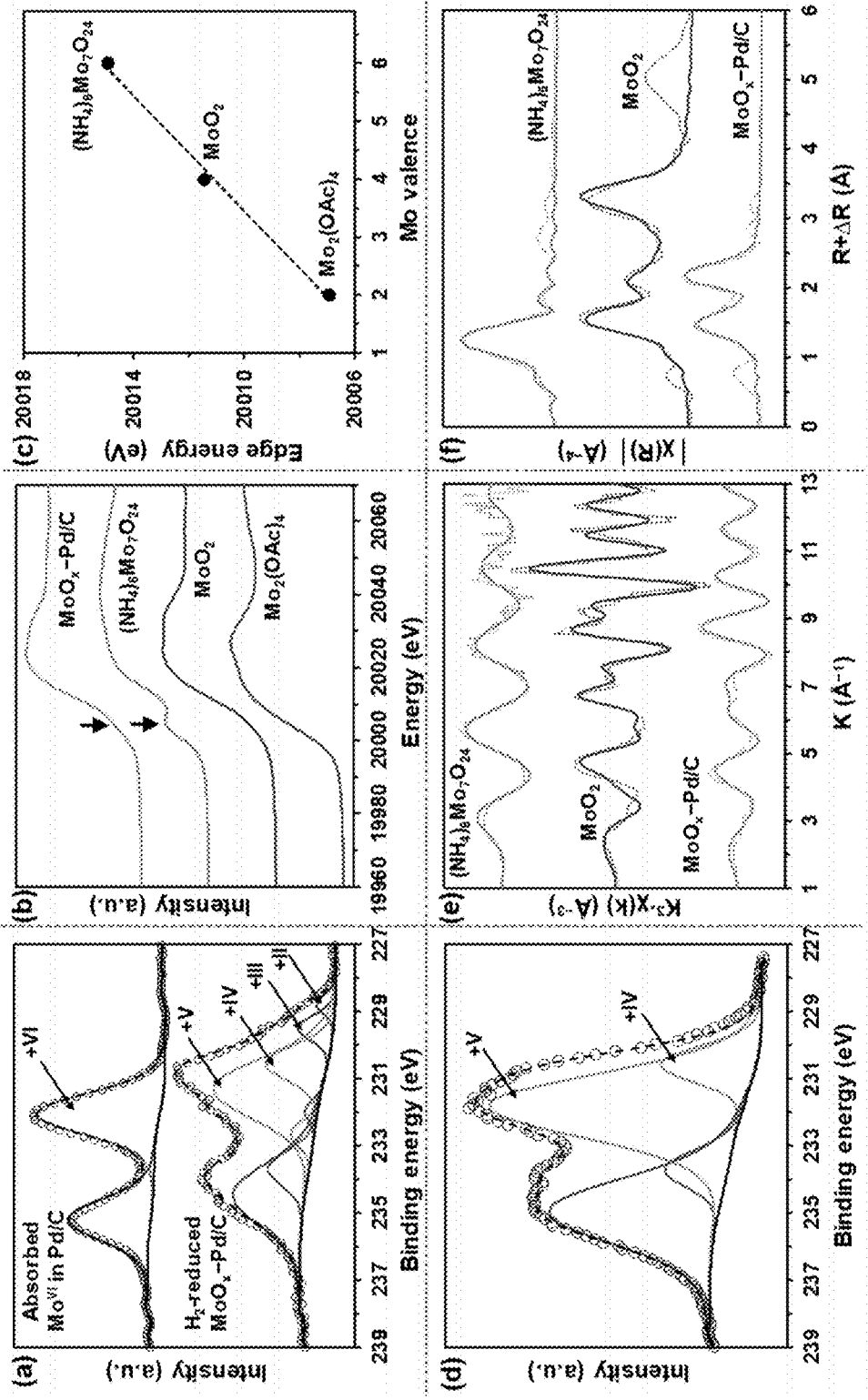
FIGS. 14A-14F.

XPS characterization of the $H_2$-reduced $MoO_x$—Pd/C catalyst (transferred in anaerobic sample holder) identified $Pd^0$ with the $3d_{5/2}$ binding energy (BE) at 335.2 eV and various oxidation states of Mo (FIG. 14a). Because the $MoO_x$—Pd/C catalyst and the reference chemicals such as $Mo^{II}_2(OAc)_4$ contain different carbon species (i.e., graphitic carbon versus acetate), we blended $Nb_2O_5$ powders with all XPS samples as the internal standard for BE calibration (Nb $3d_{5/2}$ BE set to 207.6 eV (Sanz et al., *Journal of the Less Common Metals*, 92(2): 317-327, (1983)). Upon deconvoluting the spectrum for $MoO_x$—Pd/C, we identified four Mo doublets with $3d_{5/2}$ BE of 231.3, 230.5, 229.4, and 228.7 eV, respectively. The two dominant $3d_{5/2}$ peaks with BE of 231.3 and 230.5 eV closely match literature values for $Mo^V$ and $Mo^{IV}$ species. The former was generated from a hydrothermal synthesis of a Keggin POM from $Na_2Mo^{VI}O_4$ (Haushalter et al., *Chemistry of materials*, 4(1): 31-48, (1992), Iyer et al., *Inorganic chemistry*, 531) 653-60, (2013)) and the latter was generated from a direct reduction of $Mo^{VI}O_3$ by $H_2$ under 400° C. (Choi et al., *Applied Surface Science*, 93 (2); 143-149. (1996)). The $Mo^V$ and $Mo^{IV}$ in $MoO_x$—Pd/C catalyst should be generated by the partial and full hydrogenation of one oxo bond in $Mo^{VI}$ POM precursors (Choi et al., *Applied Surface Science*, 93 (2): 143-149, (1996)). Due to the wide range of BE values for Mo species in lower oxidation states, $Mo^{II}_2(OAc)_4$ was used as a reference. The XPS spectrum revealed two Mo oxidation states on the surface of $Mo^{II}_2(OAc)_4$. The high BE peak (232.3 eV) is characteristic of $Mo^{VI}$, indicating the partial oxidation on the surface of the as-received $Mo^{II}_2(OAc)_4$ powders. The $3d_{5/2}$ BE of the $Mo^{II}$ is 229.0 eV, which is close to the lowest BE (228.7 eV) observed in $MoO_x$—Pd/C. The remaining peak (BE 229.4 eV) in the catalyst is thus assigned as $Mo^{III}$, although a reference chemical for oxygen-coordinated $Mo^{III}$ was not accessible. Similar to the formation of $Mo^V$ and $Mo^{IV}$ from $Mo^{VI}$, the formation of the less abundant $Mo^{III}$ and $Mo^{II}$ can be attributed to the deeper but less favorable reduction of $Mo^{IV}$.

To further probe the valance of Mo species in the bulk $MoO_x$—Pd/C sample, we conducted Mo K-edge X-ray absorption near-edge structure (XANES) spectroscopic characterization. A linear relationship (Wang et al., *Journal of the American Chemical Society*, 134 (10): 4918-4924, (2012)) was established between the Mo oxidation state and the Mo K-edge energy (i.e., the energy where the intensity reaches 60% of the absorption maxima) of three references, $(NH_4)_6Mo^{VI}_7O_{24}$, $Mo^{IV}O_2$, and $Mo^{II}_2(OAc)_4$ (FIG. 14b). With this empirical relationship and the measured edge energy of 20012 eV for $MoO_x$—Pd/C (FIG. 14c), the average valence of Mo in the bulk sample is calculated as 4.4. This value roughly agrees to the XPS characterization result, where a mixed Mo valence from +II to +V were observed at the surface layer with +V and +IV being dominant. Moreover, the XANES spectrum of $(NH_4)_6Mo^{VI}_7O_{24}$ contains a pre-edge peak at 20003 eV. The presence and absence of this characteristic pre-edge peak indicate the formation and elimination of $Mo^{VI}$=O bonds, respectively (Jalilehvand et al., *Inorganic chemistry*, 42 (18): 5531-5536, (2003): Wang et al., *Journal of the American Chemical Society*, 134 (10): 49184924, (2012)). The significantly weakened pre-edge peak in $MoO_x$—Pd/C indicates the reduction of Mo=O bonds in the $Mo^{VI}$ POM precursors.

To determine whether the immobilized Mo species exist as oxide cluster polymers or as monomers (e.g., stabilized by complexation with functional groups on the carbon surface), we collected the $k^3$-weighted Mo K-edge extended X-ray absorption fine structure (EXAFS) spectra and Fourier transforms for the $MoO_x$—Pd/C sample and references (FIGS. 14e and 14f). The $MoO_x$—Pd/C spectrum contained two main peaks at 1.5 and 2.2 Å (R+ΔR). Shell-by-shell fitting (Table 7) shows that they correspond to two atomic shells, $Mo^{IV}$—O (2.03 Å) and $Mo^{IV}$—$Mo^{IV}$ (2.56 Å), respectively (Brandt et al., *Acta Chem. Scand*, 21 (3): (1967)). Similar EXAFS spectra have been reported in a study on the complete and reversible 24-electron reduction of a well-defined solid-state $[PMo^{VI}_{12}O_{40}]^{3-}$ into $[PMo^{IV}_{12}O_{40}]^{27-}$ on a battery reaction platform (Wang et al., *Journal of the American Chemical Society*, 134 (10): 4918-4924, (2012)), where the Mo—Mo distance was shortened from 3.4 Å to 2.6 Å upon the reduction of all $Mo^{VI}$ into $Mo^{IV}$. Since $Mo^{VI}$ precursors are transformed into a mixture of multiple POM structures in aqueous media and XPS characterization also observed four oxidation states of Mo at the surface layer, the EXFAS fitting here represents the overall bonding environment for the bulk $MoO_x$—Pd/C sample. The overall coordination number (CN) of 6.1 for Mo—O shell indicates that a majority of reduced Mo atoms are in the octahedral $MoO_6$ coordination structure. The overall CN of 1.7 for Mo—Mo shell confirms the polymeric structures for reductively immobilized Mo species. A majority of Mo atoms have two neighboring Mo atoms at the distance of ~2.56 Å. Furthermore, the lack of Mo—Mo pairs with longer interatomic distances as observed in $Mo^{IV}O_2$ reference (>3 Å, FIG. 14f and Table 7) suggests that the spatial arrangement of Mo atoms in the $MoO_x$—Pd/C catalyst is different from that in $Mo^{VI}O_2$. The latter has a three-dimensional distorted rutile structure with alternating short (2.51 Å) and long (3.11 Å) $Mo^{IV}$—$Mo^{IV}$ distances (Brandt et al., *Acta Chem. Scand*, 21 (3): (1967)). The fitting also detects a weak atomic shell at 1.67 Å, which can be assigned to the $Mo^{IV}$=O bond as observed in $(NH_4)_6Mo^{VI}_7O_{24}$ reference (1.74 Å, Table 7). Thus, a small fraction of immobilized Mo remained in +VI valence, but it was not observed by XPS characterization on the catalyst surface. The consideration of a Mo—Pd shell yielded poor data fitting, suggesting the lack of direct bonding between the two metals.

TABLE 7

Mo K-edge EXAFS Shell-by-shell Fitting Parameters of $MoO_x$—Pd/C and References.

| Sample | Shell | $CN^a$ | $R (\text{Å})^b$ | $\sigma^2 (\text{Å}^2)^c$ | $\Delta E (eV)^d$ | R-factor |
|---|---|---|---|---|---|---|
| $(NH_4)_6Mo_7O_{24}$ | Mo—O | 4 | 1.74 (0.01) | 0.004 (0.002) | −4.0 (3.3) | 0.012 |
| $MoO_2$ | Mo—O | 6 | 1.99 (0.01) | 0.002 (0.001) | −1.4 (2.0) | 0.023 |
| | Mo—Mo | 1 | 2.52 (0.01) | 0.001 (0.001) | | |
| | Mo—Mo | 1 | 3.12 (0.01) | 0.002 (0.001) | | |
| | Mo—Mo | 8 | 3.70 (0.01) | 0.004 (0.001) | | |
| $MoO_x$—Pd/C | Mo—O | 0.4 (0.3) | 1.67 (0.04) | 0.002 | −4.1 (2.9) | 0.030 |
| | Mo—O | 6.1 (1.9) | 2.03 (0.02) | 0.010 (0.004) | | |
| | Mo—Mo | 1.7 (0.6) | 2.56 (0.01) | 0.005 (0.002) | | |

$^a$Coordination number;
$^b$Interatomic distance;
$^c$Debye-Waller factor;
$^d$Energy shift. During the EXAFS shell-by-shell fitting for the two references, the CNs were fixed at theoretical values according to their crystal structures.

Mechanistic Insights. Since <0.3% of Mo was detected in the aqueous phase throughout the $ClO_3^-$ reaction, it appears that the catalytic site is surface-immobilized and $H_2$-reduced $MoO_x$ species on the carbon support. To further rule out the possibility that the reactive site is dissolved Mo in aqueous solution, we conducted control reactions without involving Pd/C or $H_2$ in the gas-water-solid three-phase system. In the first experiment, the use of $Na_2Mo^{VI}O_4$ and $H_2$ (without Pd/C) did not achieve any $ClO_3^-$ reduction, indicating the critical role of Pd nanoparticles in harvesting electrons from $H_2$. In another experiment, the $Na_2Mo^{VI}O_4$ solution was heated with 6.5 equivalents of hydrazine at pH 3 and 70° C. This system has been reported to reduce $Mo^{VI}$ in aqueous solution (Maksimovskaya, *Polyhedron*, 65 54-59, (2013)). XPS characterization of the residue (slowly dried at 70° C.) observed two Mo $3d_{5/2}$ peaks at 231.5 and 230.4 eV (FIG. 14d), which are readily assigned as $Mo^V$ and $Mo^{IV}$, respectively. However, the solution containing both reduced Mo species and excess hydrazine did not show any $ClO_3^-$ reduction activity, even after 24 h at 70° C. Therefore, dissolved Mo species do not react with $ClO_3^-$. The structural and reactivity differences of the reduced Mo species in solution and on carbon support warrant further investigation. Nonetheless, all kinetic and characterization results collectively confirm the heterogeneous nature of the $MoO_x$—Pd/C catalyst. Besides, the change of reaction kinetics from zero-order at high $ClO_3^-$ concentrations to first-order at low $ClO_3^-$ concentrations (FIG. 12) can be readily explained by the Langmuir-Hinshelwood mechanism for heterogeneous catalysis (Wee et al., *Journal of hazardous materials*, 155 (1-2); 1-9, (2008)).

Figure 17:
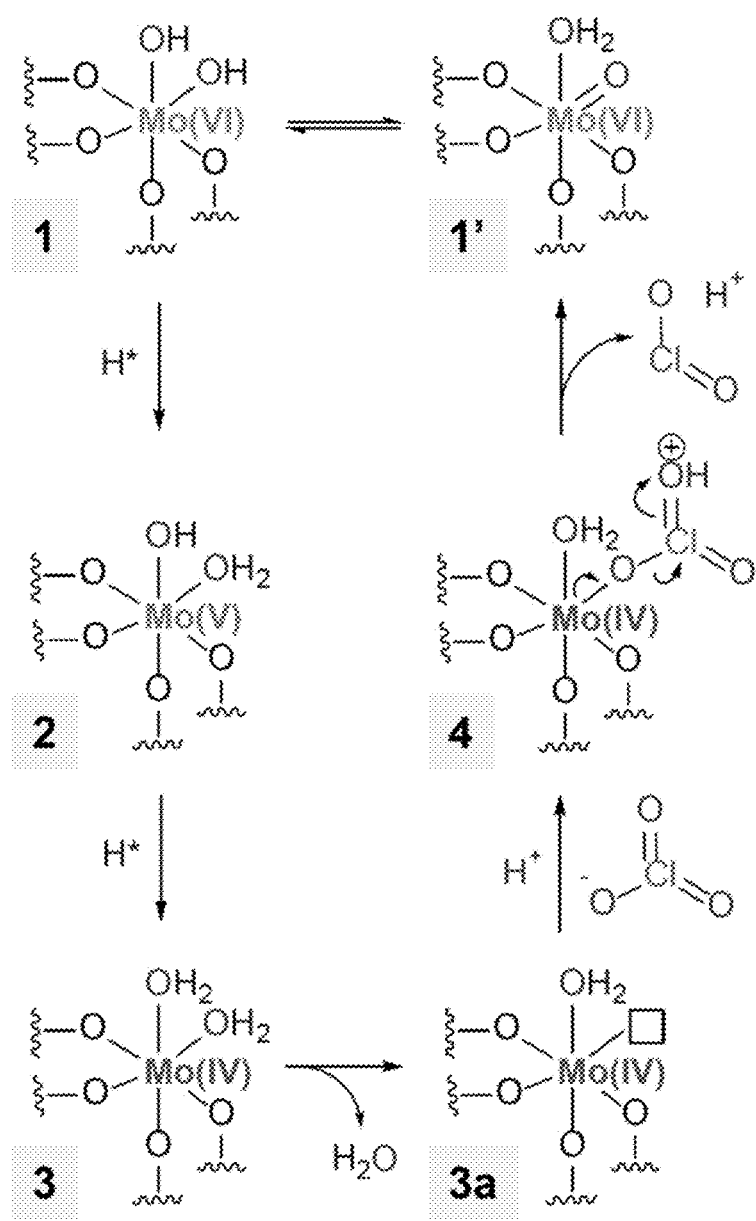
FIG. 17. Proposed catalytic reaction mechanism.

Based on the spectroscopic findings, we propose a representative catalytic cycle in Scheme 1 (see FIG. 17). The $Mo^{VI}$POM precursor (multi-acid form 1, in equilibrium with the oxo-$Mo^{VI}$ structure 1') is immobilized onto the carbon support and undergoes the reduction of $Mo^{VI}$=O to $Mo^V$—OH (2). The electron comes from Pd-activated $H_2$. A further one-electron reduction generates $Mo^{IV}$—$OH_2$ (3). The dissociation of $H_2O$ (3a) allows the coordination between the $Mo^{IV}$ center and a $ClO_3^-$ (4), followed by a two-electron oxygen atom transfer (OAT) reaction, resulting in the formation of $Mo^{VI}$=O and the dissociation of $ClO_2^-$. The $H^+$ is necessary to facilitate OAT from $Cl^-$ to Mo. The daughter products $ClO_2^-$ and $ClO^-$ have much higher reactivity than $ClO_3^-$ (Liu et al., *ACS Catalysis*, 5 (2): 511-522, (2014)). Although Pd nanoparticles can also rapidly reduce the daughter products, the more favorable site should still be the reduced Mo because Pd nanoparticles have been largely covered by $MoO_x$ (see below). Therefore, a complete reduction of $ClO_3^-$ into $Cl^-$ involves up to three OAT redox cycles of Mo. We highlight that the reaction with $ClO_x^-$ should involve the transfer of an oxygen atom to the Mo cluster. Thus, this process is different from the direct electron transfer with the solid state $[PMo_{12}O_{40}]^{x-}$ structure, which only alters the bond distance within the intact Keggin cluster (Wang et al., *Journal of the American Chemical Society*, 134 (10): 4918-4924, (2012)). Since the average Mo valence in the $H_2$-reduced bulk $MoO_x$—Pd/C is 4.4, we propose that the primary catalytic mechanism is the $Mo^{VI}/Mo^{IV}$ redox cycling. This Mo redox pair for OAT has been established by bioinorganic chemistry studies (Sugimoto et al., *Chemical Society Reviews*, 37 (12): 2609-2619, (2008)), including the reduction of nitrate with biomimetic Mo complexes (Elrod et al., *Inorganic chemistry*, 57 (5): 2594-2602, (2018)). Other redox cycles such as $Mo^{IV}/Mo^{II}$ and $Mo^V/Mo^{III}$ may also participate in the catalysis. The $Mo^{IV}/Mo^{II}$ cycle has been employed for OAT from $CO_2$ and $N_2O$ (Reeds et al., *Journal of the American Chemical Society*, 133 (46): 18602-18605, (2011)). The $Mo^V/Mo^{III}$ cycle has been observed for OAT from sulfoxide to phosphine (Schindler et al., *Organometallics*, 37 (23): 4336-4340, (2018)). The direct reaction between oxyanions and $Mo^{II}$ or $Mo^{III}$ has not been confirmed and warrant further studies. At the water-catalyst heterogeneous interface, the highly oxophilic reduced Mo species can be readily generated from $Mo^{VI}$ POMs by Pd-catalyzed hydrogenation under ambient temperature and pressure. The Mo sites exhibit excellent binding affinity and unprecedentedly high reactivity with $ClO_3^-$, because common anions such as $Cl^-$, $Br^-$, and $SO_4^{2-}$ in three orders-of-magnitude higher concentrations do not have significant inhibition on the catalyst activity.

The findings further contribute to the understanding of the redox transformation of $Mo^{VI}$ POMs added to PGM hydrogenation catalysts. In a recent study on catalytic cyclohexane oxidation with an $O_2$—$H_2$ mixture (Kuznetsova et al., *Kinetics and Catalysis*, 58 (5); 522-532, (2017)), the addition of $PMo^{VI}_{12}O_{40}^{3-}$ into a Pt/C suspension in acetonitrile achieved a partial absorption. Under an $H_2$ atmosphere at 35° C., the reduction of four of the twelve $Mo^{VI}$ to $Mo^V$ (forming $PMo^{VI}_8Mo^{IV}_4O_{40}^{7-}$) was observed. The deeper reduction of $Mo^{VI}$ POMs derived from $Na_2MoO_4$ in our study suggests the critical role of the POM structures in determining the extent of the absorption onto support materials and of the valence change upon hydrogenation.

The absorption of Mo POMs reduced both the BET surface area and the Pd surface area (Table 8). To estimate the coverage of $MoO_x$ species on the carbon surface, one could use a simplified estimation that each $MoO_x$ unit is 6-coordinate and takes a square area with a length of O—Mo—O. Since the atomic radius of O atom is ~60 μm and the Mo—O bond length is ~201 pm (Table 7), the corresponding length of O—Mo—O is (60+201)×2=522 μm. Thus, a single layer of $MoO_x$ at the contents at 0.5, 5, and 10 wt % of one gram of carbon support are calculated to take 8.6, 86, and 171 $m^2$, respectively. It follows that the carbon support has a sufficient surface area to accommodate a single-layer coverage of $MoO_x$. Interestingly, the calculated results roughly agree with the decreased BET surface areas in comparison to the original Pd/C. However, the similarly decreased pore volume with increased Mo contents and a constant average pore size at 3.1-3.2 nm in all catalyst samples suggest that the loss of BET surface area is probably attributed to the blocking of pores in a wide size range by the immobilized $MoO_x$.

TABLE 8

Physisorption and Chemisorption Data for $MoO_x$—Pd/C Catalysts with Different Mo Loadings.

| Sample | Surface Area ($m^2 g_{cat}^{-1}$) | Pore Volume ($cm^3 g_{cat}^{-1}$) | Average Pore Size (nm) | Pd Surface Area ($m^2 g_{cat}^{-1}$) |
|---|---|---|---|---|
| Pd/C | 857.2 | 0.67 | 3.11 | 6.85 |
| 0.5 wt %[a] Mo—Pd/C | 844.8 | 0.68 | 3.20 | 5.69 |
| 5 wt %[a] Mo—Pd/C | 689.0 | 0.54 | 3.12 | 2.29 |
| 10 wt %[a] Mo—Pd/C | 675.6 | 0.53 | 3.14 | 1.08 |

[a]Nominal Mo loadings based on the mass of Mo element versus the mass of Pd/C.

We propose that the surface-immobilized $MoO_x$ species and Pd nanoparticles play separate roles (OAT with $ClO_x^-$ and activation of $H_2$, respectively) rather than POM-enhanced activity of Pd nanoparticles for the reduction of oxyanions (Wang et al., *Chemical Society Reviews*, 41 (22): 7479-7496, (2012)). The Pd/C catalyst also showed activity for the reduction of bromate ($BrO_3^-$)(Chen et al., *Chemical Engineering Journal*, 313 745-752, (2017)) and nitrate ($NO_3^-$) (Huo et al., *Applied Catalysis B: Environmental*, 211 188-198, (2017)). However, in comparison to the original Pd/C the corresponding $MoO_x$—Pd/C catalyst showed a very similar activity for $BrO_3^-$ reduction and a lower activity for $NO_3^-$ reduction. Therefore, the addition of $MoO_x$ in Pd/C did not increase the "intrinsic" activity of Pd nanoparticles. Instead, the results with $BrO_3^-$ and nitrate $NO_3^-$ suggest the unique selectivity of reduced Mo species toward $ClO_3^-$. Besides, the EDX elemental mapping (FIG. 13f) and the poor EXAFS fitting considering the Mo—Pd bonding do not support a close interaction between the two metals.

Examples of synthesis of catalysts with various combinations of metal oxides, ligands, and hydrogenation metals on support and their benefits are hereafter reported and are intended to be illustrative of the embodiments of the disclosure but are not intended to limit the scope or underlying principles in any way.

Example 28: Synthesis of a Catalyst Based on Molybdenum Oxides, 4,4'-diamino-2,2'-bipyridine, and Pd on a Carbon Support The preparation method described for preparing $Na_2MoO_4$·L-Pd/C was applied to preparing catalysts for the molybdenum oxide precursors. A 3 g $L^{-1}$ stock solution of $Na_2MoO_4$ was prepared by dissolving 150 mg $Na_2MoO_4$ into 50 ml DI water. 20 mg of 4,4'-diamino-2,2'-bipyridine was dissolved in 50 ml DI water to prepare a 0.4 g $L^{-1}$ stock solution. A typical 0.5 g $L^{-1}$ bimetallic heterogeneous catalyst (of 5 wt. % Mo) was prepared in a 50 ml pear shaped flask by consecutively adding 25 mg of Pd/C (5 wt. % Pd), 0.9 ml of $Na_2MoO_4$ stock solution (containing 1.25 mg Mo), 6.08 ml of ligand stock solution (ligand to Mo molar ratio of 1), and a magnetic stir bar to 50 ml of DI water. Then, the pH of the resulting solution was adjusted to 3.0 with 2N $H_2SO_4$. The flask was then sealed with a rubber stopper and sonicated for 1 minute.

The aqueous suspension was then stirred at 1000 rpm under a reducing atmosphere of 1 atm, $H_2$ gas (supplied by two 16-gauge diameter, 6-in. length needles as gas inlet and out for the flask, respectively) for at least 30 minutes to allow the transfer and immobilization of Mo species from bulk phase into the activated carbon matrix supplied with the Pd/C. Although the carbon supplied with the Pd/C was utilized, a separate carbon matrix can be utilized.

Generally, hydrogenation metals on supports (powder), metal oxides (stock solutions), ligands (stock solutions), and Milli-Q water (pH=3) are added sequentially into a round-bottom flask. The sequence of adding metal oxides and ligands does not have a significant effect on the catalytic activity. The mixture will be shaken and sonicated for 1 min, and then stirred for at least 30 mins with 1 atm $H_2$ sparging to allow the transfer and immobilization of active species from bulk phase into the support matrix.

Examples 29-54: Synthesis of a Catalyst Based on Molybdenum Oxides, 2,2'-bipyridine, and Pd on a Carbon Support For the following catalysts, the preparation method was prepared in the same manner as Example 28 but except for the following modifications. Instead of 20 mg of 4,4'-diamino-2,2'-bipyridine. 20 mg of the ligand specified in Table 9 to create the 0.4 g $L^{-1}$ stock solution. The amount of ligand stock solution used was adjusted from 6.08 ml to the amount of desired OAT transition metal to ligand molar ratio depicted in Table 9.

TABLE 9

Variation of Ligand and OAT Transition Metal to Ligand Molar Ratio for Selected Catalysts.

| Example | Ligand | Nitrogen ligand structure | Trn Me:L Mol Ratio | L Stock Sol. (mL) |
|---|---|---|---|---|
| Example 28 | 4,4'-diamino-2,2'-bipyridine | $H_2N$—[pyridine-pyridine]—$NH_2$ | 1:1 | 6.08 |

TABLE 9-continued

Variation of Ligand and OAT Transition Metal to Ligand Molar Ratio for Selected Catalysts.

| Example | Ligand | Nitrogen ligand structure | Trn Me:L Mol Ratio | L Stock Sol. (mL) |
|---|---|---|---|---|
| Example 29 | 2,2'-bipyridine | 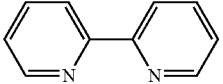 [SMILES: c1ccc(-c2ccccn2)nc1] | 1:1 | 5.09 |
| Example 30 | 4,4'-dimethyl-2,2'-bipyridine | 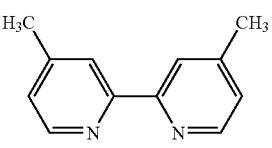 | 1:1 | 6.00 |
| Example 31 | 4,4'-dihydroxy-2,2'-bipyridine | 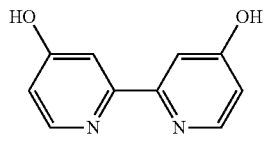 [SMILES: Oc1ccnc(-c2cc(O)ccn2)c1] | 1:1 | 6.13 |
| Example 32 | 4,4'-dichloro-2,2'-bipyridine | 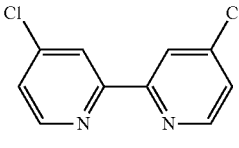 | 1:1 | 7.33 |
| Example 33 | 4,4'-dimethoxy-2,2'-bipyridine | 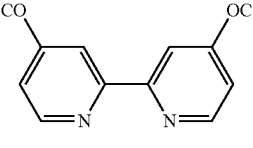 | 1:1 | 7.04 |
| Example 34 | 6,6'-dimethyl-2,2'-bipyridine | 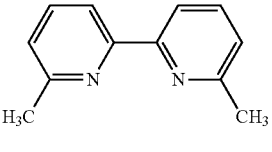 | 1:1 | 6.00 |
| Example 35 | 2,2'-biquinoline | 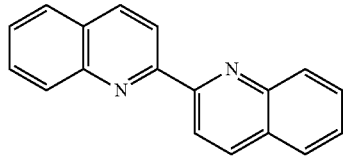 [SMILES: c1ccc2nc(-c3ccc4ccccc4n3)ccc2c1] | 1:1 | 8.35 |
| Example 36 | 2,2':6',2''-terpyridine | 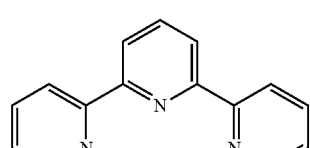 | 1:1 | 7.60 |
| Example 37 | 1,10-phenanthroline | 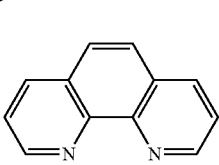 | 1:1 | 5.87 |

TABLE 9-continued

Variation of Ligand and OAT Transition Metal to Ligand Molar Ratio for Selected Catalysts.

| Example | Ligand | Nitrogen ligand structure | Trn Me:L Mol Ratio | L Stock Sol. (mL) |
|---|---|---|---|---|
| Example 38 | 2,9-dimethyl-1,10-phenanthroline | | 1:1 | 6.78 |
| Example 39 | 4,7-dimethyl-1,10-phenanthroline | | 1:1 | 6.78 |
| Example 40 | 4-methyl-1,10-phenanthroline | | 1:1 | 6.32 |
| Example 41 | 1,10-phenanthroline-5,6-dione | | 1:1 | 6.84 |
| Example 42 | 3,4,7,8-tetramethyl-1,10-phenanthroline | | 1:1 | 7.69 |
| Example 43 | 4,7-dimethoxy-1,10-phenanthroline | | 1:1 | 7.82 |
| Example 44 | Pyridine | | 1:2 | 5.15 |
| Example 45 | 4-hydroxypyridine | | 1:2 | 6.19 |
| Example 46 | 4-aminopyridine | | 1:2 | 6.13 |

TABLE 9-continued

Variation of Ligand and OAT Transition Metal to Ligand Molar Ratio for Selected Catalysts.

| Example | Ligand | Nitrogen ligand structure | Trn Me:L Mol Ratio | L Stock Sol. (mL) |
|---|---|---|---|---|
| Example 47 | 4-dimethyl-aminopyridine (DMAP) | | 1:2 | 7.96 |
| Example 48 | 2,2'-bipyrimidine | | 1:1 | 5.15 |
| Example 49 | 2-(4,4-dimethyl-4,5-dihydro-2-oxazolyl)pyridine | | 1:1 | 5.74 |
| Example 50 | 2-(4,5-dihydro-2-oxazolyl)quinoline | | 1:1 | 6.45 |
| Example 51 | 4,5-diazafluoren-9-one | | 1:1 | 5.93 |
| Example 52 | trans-N,N'-dimethylcyclohexane-1,2-diamine | | 1:1 | 4.63 |
| Example 53 | N,N,N',N'-tetramethylethylenediamine | | 1:1 | 3.78 |
| Example 54 | N,N'-dimethylethylenediamine | | 1:1 | 2.87 |

Example 55: Synthesis of a Comparative Vanadium Oxide Catalysts

A VOSO$_4$·L-Pd/C catalyst, where the ligand was 4,4'-diamino-22'-bipyridine, was prepared by the following method. A 3 g L$^{-1}$ stock solution of VOSO$_4$ was prepared by dissolving 150 mg VOSO$_4$ xH$_2$O into 50 ml DI water. 20 mg of 4,4'-diamino-2,2'-bipyridine was dissolved in 50 ml DI water to prepare 0.4 g L$^{-1}$ stock solution. The pH of stock solutions was pre-adjusted to 3.0 with 2N H$_2$SO$_4$. A reaction was performed at pH of 3. A comparative 0.5 g L$^{-1}$ bimetallic heterogeneous catalyst (5 wt. % V) was prepared in a 50 ml pear shaped flask by consecutively adding 25 mg of Pd/C (5 wt. % Pd) VOSO$_4$ stock solution corresponding to 1.25 mg V, 11 ml of ligand stock solution (ligand to V molar ratio of 1), and a magnetic stir bar to 50 ml of DI water (pH adjusted to 3.0 with 2N H$_2$SO$_4$). The flask was then sealed with a rubber stopper and sonicated for 1 minute. The aqueous suspension was then stirred at 1000 rpm under a reducing atmosphere of 1 atm. H$_2$ gas (supplied by two 16-gauge diameter, 6-in. length needles as gas inlet and out to the fume hood, respectively) for at least 30 minutes to allow the transfer and immobilization of V species from bulk phase into the activated carbon matrix.

Example 56: Synthesis of a Comparative Tungsten Catalyst

The preparation method developed for preparing $Na_2WO_4 \cdot L\text{-}Pd/C$ was the following, where the ligand was 4,4'-diamino-2,2'-bipyridine. The reaction was performed at pH of 3, a 3 g $L^{-1}$ stock solution of $Na_2WO_4$ was prepared by dissolving 150 mg $Na_2WO_4$ into 50 ml DI water. 20 mg of 4,4'-diamino-2,2'-bipyridine was dissolved in 50 ml DI water to prepare 0.4 g $L^{-1}$ stock solution. The pH of stock solutions was then pre-adjusted to 3.0 with 2N $H_2SO_4$. The typical 0.5 g $L^{-1}$ bimetallic heterogeneous catalyst (5 wt. % W) was prepared in a 50 ml pear shaped flask by consecutively adding 25 mg of Pd/C (5 wt. % Pd), $Na_2WO_4$ stock solution corresponding to 1.25 mg W. 3.17 ml of ligand stock solution (ligand to W molar ratio of 1), and a magnetic stir bar to 50 ml of DI water (pH adjusted to 3.0 with 2N $H_2SO_4$). The flask was then sealed with a rubber stopper and sonicated for 1 minute. The aqueous suspension was then stirred at 1000 rpm under a reducing atmosphere of 1 atm. $H_2$ gas (supplied by two 16-gauge diameter, 6-in. length needles as gas inlet and out to the fume hood, respectively) for at least 30 minutes to allow the transfer and immobilization of V species from bulk phase into the activated carbon matrix.

Examples 57-63: Synthesis of a Catalyst Based on Molybdenum Oxides, 4,4'-diamino-2,2'-bipyridine, and Pd on a Carbon Support with Various Mo Loadings Additional catalysts were synthesized to examiner the sensitivity to Mo loading from 2 wt. % to 10 wt. % of the support. The preparation methods were done in the same manner as Example 1 but except for the following modifications to Molybdenum loading shown in Table 10. Instead of 0.9 ml of $Na_2MoO_4$ stock solution (containing 1.25 mg Mo), the amount of stock solution was varied to adjust the mass percentage of molybdenum. The amount of 4,4'-diamino-2,2'-bipyridine ligand stock solution used was adjusted from 6.08 ml of ligand stock solution (for 5 wt. %. 1.25 mg Mo) to the amount shown in Table 10 to ensure that the ligand to Mo molar ratio was conserved at 1.

TABLE 10

Variation of OAT Transition Metal (Mo) Loading for Selected Catalysts.

| Example | Mo wt. % (to support) | Mo Stock Sol. (mL) | Pd wt. % (to support) | Trn Me:L Mol Ratio | L Stock Sol. (mL) |
|---|---|---|---|---|---|
| Example 28 | 5 | 0.9 | 5 | 1 | 6.08 |
| Example 57 | 2 | 0.36 | 5 | 1 | 2.43 |
| Example 58 | 3 | 0.54 | 5 | 1 | 3.67 |
| Example 59 | 4 | 0.72 | 5 | 1 | 4.92 |
| Example 60 | 6 | 1.08 | 5 | 1 | 7.41 |
| Example 61 | 7 | 1.26 | 5 | 1 | 8.69 |
| Example 62 | 8 | 1.44 | 5 | 1 | 10.0 |
| Example 63 | 10 | 1.8 | 5 | 1 | 12.6 |

Examples 64-66: Synthesis of Catalyst Based on Molybdenum Oxides, 4,4'-diamino-2,2'-bipyridine, and Pd on Carbon Support with Various Mo:Ligand Molar Ratios Additional catalysts were synthesized to examiner the sensitivity of the ratio of OAT transition metal to ligand. The preparation methods were done in the same manner as Example 28 but with the exception that the amount of 4,4'-diamino-2,2'-bipyridine ligand stock solution used was adjusted from 6.08 ml to the amount and the corresponding molar ratio shown in Table 11.

TABLE 11

Variation of OAT Transition Metal (Mo) and Ligand Ratio for Selected Catalysts.

| Example | Mo wt. % (to support) | Mo Stock Sol. (mL) | Pd wt. % (to support) | Trn Me:L Mol Ratio | L Stock Sol. (mL) |
|---|---|---|---|---|---|
| Example 28 | 5 | 0.9 | 5 | 1:1 | 6.08 |
| Example 64 | 5 | 0.9 | 5 | 1:2 | 12.22 |
| Example 65 | 5 | 0.9 | 5 | 1:4 | 24.58 |
| Example 66 | 5 | 0.9 | 5 | 2:1 | 3.09 |

Examples 67-69: Synthesis of a Catalyst Based on Molybdenum Oxides, 4,4'-Diamino-2,2-Bipyridine, and Pd on a Carbon Support with Varying pH Although it is plausible that the catalyst can be stored in a pH neutral state and activated before use, for the sensitivity study, the preparation methods were done in the same manner as Example 28 but with the exception that after mixing, the pH of the resulting solution was adjusted to the value in Table instead of a pH of 3.0 with 2 N $H_2SO_4$.

TABLE 12

Variation of OAT Transition Metal (Mo) and Ligand Ratio for Selected Catalysts.

| Example | Mo wt. % (to support) | Mo Stock Sol. (mL) | Pd wt. % (to support) | Trn Me:L Mol Ratio | pH of Final Mixture |
|---|---|---|---|---|---|
| Example 28 | 5 | 0.9 | 5 | 1:1 | 3 |
| Example 67 | 5 | 0.9 | 5 | 1:1 | 1 |
| Example 68 | 5 | 0.9 | 5 | 1:1 | 2 |
| Example 69 | 5 | 0.9 | 5 | 1:1 | 4.75 |

Example 70: Comparison of Ligand Performance in Catalysts Prepared from Examples 28-54

Figure 21:
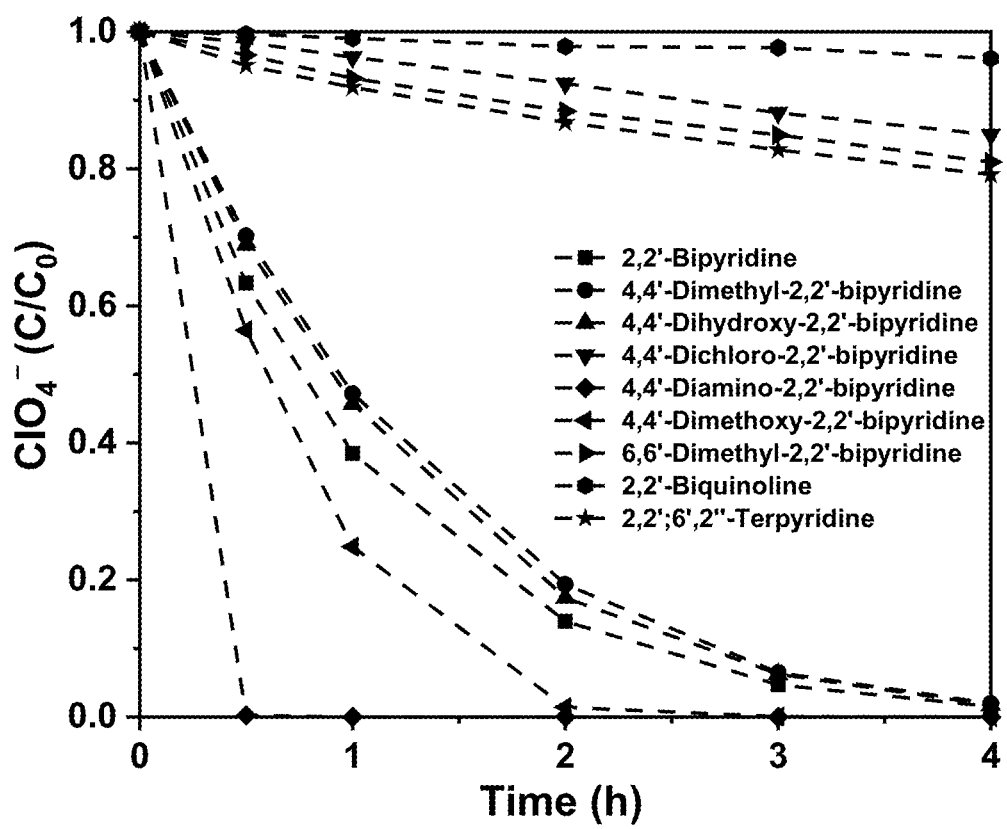
FIG. 21 is a plot showing the reduction profile of 1 mM $ClO_4^-$ with catalysts prepared from example 28-36. The reactions were conducted at pH of 3, 1 atm $H_2$, and 25° C. The loading of the catalysts is 0.5 g L$^{-1}$ with a Mo loading of 5% by weight.
Figure 22:
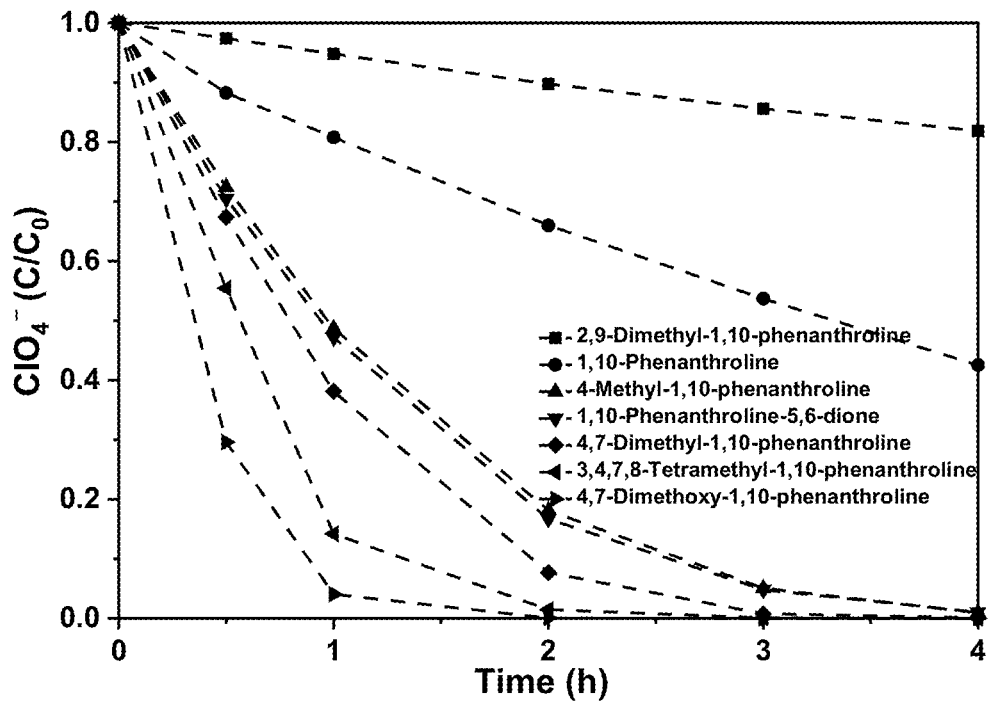
FIG. 22 is a graph showing the reduction profile of 1 mM $ClO_4^-$ with catalysts prepared from example 37-43. The reactions were conducted at pH of 3, 1 atm $H_2$, and 25° C. The loading of the catalysts is 0.5 g L$^{-1}$ with a Mo loading of 5% by weight.
Figure 23:
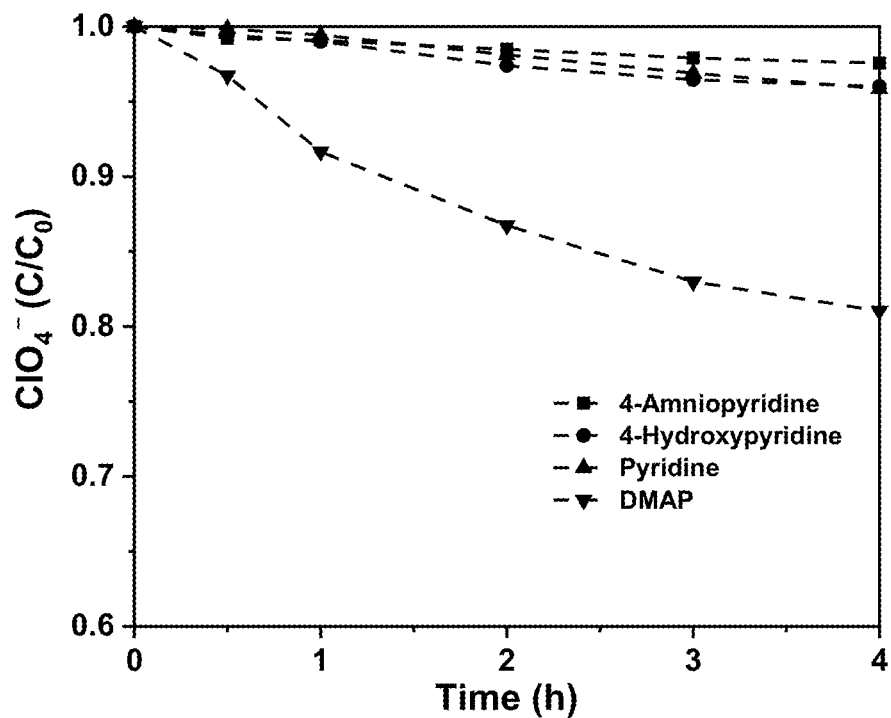
FIG. 23 is a plot showing the reduction profile of 1 mM $ClO_4^-$ with catalysts prepared from example 44-47. The reactions were conducted at pH of 3, 1 atm $H_2$, and 25° C. The loading of the catalysts is 0.5 g L$^{-1}$ with a Mo loading of 5% by weight.
Figure 24:
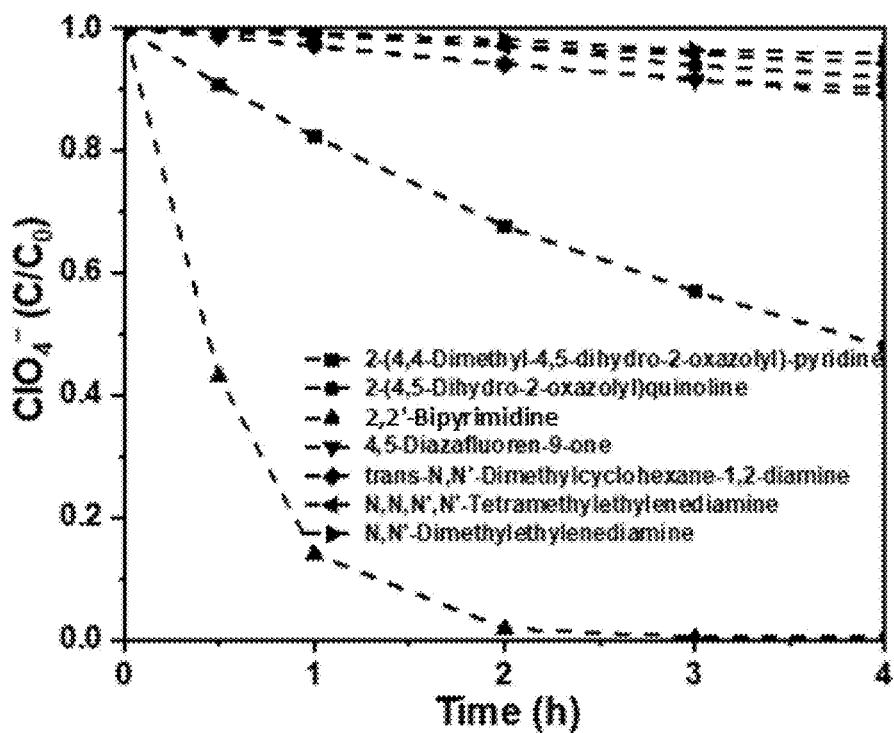
FIG. 24 is a graph showing the reduction profile of 1 mM $ClO_4^-$ with catalysts prepared from example 48-54. The reactions were conducted at pH of 3, 1 atm $H_2$, and 25° C. The loading of the catalysts is 0.5 g L$^{-1}$ with a Mo loading of 5% by weight.

For each catalyst from Examples 28-54 in Table 9, a separate reduction reaction was conducted for each example to verify the ability to reduce $ClO_4^-$. The experiment was conducted under 1 atm $H_2$ flow, at a pH of 3, and room temperature. 1 mM $ClO_4^-$ reduction was initiated by adding 0.25 ml $NaClO_4^-$ stock solution (200 mM) to 50 ml of the respective catalyst suspension. During the reduction, in periodic intervals of 30 minutes, 1 hour, 2, hours, 3 hours, and 4 hours, aliquots of solution were periodically collected through the $H_2$ outlet, and immediately filtered (0.22 μm cellulose membrane) to quench reactions prior to analysis. Concentrations of $Cl^-$ and $ClO_4^-$ in the samples were determined by ion chromatography (Dionex ICS-500 system with a 25 μL sample injection loop, and IonPac AS 16 column, 30° C. column temperature, 65 mM NaOH eluent, 1.0 mL min flow rate, and a conductivity detector). The results obtained for Examples 28-36 are shown in FIG. 21. The performance for Examples 37-43 is depicted in FIG. 22. The results for Examples 44-47 are illustrated in FIG. 23. The characteristics for Examples 48-54 are presented in FIG. 24.

From the results, it was verified that molybdenum ligand catalysts prepared from mono- and poly-oxomolybdate precursors exhibit similar catalytic activity. Moreover, it appears that catalysts with nitrogen-donor ligands can achieve significantly enhanced $ClO_4^-$ reduction rates. From the $ClO_4^-$ reduction profiles are presented for characteristic ligands, it was observed that the combination of molybdate with 4,4'-diamino-2,2'-bipyridine ($L_p$), or Example 28, had the highest reaction kinetics.

Example 71: Comparison of Transition Metal Performance in Catalysts from Examples 28, 55-56

Figure 25:
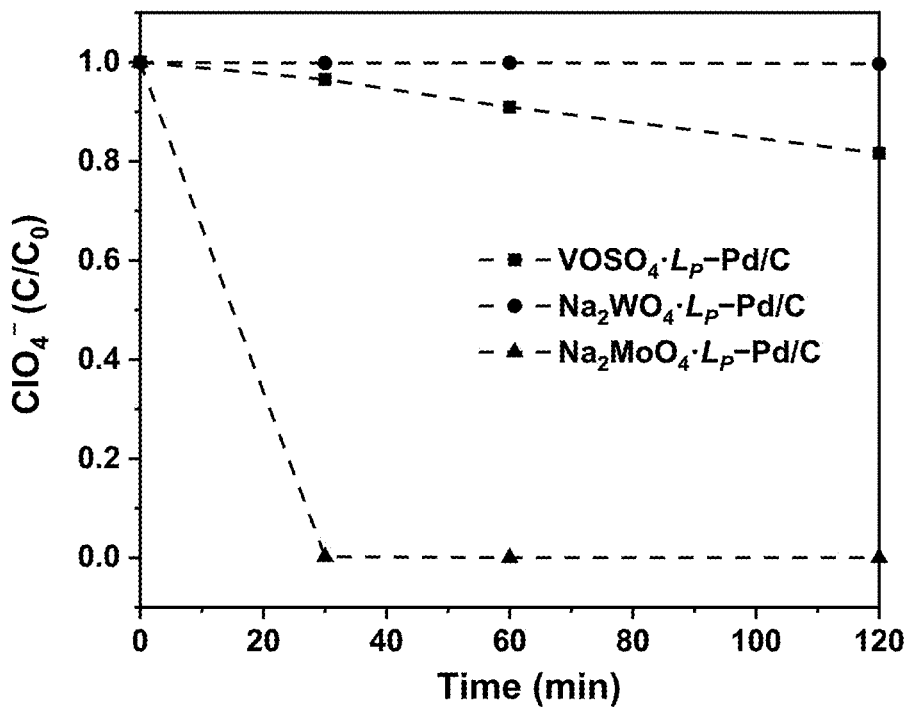
FIG. 25 is a plot of the reduction profile of 1 mM $ClO_4^-$ with catalysts prepared by sodium molybdate, sodium tungstate, and vanadyl sulfate. 4,4'-diamino-2,2'-bipyridine ($L_p$) was used as organic ligand to prepare metal complexes. The reactions were conducted at pH of 3, 1 atm $H_2$, and 25° C. The loading of the catalysts is 0.5 g L$^{-1}$ with a metal loading of 5% by weight.

To examine the effectiveness of molybdenum as an OAT transition metal, the $ClO_4^-$ reduction performance of Example 28, Mo, was compared to Example 55, vanadium oxide, and Example 56, tungsten. The reactions were conducted in the same manner as Example 70 with the exception that the catalysts used were the catalysts prepared in Examples 28, 55 and 56. The results obtained are shown in FIG. 25.

It was observed that for catalysts with the 4,4'-diamino-2,2'-bipyridine ligand, catalysts prepared with molybdenum oxide, Example 28, showed a significantly higher catalytic activity as compared to the catalysts prepared with vanadium oxide, Example 55, and tungsten, Example 56. Accordingly, the molybdenum-based ligand showed the greatest performance.

Example 72: OAT Transition Metal Loading Performance Effects, Catalysts from Examples 28, 57-63

Figure 26:
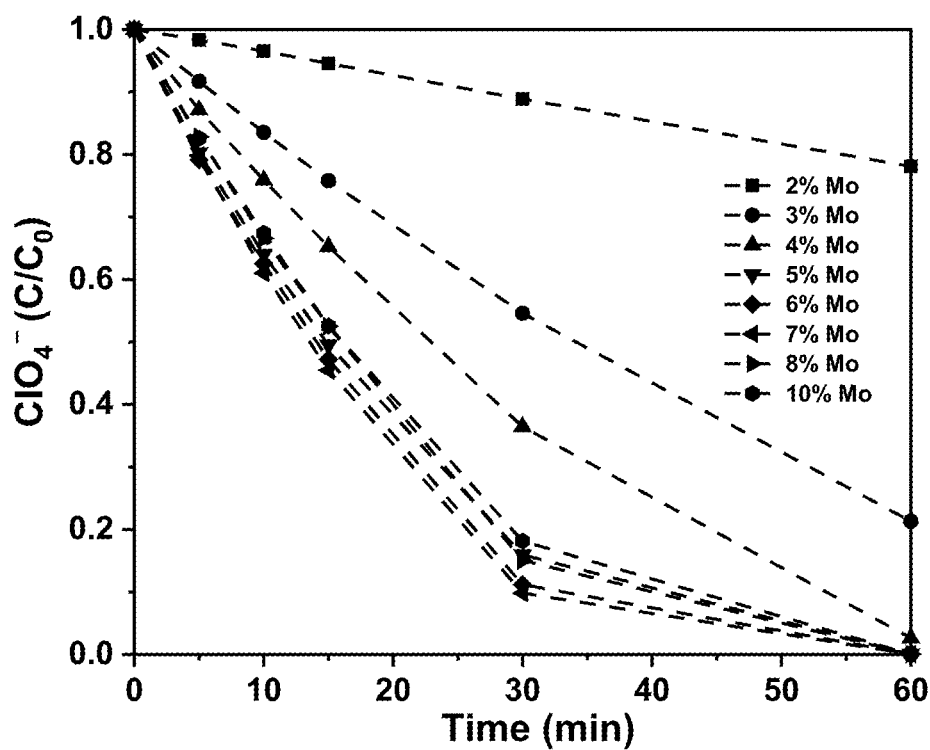
FIG. 26 is a graph showing the reduction profiles of 1 mM $ClO_4^-$ by 0.2 g L$^{-1}$ Mo·$L_p$-Pd/C with various Mo loadings (2%-10%). The reactions were conducted at pH of 3, 1 atm $H_2$, and 25° C.

To characterize the effect of varying the amount of OAT transition metal loading, catalysts from Examples 28, 57 thru 63, ability to reduce $ClO_4^-$ was measured. The reactions were conducted in the same manner as Example 70 with the exception that the catalysts used were the catalysts prepared in Examples 28, 57 thru 63. The results obtained are shown in FIG. 26.

The results obtained show that reaction rate increases with the increase of molybdenum loading with a peak ranging from 5 wt. % to 8 wt. % of the support for a catalyst based on the 4,4'-diamino-2,2'-bipyridine ligand with a Pd concentration of 5 wt. % of the support. While molybdenum amounts of 7 wt. % provided the fastest reduction of $ClO_4$, it was noted that molybdenum loading above 5 wt. % of the support for this catalyst configuration did not provide an appreciable increase in catalytic activity.

Example 73: OAT Transition Metal Ligand Molar Ratio Performance Effects, Catalysts from Examples 28, 64-66

Figure 27:
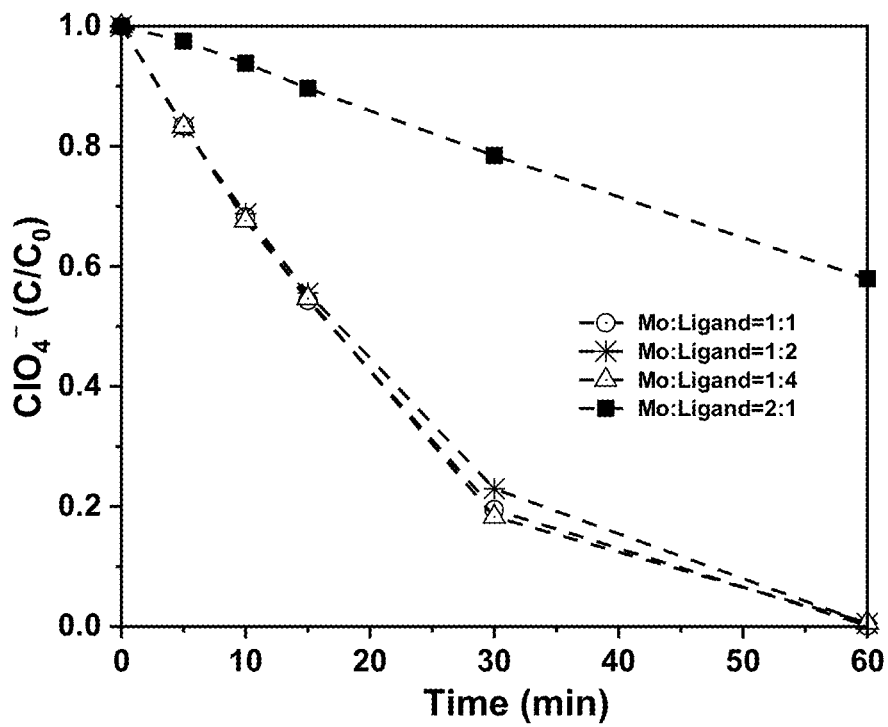
FIG. 27 is a plot of the reduction profiles of 1 mM $ClO_4^-$ by 0.2 g L$^{-1}$ Mo·$L_p$-Pd/C (5 wt. % Mo, 5 wt. % Pd) with various Mo to $L_p$ ratios. The reactions were conducted at pH of 3, 1 atm $H_2$, and 25° C.

To test the effect of varying the molar ratio of OAT transition metal to ligand, catalysts from Examples 28, 64 thru 66, were measured to determine their ability to reduce $ClO_4^-$. The reactions were conducted in the same manner as Example 70 with the exception that the catalysts used were the catalysts prepared in Examples 28, 64 thru 66. The results obtained are shown in FIG. 27.

The results presented indicate when the OAT transition metal is molybdenum and the ligand is 4,4'-diamino-2,2'-bipyridine, optimum performance is achieved when the molar ratio of ligand to OAT transition metal is 1.

Example 74: Effect of pH on Performance, Catalysts from Examples 28, 67-69

Figure 28:
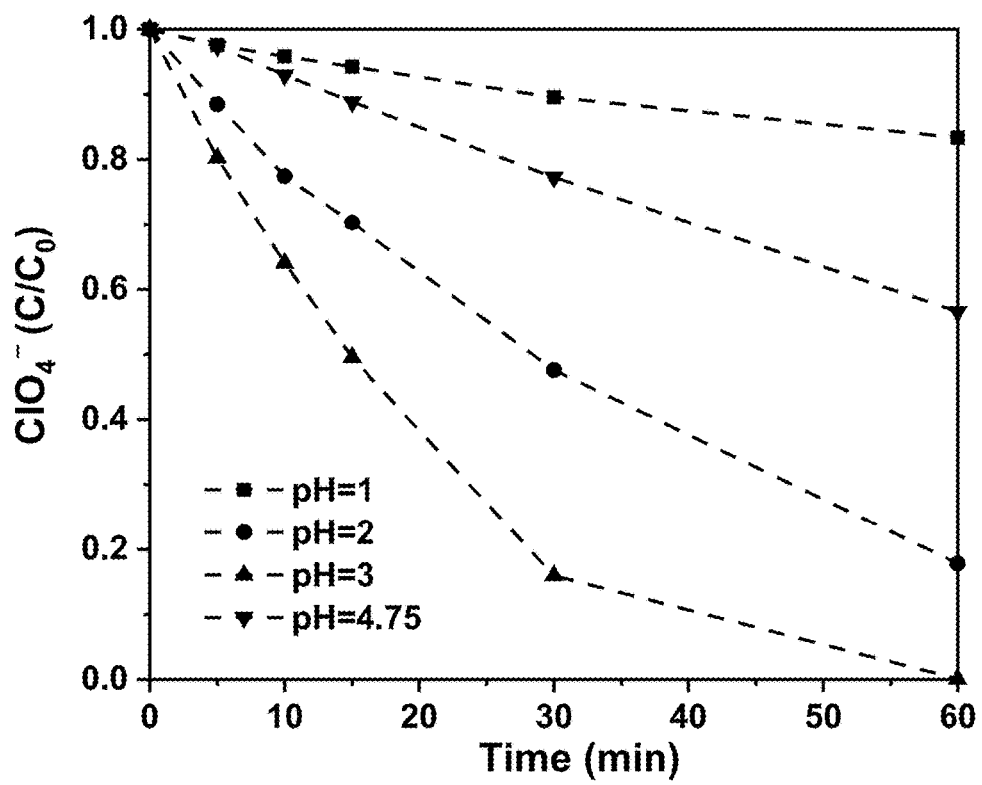
FIG. 28 is a graph that shows the reduction profiles of 1 mM $ClO_4^-$ by 0.2 g L$^{-1}$Mo·$L_p$-Pd/C (5 wt. % Mo, 5 wt. % Pd) at different pH conditions. The reactions were conducted at 25° C., and under 1 atm $H_2$.

To examine the effect of varying pH of the final catalyst, catalysts from Examples 28, 67 thru 69, were measured to determine their ability to reduce $ClO_4^-$. The reactions were conducted in the same manner as Example 43 with the exception that the catalysts used were the catalysts prepared in Examples 28, 67 thru 69, and the pH of the experiment was adjusted to be equivalent to the pH of the catalyst. The results obtained are shown in FIG. 28.

As shown, the rate of catalytic reaction depends on the pH of the reaction environment. The kinetic results indicate that the activity of Mo·$L_p$-Pd/C depends on the aqueous pH. Within the range of a pH of 1 to a pH of 4.5, a pH of 3 provided the highest catalyst activity.

Figure 29:
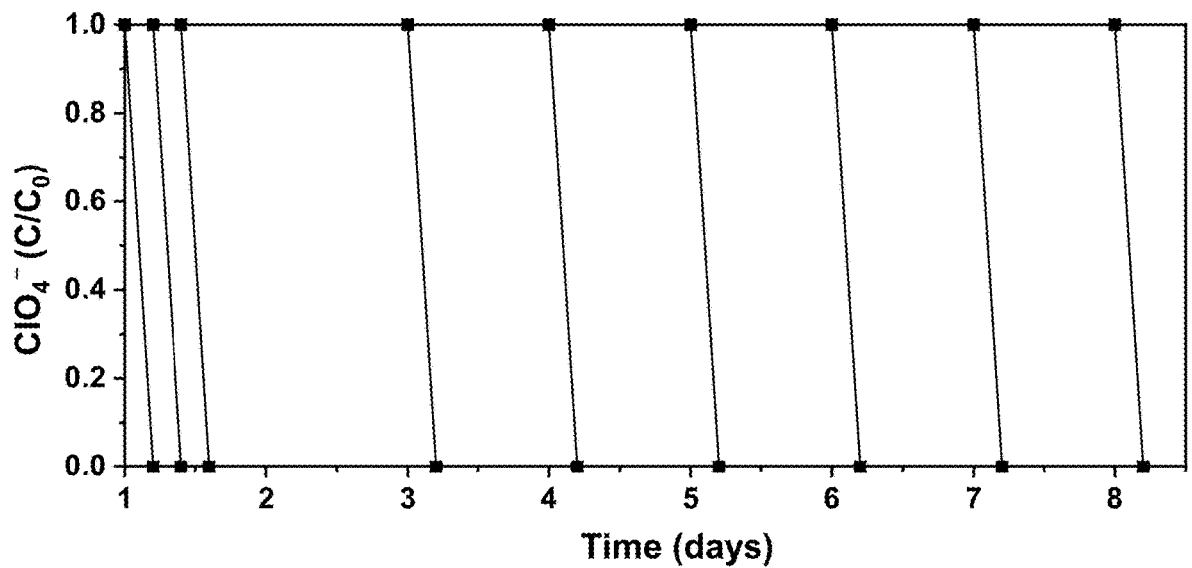
FIG. 29 is a graph of the response to a multi-spike experiment. Nine 1 mM $ClO_4^-$ reductions were done with 0.2 g L$^{-1}$ Mo·$L_p$-Pd/C (5 wt. % Mo, 5 wt. % Pd) catalyst within a week. The reactions were conducted at pH of 3, 1 atm $H_2$, and 25° C.

Example 75: Multiple Event Stability Testing—Effect of Multiple $ClO_4^-$ Reductions on Catalyst Performance To characterize the stability of the catalyst, a catalyst made by Example 28 was exposed to multiple reduction events to evaluate the effects of varying redox conditions on catalytic activity and stability. Nine individual 1 mM $ClO_4^-$ reductions with an Example 28 catalyst were conducted in the same manner as Example 70 within the period of one week. Three were done on the first day at 0 hours, 6 hours and 12 hours. The remaining at the start of day 3, 4, 5, 6, 7, and 8. The results obtained are shown in FIG. 29. It was shown that on the ninth reduction no loss of catalytic activity was observed.

Example 76: Endurance Testing—Large Reductions of $ClO_4^-$

Figure 30:
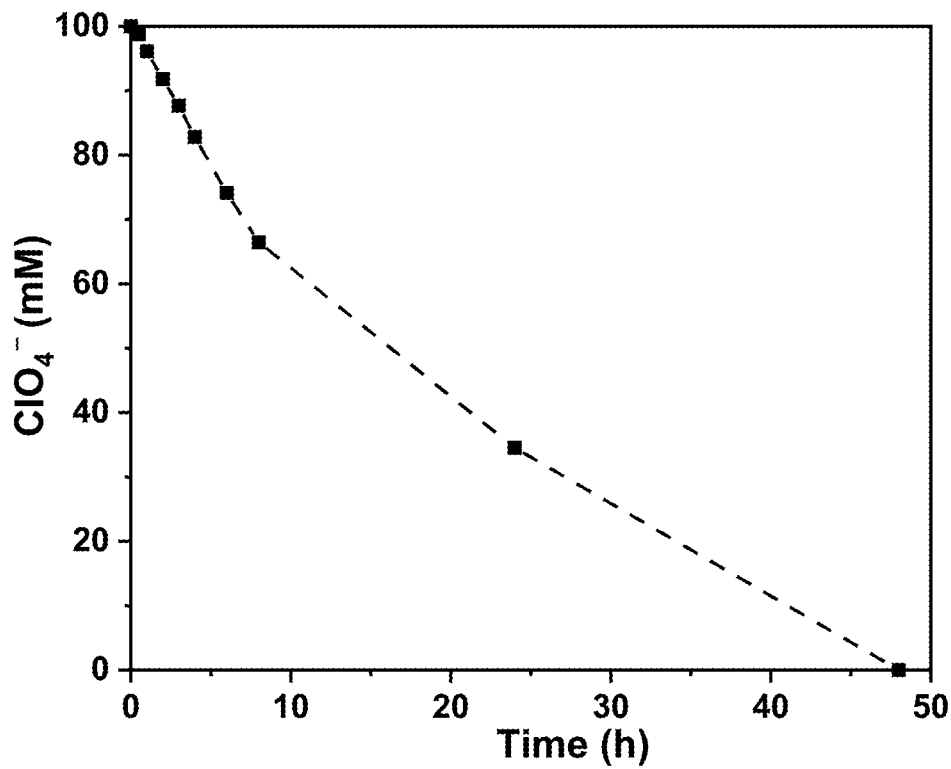
FIG. 30 is a plot showing the reduction profiles of 100 mM $ClO_4^-$ by 0.2 g L$^{-1}$ Mo·$L_p$-Pd/C (5 wt. % Mo. 5 wt. % Pd) at 25° C., and pH of 3 under continuous 1 atm $H_2$ sparging.

To test endurance of the catalyst, a catalyst made by Example 28 was exposed to a large reduction event. The reactions were conducted on an Example 28 catalyst in the same manner as Example 70 with the exception that the 0.25 ml NaClO$_4$ stock solution (200 mM) amount was varied such that 10 mM $ClO_4^-$ was present in the suspension. The performance is shown in FIG. 30. It was observed that the concentration of $ClO_4^-$ went below the detection limit of ion chromatography (2 ppb or 2 microgram per liter as $ClO_4^-$) within two days, featuring an excellent turnover number of 3800 for the oxygen atom transfer reaction. This result indicates a chemical reduction of 99.99998% $ClO_4^-$.

Figure 31:
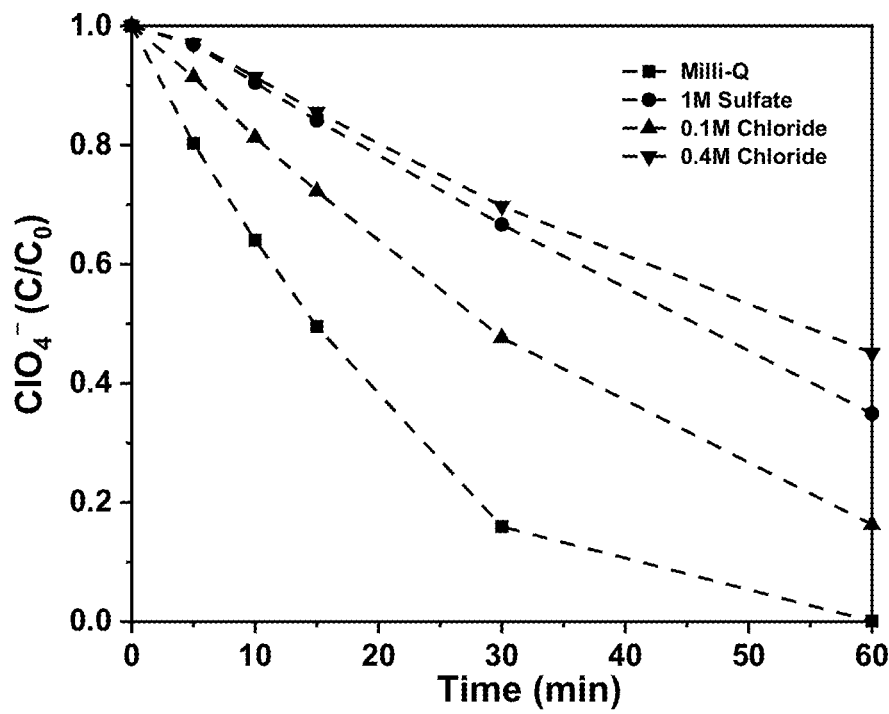
FIG. 31 is a graph of the reduction profiles of 1 mM $ClO_4^-$ by 0.2 g L$^{-1}$ Mo·$L_p$-Pd/C (5 wt. % Mo, 5 wt. % Pd) in the presence of 0.1 M Cl$^-$, 0.4 M Cl$^-$, and 1 M $SO_4^-$. The reactions were conducted at pH of 3, 1 atm $H_2$, and 25° C. The reactions were conducted at pH of 3, 1 atm $H_2$, and 25° C.

Example 77: Brine Treatment Testing—Reductions of $ClO_4^-$ in Competing Synthetic Brines To examine the resilience of the catalyst under brine conditions, the catalytic performance of Mo·$L_p$-Pd/C was further evaluated in synthetic brines with the presence of 0.1 M chloride, 0.4 M chloride, or 1 M sulfate anion ions. The four reactions were conducted on an Example 28 catalyst in the same manner as Example 70 with the exception that the catalyst suspension was manipulated so that 200 mg/L of catalyst was present in the solution and the solution contained DI water (milli Q), 0.1 M chloride, 0.4 M chloride, or 1 M sulfate, respectively. The performance of the catalyst in the presence of other ions is depicted in FIG. 31. Although a slight inhibition effect was observed for the sulfate and chloride background salt/electrolyte, the catalyst still held very high activity for reducing 1 mM $ClO_4^-$ in the synthetic brines. While not wanting to be limited by theory, the apparent reaction rate appears to linearly depend on the catalyst loading. The results were obtained from the loading of 200 mg/L of the Mo·$L_p$-Pd/C. It is thought that higher reaction rates can be achieved linearly by increasing the catalyst loading.

Figure 32:
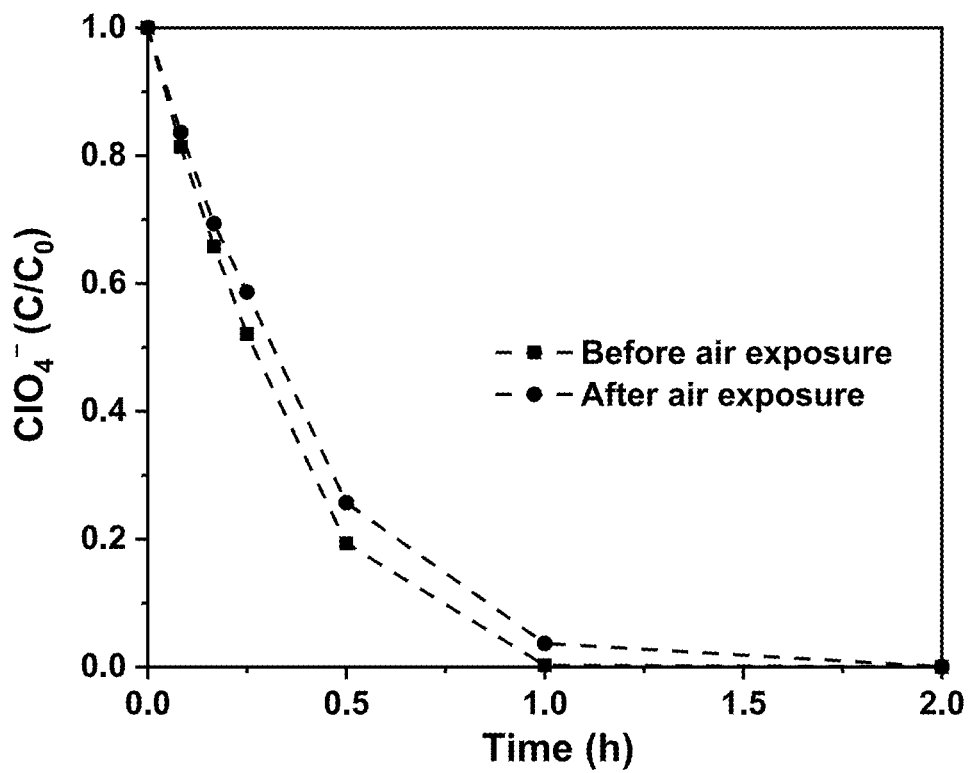
FIG. 32 is a plot of the reduction profiles of 1 mM $ClO_4^-$ by 0.2 g L$^{-1}$ Mo·$L_p$-Pd/C (5 wt. % Mo, 5 wt. % Pd) before and after one-hour air exposure.

Example 78: Air Tolerance Testing—Reductions of $ClO_4^-$ After Exposure to Air To test the air tolerance of the catalyst, a catalyst made by Example 28 was tested in the same manner Example 70, reducing 1 mM of $ClO_4^-$, performance recorded, and then exposed to air for one hour. Then the same catalyst was then exposed to 1 atm hydrogen ($H_2$) headspace gas for one hour of pretreatment before reducing an additional 1 mM of $ClO_4^-$. The results are shown in FIG. 32. The stability of prepared catalyst in oxic condition is indicated by the catalytic activity. The performance of catalyst remains roughly the same. The high stability toward air exposure of the molybdenum-based catalysts enables catalyst preparation, handling, storage, and recycling in air without using an oxygen-free environment.

Figure 33:
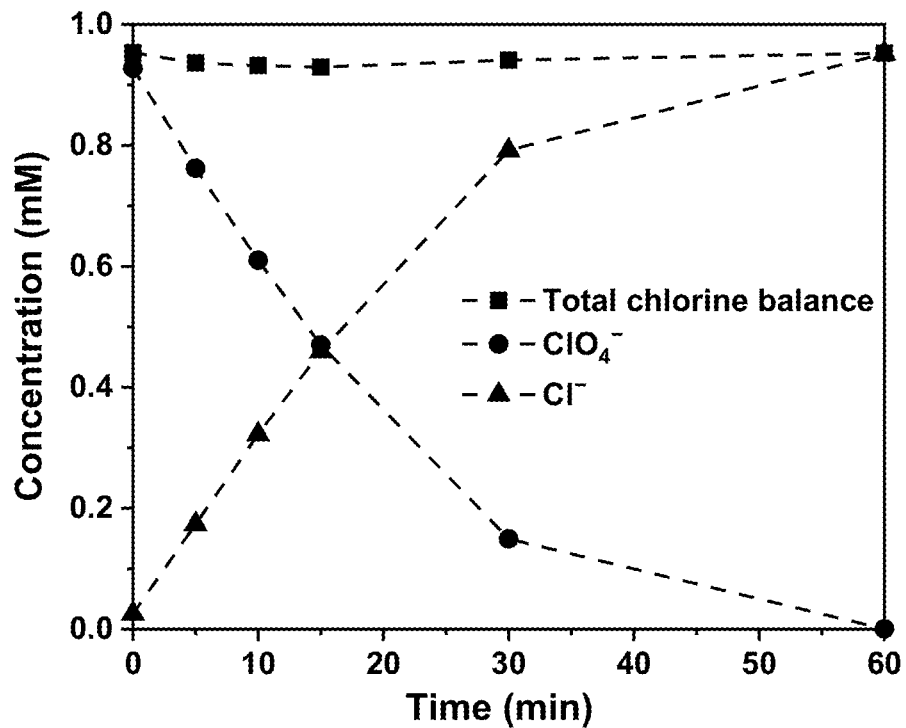
FIG. 33 is a graph depicting the chlorine mass balance during 1 mM $ClO_4^-$ by 0.2 g L$^{-1}$ Mo·$L_p$-Pd/C (5 wt. % Mo. 5 wt. % Pd) at 25° C., and pH of 3 under continuous 1 atm $H_2$ sparging.

Example 79: Air Tolerance Testing—Reductions of $ClO_4^-$ a After Exposure to Air To verify the chemical decomposition of $ClO_4^-$, a mass balance between $ClO_4^-$ and $Cl^-$ was exemplified for a catalyst made by Example 28 was tested in the same manner Example 70. The balance is shown in FIG. 33. A stoichiometric $Cl^-$ generation coupled with $ClO_4^-$ removal has been observed indicating $ClO_4^-$ was converted to $Cl^-$ with minimal accumulation of intermediates. The mass balance of chlorine also illustrates that the Mo·$L_p$-Pd/C catalyst is potent in reducing $ClO_3^-$, $ClO_2^-$, and $ClO^-$. A similar mass balance can be found for other oxyanions.

Example 80: A Molybdenum Catalyst for Aqueous Perchlorate Reduction

The detection of perchlorate ($ClO_4^-$) on and beyond Earth requires $ClO_4^-$ reduction technologies to support water purification and space exploration. However, the reduction of $ClO_4^-$ usually entails either harsh conditions or multi-component enzymatic processes. We developed a heterogeneous Mo—Pd/C catalyst from sodium molybdate to reduce aqueous $ClO_4^-$ into $Cl^-$ with 1 atm $H_2$ at room temperature. Upon hydrogenation by $H_2$/Pd, the reduced Mo oxide species and a bidentate nitrogen ligand (1:1 molar ratio) are transformed in situ into oligomeric Mo sites on the carbon support. The turnover number and frequency for oxygen atom transfer from $ClO_x^-$ substrates reached 3850 and 165 $h^{-1}$ on each Mo site. This design yielded a robust water-compatible catalyst for the removal and utilization of $ClO_4^-$.

Perchlorate ($ClO_4^-$) is a pervasive water contaminant on Earth[1-2] and a major salt component in the surface soil on Mars.[3-4] The uptake of $ClO_4^-$ through water and food can cause thyroid gland malfunction,[5] and a very recent study has suggested that $ClO_4^-$ pollution in drinking water is more dangerous than previously thought.[6] NASA has identified Martian $ClO_4^-$ as both a potential hazard to humans and an oxygen source to supply exploration activities.[7] However, $ClO_4^-$ is highly inert, so that it is used for ionic strength adjustment in various chemical systems. The oxidizing power of $ClO_4^-$ has been primarily utilized via rocket fuels or munitions.[1] Here, we report on a highly active bioinspired heterogeneous Mo—Pd catalyst for aqueous $ClO_4^-$ reduction with 1 atm $H_2$ at room temperature.

Figures 34A, 34B, 34C, 34D, 34E, 34F:
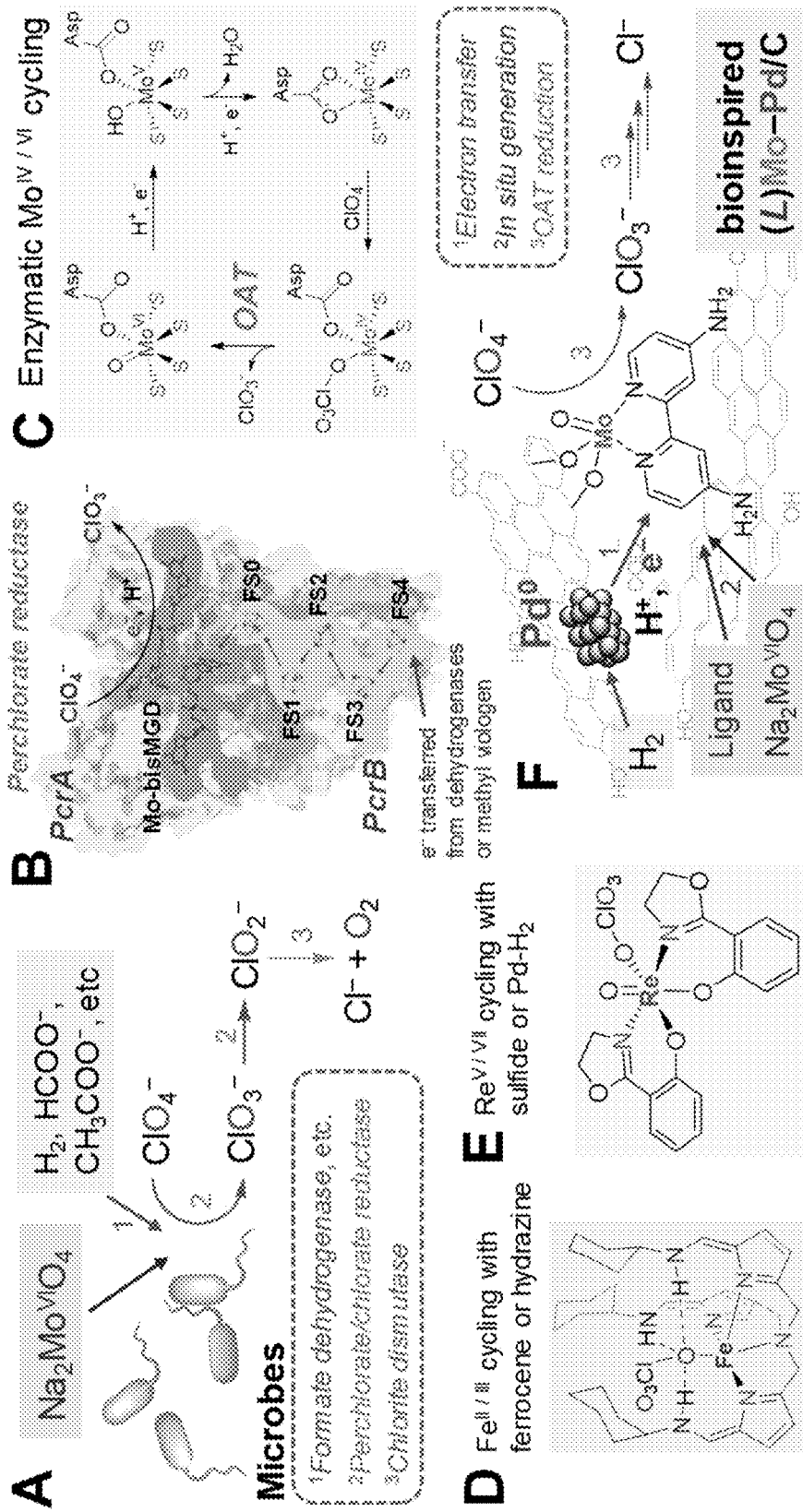
FIGS. 34A-34F. Comparison of microbial and abiotic systems for perchlorate reduction.

Microbes can use $ClO_4^-$ for respiration (FIG. 34A).[8-9] In the multifactor metalloenzyme system (FIG. 34B), a Mo co-factor biosynthesized from molybdate[10] and amino acid residues mediate the oxygen atom transfer (OAT)[11] from $ClO_4^-$.[12] The $Mo^{IV/VI}$ redox cycling (FIG. 34C) is sustained by the electron transfer from $H_2$ or acetate via multiple Fe—S clusters, heme complexes, and electron shuttle compounds.[13] Such complexity in biological systems challenges the design of an artificial $ClO_4^-$ reduction system, especially in aqueous phase under ambient conditions. For example, $ClO_4^-$ reduction by a Fe complex relies on hydrogen bonds in the secondary coordination sphere (FIG. 34D) and thus required the use of an anhydrous medium.[14-15] Furthermore, a single-function metal complex or isolated reductase needs special electron donors (e.g., methyl viologen, hydrazine, ferrocene, and phosphine) to sustain the redox cycle of OAT metals.[14,16-17] Therefore, a robust catalyst that can reduce aqueous $ClO_4^-$ into $Cl^-$ with $H_2$ is highly desirable.[18-19]

Figures 35A, 35B:
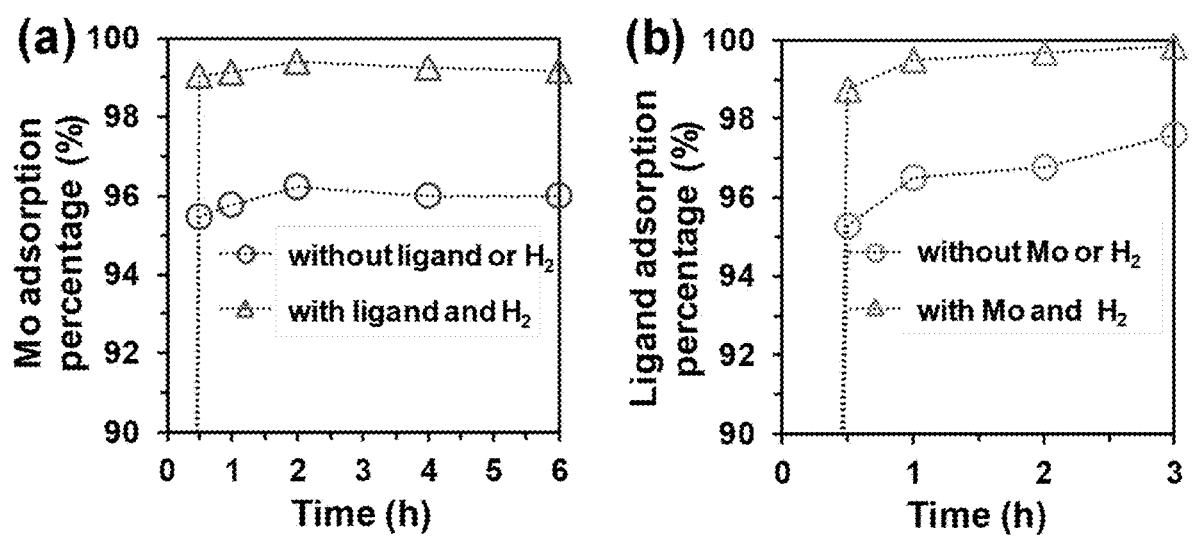
FIGS. 35A-35B. The adsorption of (FIG. 35a) Mo and (FIG. 35b) ligand during the preparation of the [$(NH_2)_2$bpy]$MoO_x$—Pd/C catalyst. Results show that under air (legend without ligand or $H_2$ and without Mo or $H_2$)>95% of either Mo or ligand can be adsorbed onto Pd/C within 30 min. When all components (i.e., 1 atm $H_2$, Mo, and ligand) were supplied together for in situ catalyst preparation (legend with ligand and $H_2$ and with Mo and $H_2$), the adsorption of Mo and ligand reached >99 and >99.5%, respectively, within 1 h. Reaction condition: 0.2 g L$^{-1}$ Pd/C, 0.1 mM Mo from $Na_2MoO_4$ (for 5 wt % Mo in catalyst), 0.1 mM $(NH_2)_2$bpy, pH 3.0, 1 atm $H_2$, 20° C. All dotted lines start from 0% adsorption at 0 h.
Figures 37A, 37B, 37C, 37D:
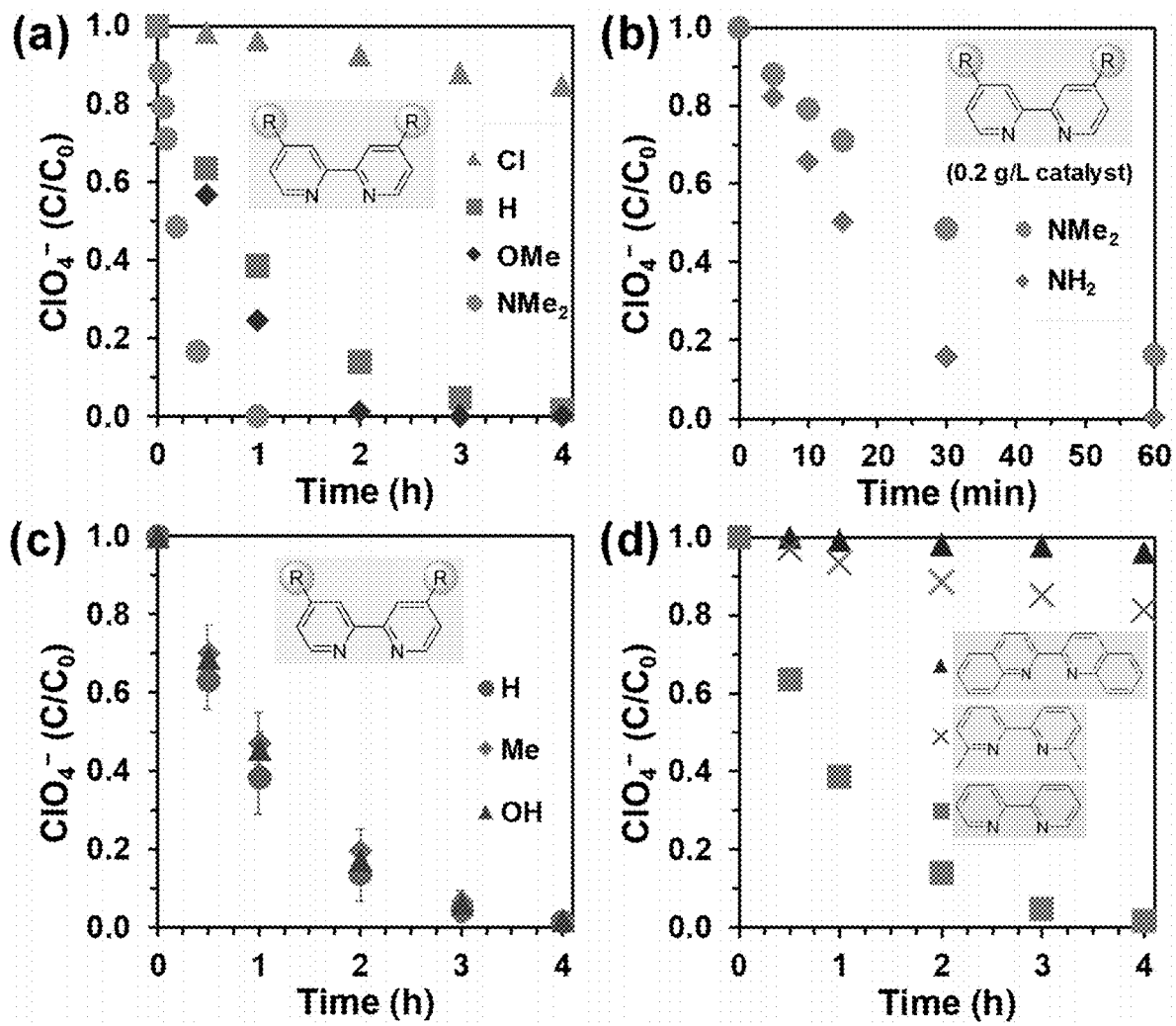
FIGS. 37A-37D. Profiles for the reduction of aqueous $ClO_4^-$ by (L)$MoO_x$—Pd/C catalysts using bipyridine derivative ligands. Reaction conditions: 0.5 g $L^{-1}$ of (L)$MoO_x$—Pd/C (5 wt % Mo in 5 wt % Pd/C, the molar ratio of L:Mo=1:1), 1 mM $ClO_4^-$, pH 3.0, 1 atm $H_2$, 20° C. Panel (FIG. 37b) used 0.2 g $L^{-1}$ of catalysts.
Figures 38A, 38B, 38C, 38D, 38E, 38F:
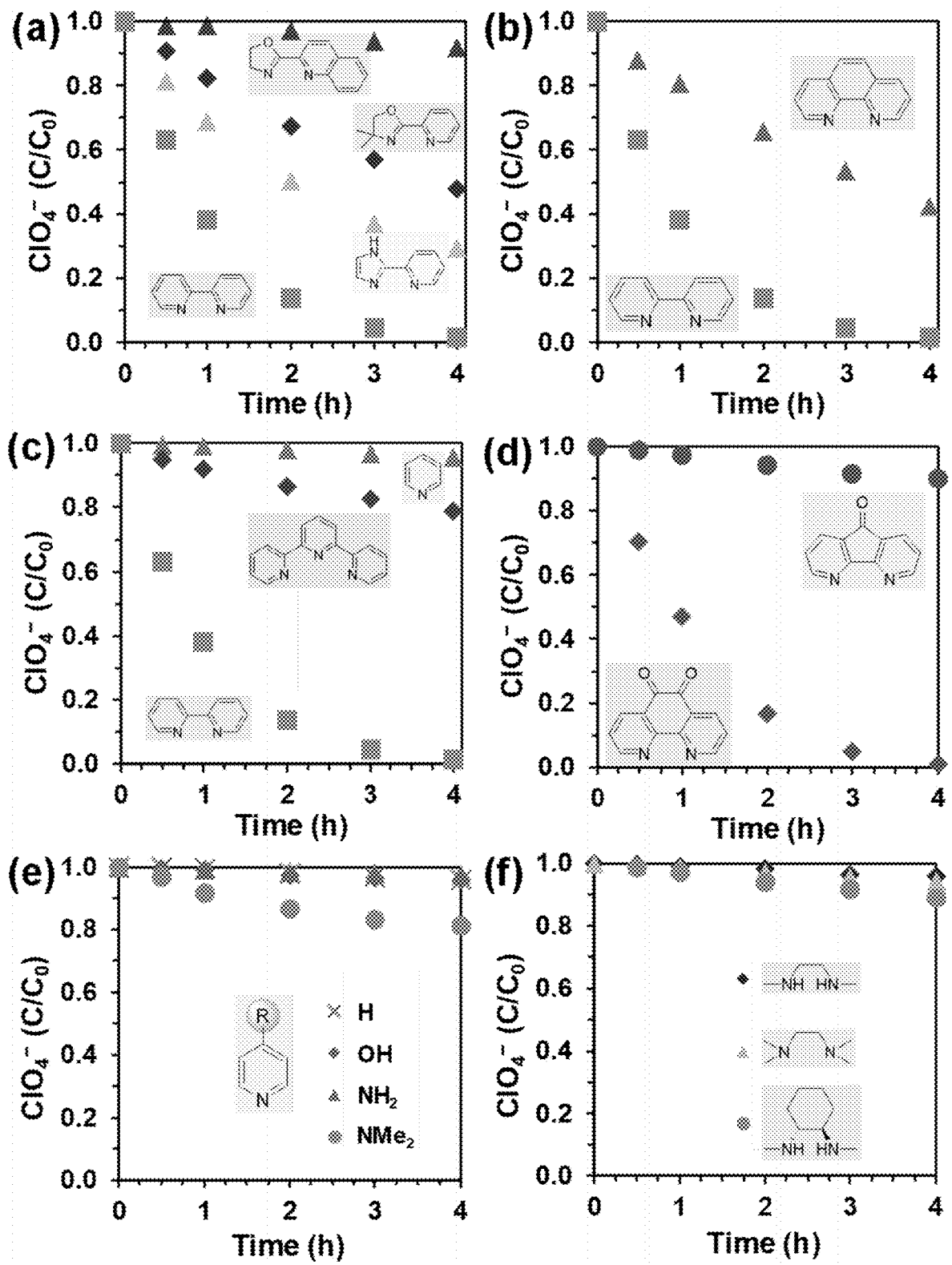
FIGS. 38A-38F. Profiles for the reduction of aqueous $ClO_4^-$ by (L)$MoO_x$—Pd/C catalysts using various ligands. Reaction conditions: 0.5 g LU of (L)$MoO_x$—Pd/C (5 wt % Mo in 5 wt % Pd/C, the molar ratio of L:Mo=1:1), 1 mM $ClO_4^-$, pH 3.0, 1 atm $H_2$, 20° C. In panel (FIG. 38e), the molar ratio between the monodentate pyridine and Mo=2:1.

In this design (FIG. 34F), Pd/C is used as the catalyst platform. The porous carbon may accommodate the OAT metal site. The $Pd^0$ nanoparticles simplify the enzymatic electron transfer chain by directly harvesting electrons from $H_2$. Then the key task was to construct a highly active Mo site from molybdate ($Mo^{VI}O_4^{2-}$), a potential Mo source for the biosynthesized Mo co-factors.[10] As shown herein, polyoxometalates of aqueous molybdate[20] were readily adsorbed onto Pd/C within 30 min (FIG. 35). The resulting heterogeneous $MoO_x$—Pd/C showed rapid reduction of $ClO_3^{-21}$ but negligible activity with $ClO_4^-$. Hence, we sought to substantially enhance the OAT activity of surface Mo sites by incorporating an organic ligand. We attempted to prepare active Mo sites in situ by simultaneously adding molybdate and neutral nitrogen ligands (L) in the water suspension of Pd/C under 1 atm $H_2$. This strategy achieved highly active $ClO_4^-$ reduction by a series of (L)$MoO_x$—Pd/C catalysts (FIG. 36, FIG. 37, and FIG. 38).

Figures 39A, 39B, 39C, 39D, 39E, 39F:
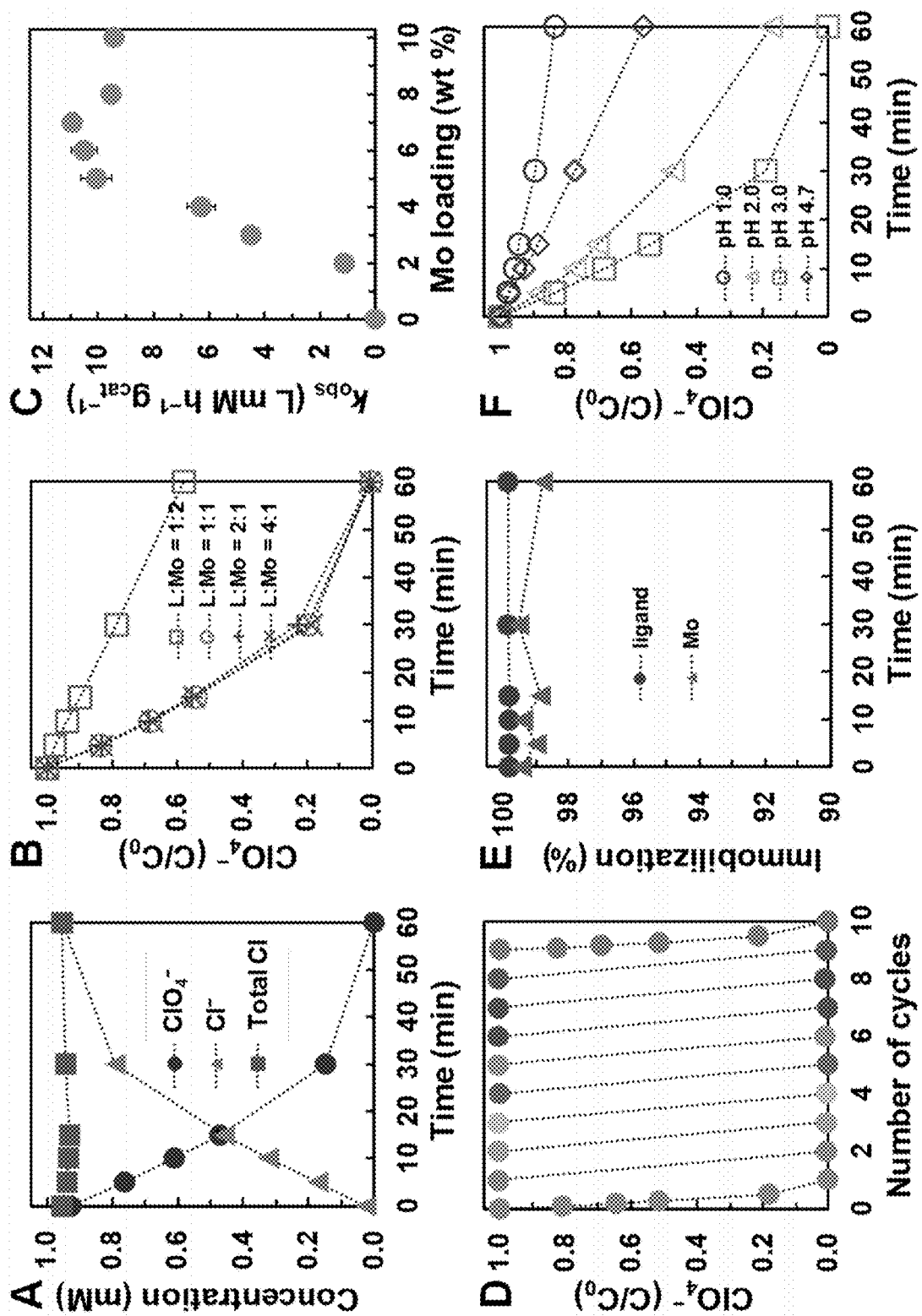
FIGS. 39A-39F. Kinetics data.
Figure 40:
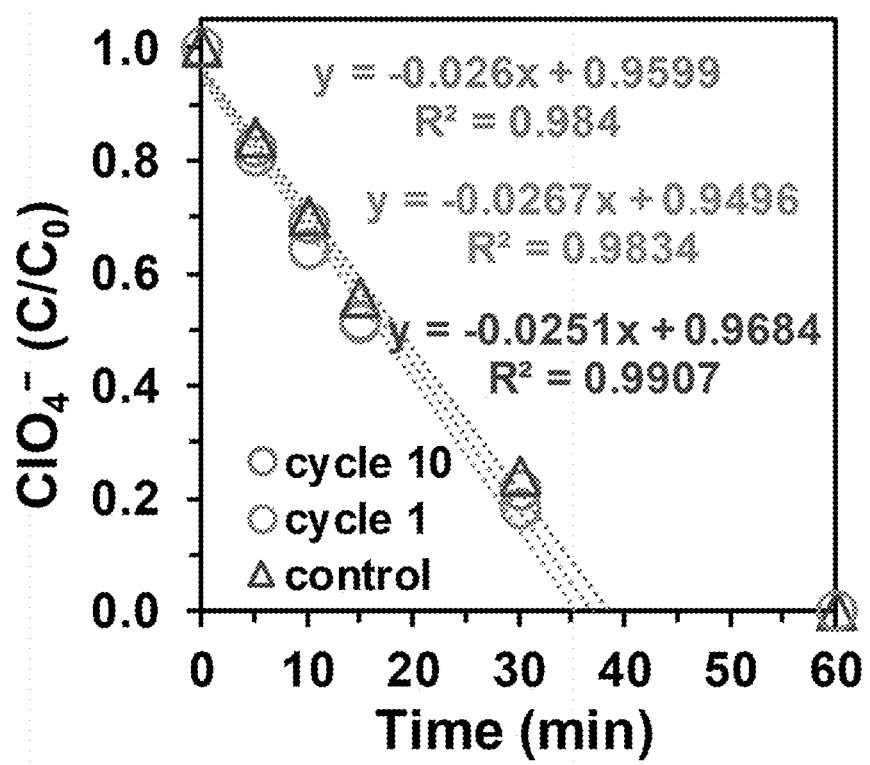
FIG. 40. The reduction of 1 mM $ClO_4^-$ by the freshly prepared (cycle 1) and reused (cycle 10, with nine previous spikes of 1 mM $ClO_4^-$) [$(NH_2)_2$bpy]$MoO_x$—Pd/C catalyst. The $0^{th}$ order fittings were conducted with all data points at $C/C_0$>0.2. Due to the low catalyst loading (0.2 g $L^{-1}$) and the gradual loss of catalyst powder during the filtration-redispersion procedure, the continuous spike experiments were conducted. Each $ClO_4^-$ spike was allowed at least 2 h to achieve complete reduction into $Cl^-$. The ten spikes took two days to finish because no experimentation was performed during the night. The dataset control indicates an experiment using the freshly prepared catalyst in the presence of 9 mM NaCl, which simulated the scenario of complete reduction of nine spikes of 1 mM $ClO_4^-$. The almost overlapping time profiles of the three data sets suggest that the catalyst performance is insensitive to <10 mM of $Cl^-$ and resistant to the acidic and hydrogenating aqueous environment. Reaction condition: 0.2 g $L^{-1}$ catalyst (5 wt % Mo in 5 wt % Pd/C), 1 mM $ClO_4^-$ per spike, pH 3.0, 1 atm $H_2$, 20° C.
Figures 41A, 41B, 41C, 41D:
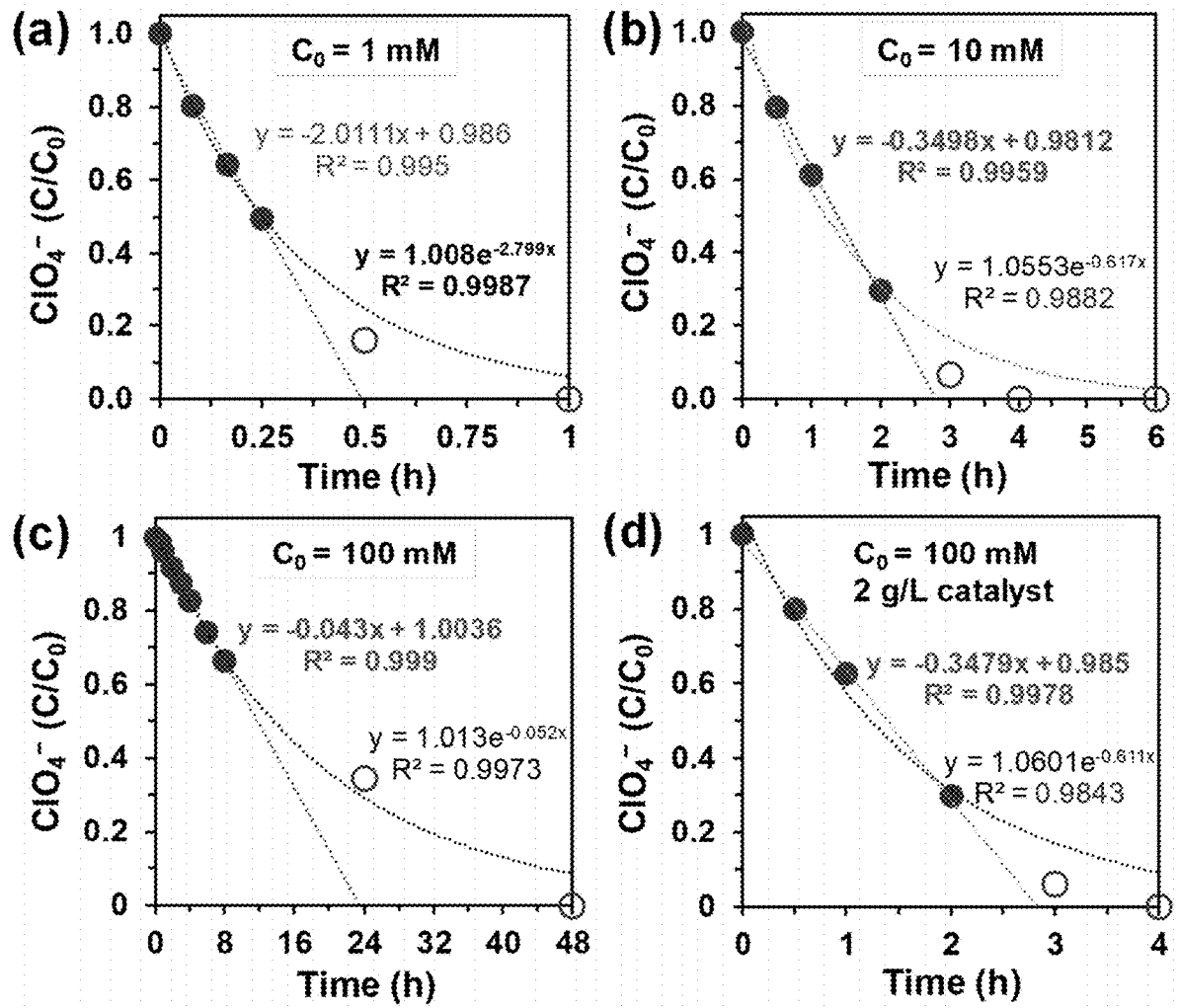
FIGS. 41A-41D. Catalytic reduction of high concentrations ($C_0$=1, 10, and 100 mM) of $ClO_4^-$ by the [$(NH_2)_2$bpy]$MoO_x$—Pd/C catalyst (5 wt % Mo in 5 wt % Pd/C, pH 3.0, 1 atm $H_2$, 20° C.). Panels FIG. 41a, FIG. 41b, and FIG. 41c used 0.2 g $L^{-1}$ catalyst. Panel FIG. 41d used 2.0 g $L^{-1}$ catalyst. The data with $C/C_0$>0.2 were fit with both $0^{th}$- and $1^{st}$-order models. The better fit has the equation highlighted in bold. The slope of the linear fitting (in the unit of $h^{-1}$) indicates the $0^{th}$-order rate constant (mM $h^{-1}$) divided by Co (mM). The discussion under the heading of Langmuir-Hinshelwood Mechanism of Example 80 regarding $k_{obs}=k_2$[S]/[$A_0$] corresponds to the slopes shown in these figures (i.e., $C_0$=[$A_0$]). The first highlight is the decreasing $k_{obs}$ with the increasing [$A_0$] for $ClO_4^-$ (panels FIG. 41a-FIG. 41c). Since the overall reaction model is simplified, the decrease of $k_{obs}$ is not strictly in proportion with the increase of [$A_0$]. The second highlight is the very similar $k_{obs}$ for the reduction of 10 mM $ClO_4^-$ using 0.2 g $L^{-1}$ catalyst and the reduction of 100 mM $ClO_4^-$ using 2.0 g $L^{-1}$ catalyst (i.e., the same ratio of [S]/[$A_0$]) shown in panels FIG. 41b and FIG. 41d.

In general, aromatic bidentate ligands led to significantly higher $ClO_4^-$ reduction activities than amines and monodentate pyridines. Bipyridine (bpy) was superior to phenanthroline and other aromatic ligands containing an imidazoline or oxazoline half moiety (FIG. 36, entries 17-19). Ligands with steric hindrance on the ortho positions (entries 8, 9, and 20) and with a strain on the bpy backbone (entry 22 versus 21) resulted in low activities. Electron-donating groups on the para positions[22] further enhanced the activity. At ambient temperature and pressure, $ClO_4^-$ reduction by the [$(NH_2)_2$bpy]$MoO_x$—Pd/C catalyst (entry 6) outperformed all abiotic catalysts reported to date (Table 16). The chlorine balance was closed by $ClO_4^-$ and $Cl^-$, indicating a negligible buildup of $ClO_x^-$ intermediates (FIG. 39A). The optimal molar ratio between $(NH_2)_2$bpy and Mo was 1:1 (FIG. 39B), and the optimal Mo content in the catalyst was 5 wt % (FIG. 39C). The reuse of the catalyst for ten times did not cause a noticeable loss of activity (FIG. 39D and FIG. 40). During the $ClO_4^-$ reduction, the ratios of leached Mo and $(NH_2)_2$bpy into water were <1.5% and <0.2% of the total amount in the catalyst, respectively (FIG. 39E). The apparent $1^{st}$-order kinetics with 0.01-1 mM $ClO_4^-$ and $0^{th}$-order kinetics at 1-100 mM $ClO_4^-$ (FIGS. 41 and 42) support the Langmuir-Hinshelwood model for heterogeneous catalysis (See under the heading of Langmuir-Hinshelwood mechanism for kinetic modeling and mass transfer analysis). Notably, a 0.2 g/L loading of the catalyst reduced 99.99% of 100 mM $ClO_4^-$ (~10 g/L) within 48 h (FIG. 41C). Due to the high oxidative stress caused by $ClO_x^-$ intermediates,[12,23]

complete reduction of 100 mM $ClO_4^-$ in water has not been reported by either microbial or abiotic systems. Assuming the Mo sites catalyzed the OAT with both $ClO_4^-$ and $ClO_x^-$ intermediates, the turnover number (TON) for the single batch and the initial turnover frequency ($TOF_0$) reached about 3850 and 165 $h^{-1}$, respectively, for each Mo atom.

Figures 44A, 44B:
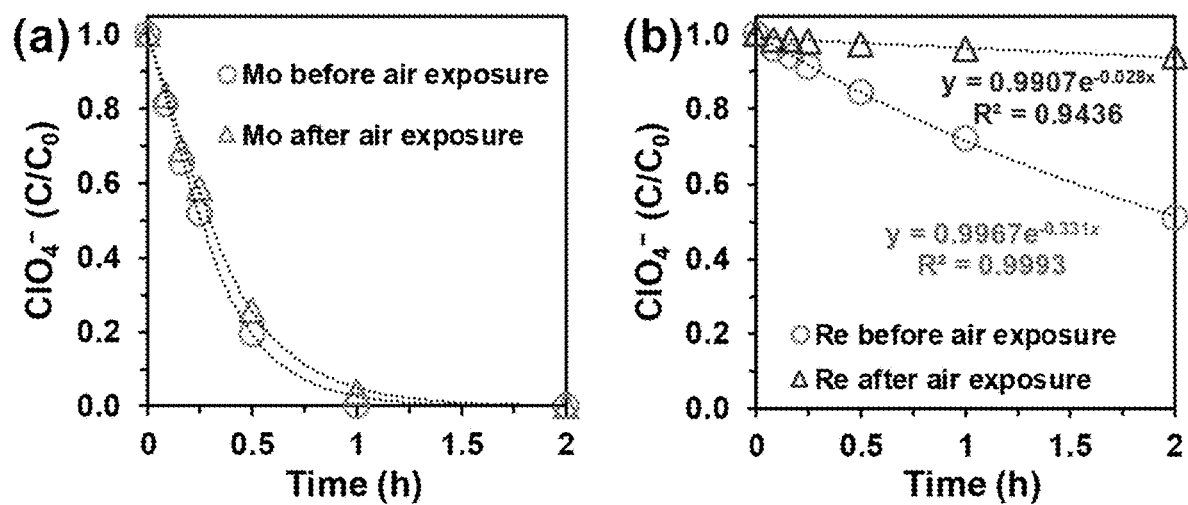
FIGS. 44A-44B. The change of $ClO_4^-$ reduction activity by (FIG. 44a) [$(NH_2)_2$bpy]$MoO_x$—Pd/C and (FIG. 44b) Re(hoz)$_2$-Pd/C before and after air exposure for 1 h. Reaction conditions: 0.2 g $L^{-1}$ catalyst (5 wt % Mo or 5 wt % Re on the same 5 wt % Pd/C material), 1 mM $ClO_4^-$, pH 3.0, 1 atm $H_2$, 20° C. The preparation of both fresh catalysts took 1 h under 1 atm $H_2$. After the air exposure, the catalyst suspensions were treated under 1 atm $H_2$ for another 1 h before adding $ClO_4^-$.

While enzymes use amino acid residues to facilitate the reduction of metal-bound oxyanions,[12,24] the carbon-supported catalyst may need external protons to enable the reaction.[21-22] In this Example, the optimal activity was afforded by 1 mM $H^+$ (pH 3.0 by $H_2SO_4$). The reduced performance at a lower pH (FIG. 39F) was probably caused by the protonation of amino groups on $(NH_2)_2$bpy. In the presence of 0.1 M $Cl^-$, 2.0 M $Cl^-$, and 1.0 M $SO_4^{2-}$, the catalyst retained 57%, 5%, and 36% of activity, respectively (FIG. 43 and Table 13), showing promise for the reduction of $ClO_4^-$ in brine solutions produced from ion-exchange or from reverse osmosis for water purification.[1] Furthermore, exposing the catalyst suspension to air did not cause irreversible deactivation. The same $ClO_4^-$ reduction activity was recovered after resuming $H_2$ supply (FIG. 44A), suggesting that the in situ prepared catalyst can be handled in air. In comparison, the Re—Pd/C catalyst using the pre-synthesized $Re^V$ precursor (FIG. 34E)[25] was highly sensitive to air and would irreversibly deactivate (FIG. 4B)[26-27]

TABLE 13

Salt Inhibition of Mo Catalysts with and without the Organic Ligand.[a]

| Salt added | fitting equation | $R^2$ value | rate constant | relative activity |
|---|---|---|---|---|
| $ClO_4^-$ reduction by $[(NH_2)_2bpy]MoO_x$—Pd/C | | | | |
| DI | y = 0.9932 − 0.0305x | 0.9985 | 0.0305 mM $min^{-1}$ | 1 |
| 0.1M NaCl | y = 0.9955 − 0.0175x | 0.9983 | 0.0175 mM $min^{-1}$ | 0.57 |
| 2.0M NaCl | y = 0.9975 − 0.0016x | 0.9628 | 0.0016 mM $min^{-1}$ | 0.052 |
| 1.0M $Na_2SO_4$ | y = 1.0099 − 0.0111x | 0.9985 | 0.0111 mM $min^{-1}$ | 0.36 |
| $ClO_3^-$ reduction by $MoO_x$—Pd/C | | | | |
| DI | y = 1.0126$e^{-0.114x}$ | 0.9996 | 0.114 $min^{-1}$ | 1 |
| 2.0M NaCl | y = 1.0106$e^{-0.062x}$ | 0.9978 | 0.062 $min^{-1}$ | 0.54 |
| 1.0M $Na_2SO_4$ | y = 0.9858$e^{-0.045x}$ | 0.9988 | 0.045 $min^{-1}$ | 0.39 |

[a]Source data are shown in FIG. 43.

Figures 45A, 45B, 45C, 45D, 45E, 45F, 45G, 45H, 45I, 45J:
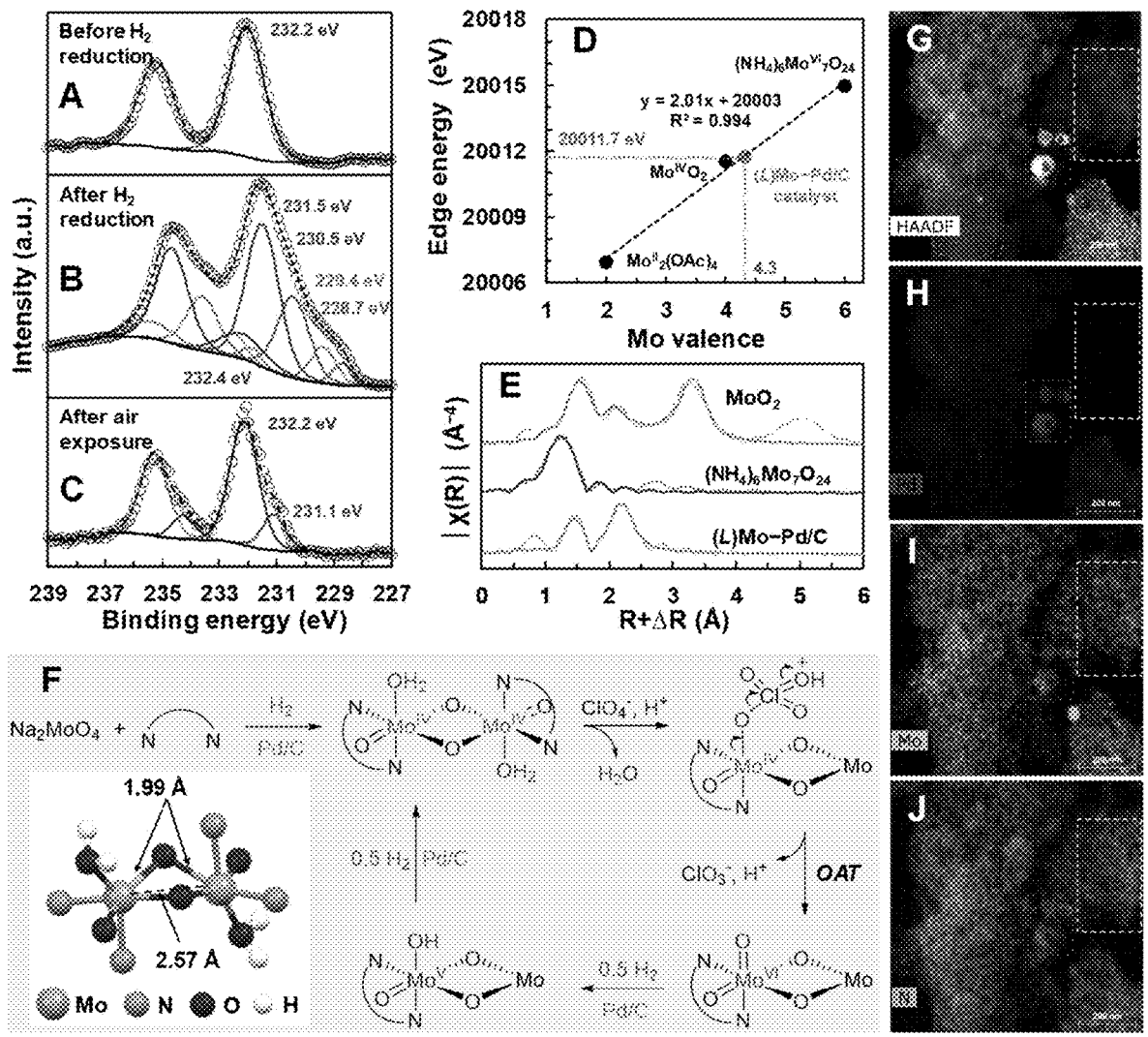
FIGS. 45A-45J. Characterization data and proposed reaction mechanisms.
Figure 46:
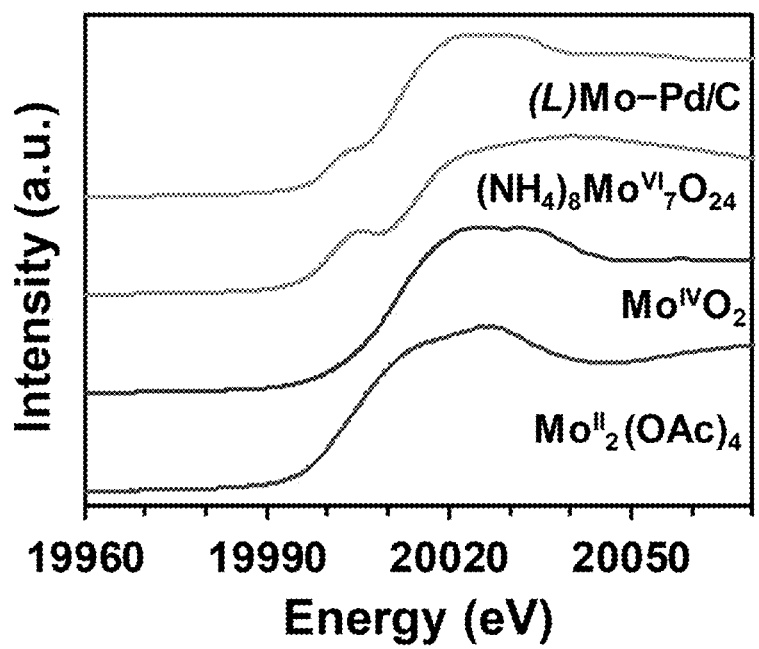
FIG. 46. Mo K-edge X-ray absorption near-edge structure (XANES) spectra of the reduced [$(NH_2)_2$bpy]$MoO_x$—Pd/C and $Mo^{II}$, $Mo^{IV}$, and $Mo^{VI}$ references.
Figure 47:
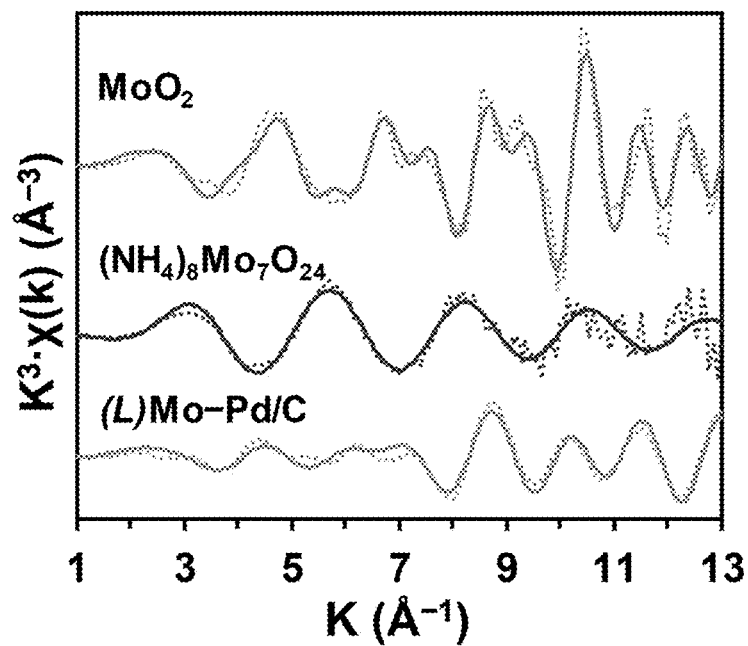
FIG. 47. Mo K-edge extended X-ray absorption fine structure (EXAFS) spectra (dotted line) of the reduced [$(NH_2)_2$bpy]$MoO_x$—Pd/C, $Mo^{II}$ and $Mo^{IV}$ references, and their shell-by-shell fits (solid line).

X-ray photoelectron spectroscopy (XPS) characterization identified the reduction of $Mo^{VI}$ precursor into multiple oxidation states (+VI, +V, +V, +III and +II) (FIG. 45A versus 45B). Air exposure reoxidized the low-valent species to $Mo^V$ and $Mo^{VI}$ (FIG. 45C). For the reduced bulk catalyst sample. Mo K-edge X-ray absorption near-edge structure (XANES) spectroscopic analysis found the average valence of Mo to be 4.3 from the edge energy of 20011.7 eV (FIG. 45D and FIG. 46)[28]. Fitting of the extended X-ray absorption fine structure (EXAFS) spectra found two major atomic shells for Mo—O (1.99±0.03 Å) and Mo—Mo (2.57±0.02 Å) (FIG. 45E, Table 14, and FIG. 47). This short Mo—Mo distance, in comparison to the value of 3.4 Å in $Mo^{VI}$ oxide clusters,[28] indicates the reduction of polymeric molybdate to $Mo^{IV}$ by Pd-activated $H_2$[21] The Mo—Mo coordination number (CN, 0.9±0.5) suggests the heterogeneity of the surface Mo species as a mixture of monomers (CN=0), dimers (CN=1), and polymers (CN>1).

TABLE 14

Mo K-edge EXAFS Shell-by-Shell Fitting Parameters of Mo Standard and Mo—Pd/C Catalyst Samples.

| Sample | shell | $CN^a$ | R (Å)$^b$ | $\sigma^2$ (Å$^2$)$^c$ | ΔE (eV)$^d$ | R-factor |
|---|---|---|---|---|---|---|
| $MoO_2$ | Mo—O | 6 | 1.99 (0.01) | 0.002 (0.001) | −1.4 (2.0) | 0.023 |
| | Mo—Mo | 1 | 2.52 (0.01) | 0.001 (0.001) | | |
| | Mo—Mo | 1 | 3.12 (0.01) | 0.002 (0.001) | | |
| | Mo—Mo | 8 | 3.70 (0.01) | 0.004 (0.001) | | |
| $(NH_4)_6Mo_7O_{24}$ | Mo—O | 4 | 1.74 (0.01) | 0.004 (0.002) | −4.0 (3.3) | 0.012 |
| $[(NH_2)_2bpy]MoO_x$—Pd/C | Mo—O | 1.1 (1.1) | 1.67 (0.03) | 0.002 (0.006) | −6.1 (4.9) | 0.055 |
| | Mo—O | 5.1 (3.1) | 1.99 (0.03) | 0.012 (0.008) | | |
| | Mo—Mo | 0.9 (0.5) | 2.57 (0.02) | 0.002 (0.002) | | |
| $MoO_x$—Pd/C | Mo—O | 0.4 (0.3) | 1.67 (0.04) | 0.002$^e$ | −4.1 (2.9) | 0.030 |
| | Mo—O | 6.1 (1.9) | 2.03 (0.02) | 0.010 (0.004) | | |
| | Mo—Mo | 1.7 (0.6) | 2.56 (0.01) | 0.005 (0.002) | | |

[a]Coordination number;
[b]Interatomic distance;
[c]Debye-Waller factor;
[d]Energy shift;
[e]Fixed during the fitting.

Figures 48A, 48B:
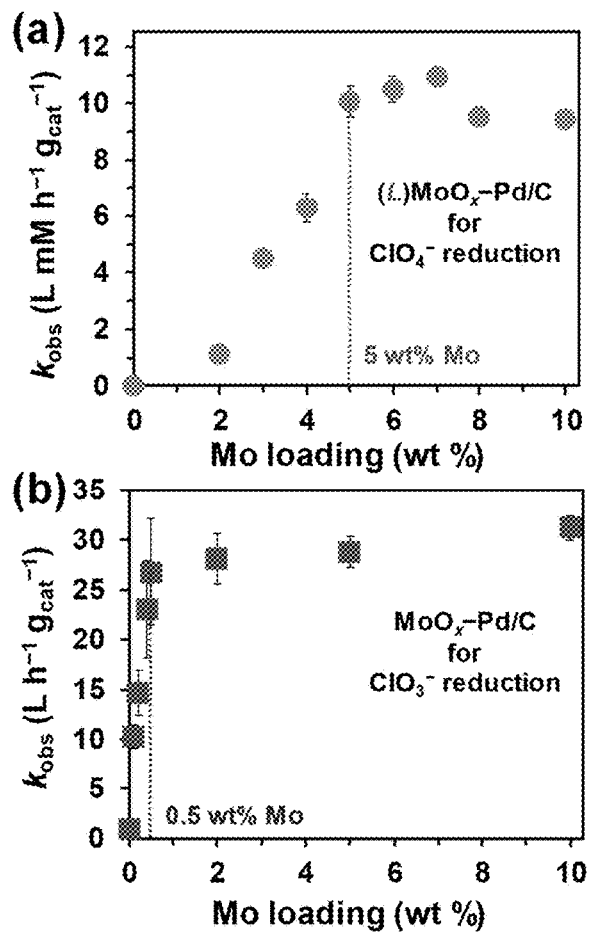
FIGS. 48A-48B. Comparison of the effect of Mo content in (FIG. 48a) [$(NH_2)_2$bpy]$MoO_x$—Pd/C for $ClO_4^-$ reduction and (FIG. 48b) $MoO_x$—Pd/C for $ClO_3^-$ reduction. Both catalysts used the same Pd/C material. Reaction conditions for both systems include 0.2 g $L^{-1}$ catalyst. 1 mM $ClO_4$ or $ClO_3^-$, pH 3.0, 1 atm $H_2$, 20° C. The difference between the two catalyst configurations was the use of $(NH_2)_2$bpy ligand to enable $ClO_4^-$ reduction.
Figures 49A, 49B, 49C:
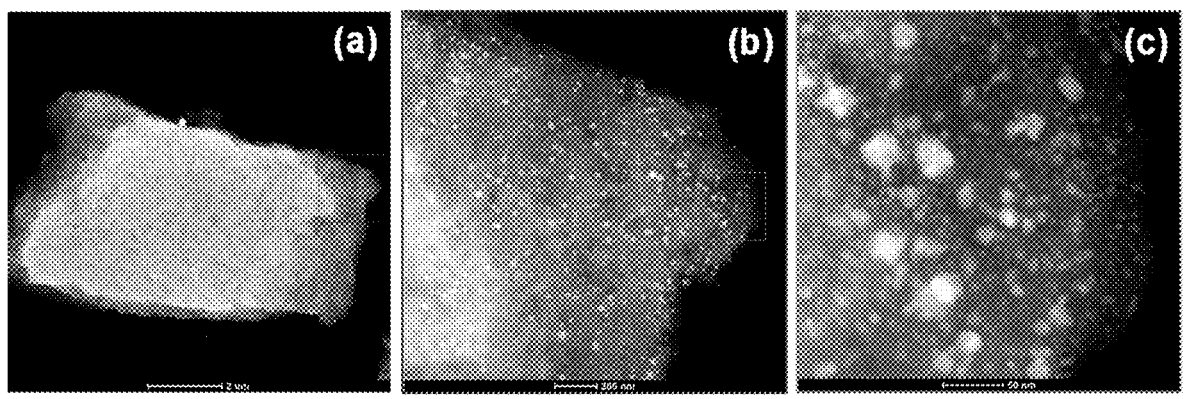
FIGS. 49A-49C. High-angle annular dark-field scanning transmission electron microscopy (HAADF-STEM) characterization of a particle (7 μm×4 μm) of [$(NH_2)_2$bpy]$MoO_x$Pd/C catalyst (5 wt % Mo and 5 wt % Pd). Panels
Figures 50A, 50B, 50C, 50D, 50E, 50F:
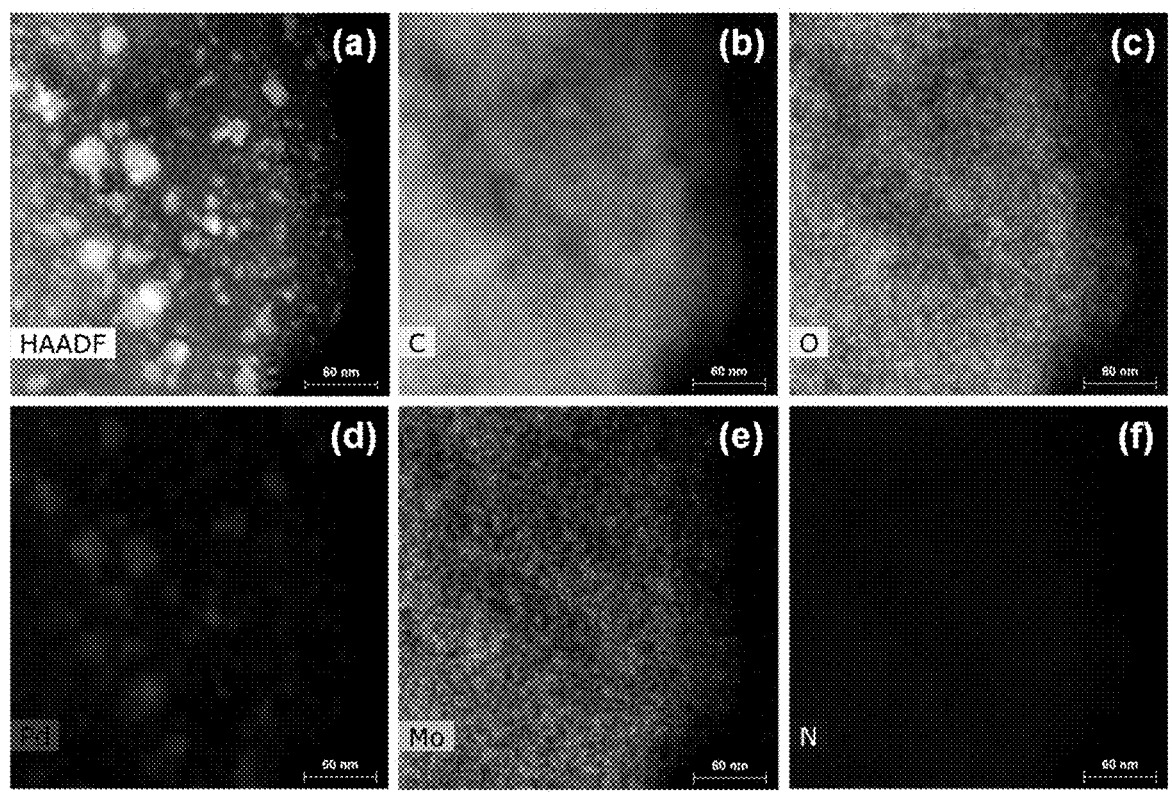
FIGS. 50A-50F. Energy-dispersive X-ray (EDX) elemental mapping of the [$(NH_2)_2$bpy]$MoO_x$Pd/C catalyst shown in FIG. 49.
Figures 51A, 51B, 51C, 51D, 51E, 51F:
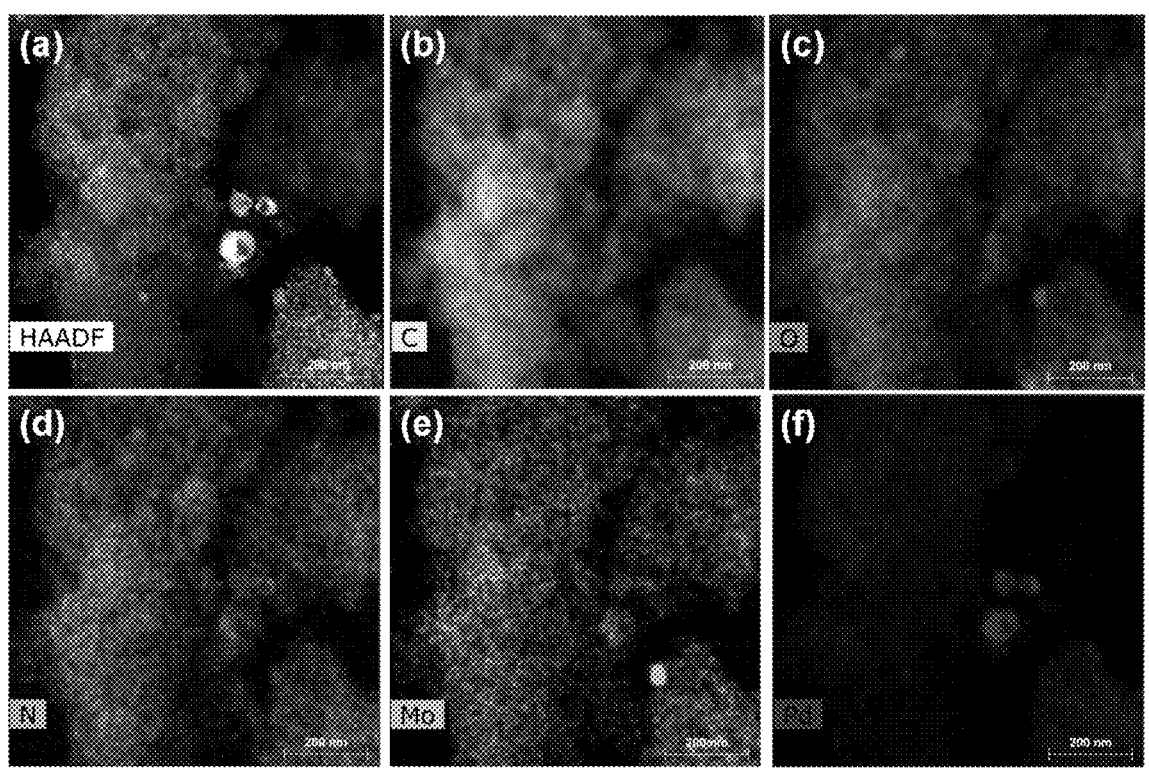
FIGS. 51A-51F. Original HAADF-STEM imaging and EDX mapping of another μm-sized particle of the $[(NH_2)_2bpy]MoO_x$—Pd/C catalyst. This particle shows the heterogeneity of metal distribution in the porous carbon (see FIGS. 45G-45J).

Notably, the use of $(NH_2)_2$bpy ligand changed the structure and activity of $MoO_x$ in the catalyst. Without the ligand, the $MoO_x$—Pd/C catalyst could not reduce $ClO_4^-$, and the highest $ClO_3^-$ reduction was achieved with only 0.5 wt % of Mo (FIG. 48B). Thus, the additional 4.5 wt % of Mo in a 5 wt % $MoO_x$—Pd/C catalyst acted as the structural building block of polymeric $MoO_x$ clusters rather than catalytic sites. The CN for Mo—Mo in $MoO_x$—Pd/C (1.7±0.6, Table 14) also indicated the dominance of polymeric $MoO_x$ clusters.[21] In stark comparison, the $ClO_4^-$ reduction activity of $[(NH_2)_2bpy]MoO_x$—Pd/C showed a linear increase until reaching 5 wt % of Mo (FIG. 48A). Thus, most Mo atoms acted as catalytic sites, and the most probable structure is an oligomer with one $(NH_2)_2$bpy coordinating with each Mo (FIG. 39B). The elevated sensitivity with concentrated $Cl^-$ upon the use of $(NH_2)_2$bpy (Table 13) also corroborates the altered structure of $MoO_x$ by the $(NH_2)_2$bpy ligand. A representative dimer structure (FIG. 45F) is proposed based on the reported crystal structure of $Mo^{VI}_2O_6[(tBu)_2bpy]2$, a byproduct from the hydrothermal reaction using $MoO_3$ and 4,4'-$(tBu)_2$bpy.[29] Such a structure allows for multi-valent transformation of Mo between +VI and +II (FIG. 45B).

Figure 52:
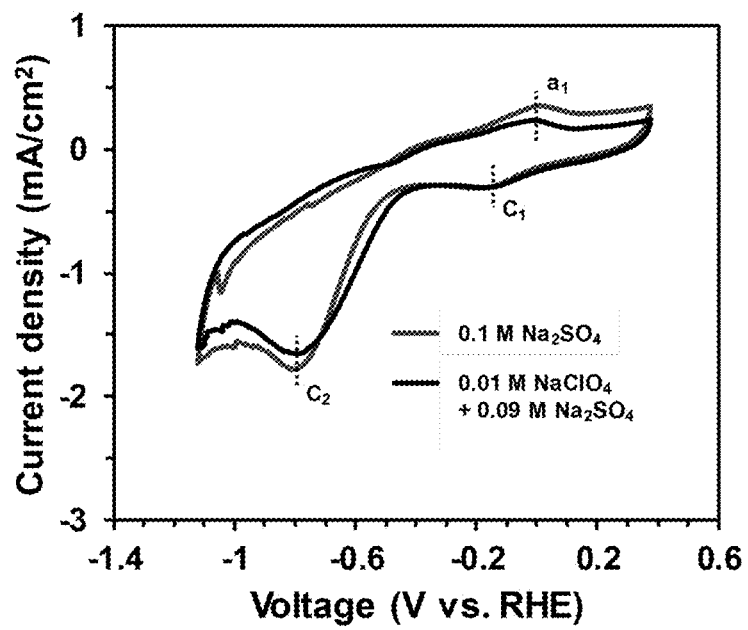
FIG. 52. Cyclic voltammograms (CVs) of $[(NH_2)_2bpy]MoO_x/C$ (no Pd) in the absence and presence of $NaClO_4^-$. The working electrode was prepared by drop-casting $[(NH_2)_2 bpy]MoO_x/C$ onto the glassy carbon electrode. The cyclic voltammetry was performed at pH 3.0 using a Ag/AgCl reference electrode and Pt wire counter electrode. Two cathodic peaks (labeled as $c_1$ and $c_2$, at −0.15 V and −0.8 V) were observed from the scanning in the negative direction. These two peaks are similar to the CVs of aqueous molybdate anions. The anodic counterpart ($a_1$) of $c_1$ was observed at 0.0 V. The large potential difference between $a_1$ and $c_1$ (0.15 V) indicates the irreversibility of the electron transfer process. After the addition of 0.01 M $NaClO_4^-$ into the electrolyte (black trace), there was no formation of a new reduction peak, nor a significant change in current densities at $c_1$ and $c_2$. Therefore, electrochemical $ClO_4^-$ reduction with $[(NH_2)_2bpy]MoO_x/C$ is unlikely to occur. The $H_2$+Pd condition seems necessary to enable $ClO_4^-$ reduction.
Figure 53:
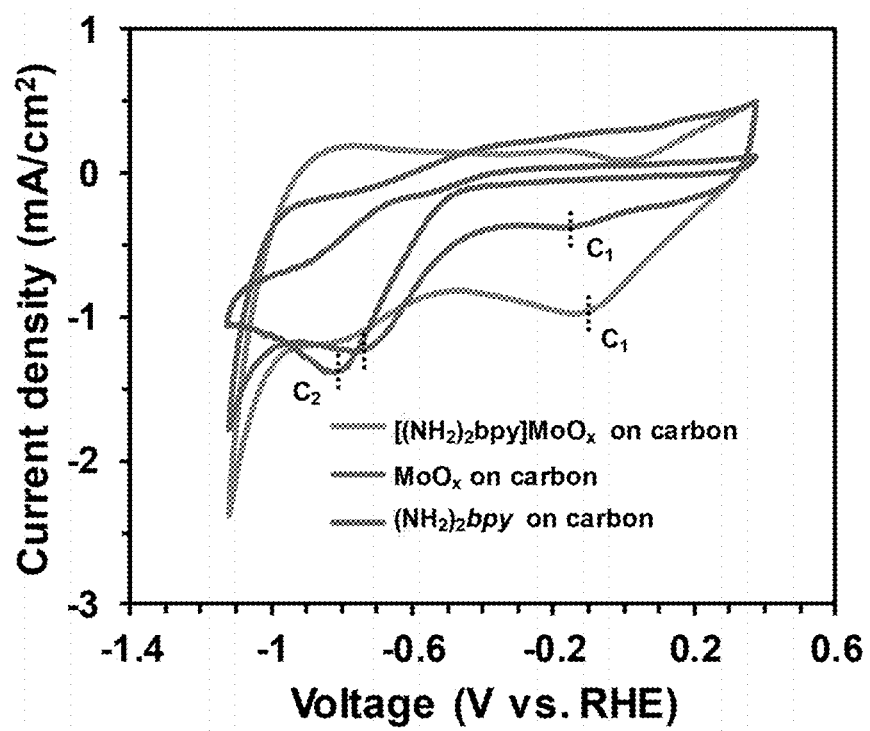
FIG. 53. CVs of $[(NH_2)_2bpy]MoO_x/C$, $MoO_x/C$, and $(NH_2)_2 bpy/C$ in 0.1 M $NaClO_4$. The results confirm that the reduction peak $c_1$ in FIG. 52 arises mainly from the reduction of $MoO_x$ and the reduction peak $c_2$ is a combination of the reduction of $MoO_x$ and $(NH_2)_2bpy$.

Scanning transmission electron microscopy (STEM) and energy dispersive X-ray spectrometry (EDS) element mapping images indicate the ubiquitous distribution of Mo and N on either carbon support or Pd⁰ nanoparticles (FIGS. 45G-45J and FIG. 49-51). The poor EXAFS fittings including Mo—Pd bonding (Table 15) suggest isolated aggregation and distinct roles of Mo sites (OAT for $ClO_4^-$ reduction) and Pd nanoparticles (electron transfer from $H_2$). However, the hydrogenation reaction is necessary to transform the polymeric $Mo^{VI}$ precursors[21] and the free ligand into specific $[(NH_2)_2bpy]MoO_x$ structures to be reactive with $ClO_4^-$. For example, our cyclic voltammetry studies on the $[(NH_2)_2bpy]MoO_x/C$ material (without Pd⁰ nanoparticles) between 0.37 and −1.1 V (versus the reversible hydrogen electrode) did not observe $ClO_4^-$ reduction (FIG. 52) but instead showed the reduction peaks of $MoO_x$ and $(NH_2)_2bpy$ ligand (FIG. 53). The potential allows the reduction of $Mo^{VI}$ into $Mo^V$, $Mo^{IV}$, and $Mo^{III}$ [30-31], but the $[(NH_2)_2bpy]MoO_x$ clusters formed from the electrochemical reduction[28] were probably in different structures and thus not reactive with $ClO_4^-$.

In summary, a highly active and robust heterogeneous (L)$MoO_x$—Pd/C catalyst was developed herein for aqueous $ClO_4^-$ reduction. On the carbon support of Pd/C in this Example, the Mo site is generated in situ from hydrogenating reduction of sodium molybdate and coordination with, for example, a bidentate nitrogen ligand. At 20° C., >99.9% of $ClO_4^-$ in a wide range of initial concentrations (10 μM to 0.1 M) are reduced into Cl⁻ with 1 atm $H_2$. The high activity is attributed to three major mechanisms. First, the OAT energy barrier is lowered by the organic ligand (substituted bpy versus molybdopterin in the Mo co-factor for an enzyme). Second, the redox cycling of Mo is sustained by the electron transfer from $H_2$ (enabled by the Pd⁰ nanoparticle versus multiple biological metal factors). Third, the Mo-bound $ClO_4^-$ requires activation via protonation (externally added acid versus amino acid residues in the enzyme pocket). Mechanistic insights of this Example highlight a new strategy for designing engineered $ClO_4^-$ reduction systems. Water-compatible heterogeneous catalyst systems will advance environmental and energy technologies for the high-performance removal and utilization of $ClO_4^-$ on Earth, Mars, and beyond.

TABLE 15

Mo K-edge EXAFS Shell-by-shell Fitting Parameters of $[(NH_2)_2bpy]MoO_x$—Pd/C Using a Mo—Pd Shell.

| Fitting Method | shell | $CN^a$ | R (Å)$^b$ | $\sigma^2$ (Å$^2$)$^c$ | $\Delta E$ (eV)$^d$ | R-factor |
|---|---|---|---|---|---|---|
| 1 | Mo—O | 0.5 (16.5) | 1.64 (0.80) | 0.001 (0.135) | −10.2 (25.6) | 0.046 |
|   | Mo—O | 1.2 (26.3) | 1.95 (0.17) | −0.00002 (0.081) | | |
|   | Mo—Pd | 1.5 (25.3) | 1.92 (0.70) | 0.015 (0.166) | | |
|   | Mo—Mo | 1.0 (1.8) | 2.55 (0.08) | 0.002 (0.009) | | |
| 2 | Mo—O | −3.1 (43.5) | 1.76 (0.46) | 0.031 (0.233) | −13.9 (6.5) | 0.121 |
|   | Mo—Pd | 2.4 (5.0) | 1.84 (0.04) | 0.014 (0.014) | | |
|   | Mo—Mo | 1.1 (0.8) | 2.54 (0.02) | 0.002 (0.003) | | |
| 3 | Mo—Pd | 2.5 (1.1) | 1.83 (0.02) | 0.014 (0.004) | −17.6 (3.1) | 0.132 |
|   | Mo—Mo | 0.9 (0.5) | 2.53 (0.01) | 0.002 (0.003) | | |

$^a$Coordination number;
$^b$Interatomic distance;
$^c$Debye-Waller factor;
$^d$Energy shifts.

References in Example 80

1. Liu, J.; Choe, J. K.; Wang, Y.; Shapley, J. R.; Werth, C. J.; Strathmann, T. J. Bioinspired complex-nanoparticle hybrid catalyst system for aqueous perchlorate reduction: Rhenium speciation and its influence on catalyst activity. *ACS Catal.* 2015, 5, 511-522.
2. Ren, C.; Yang, P.; Gao. J.; Huo, X.; Min, X.; Bi, E. Y.; Liu, Y.; Wang, Y.; Zhu, M.; Liu, J. Catalytic reduction of aqueous chlorate with $MoO_x$ Immobilized on Pd/C. *ACS Catal.* 2020, 10, 8201-8211.
3. Zabinsky, S.; Rehr, J.; Ankudinov, A.; Albers, R; Eller, M. Multiple-scattering calculations of X-ray-absorption spectra. *Phys. Rev. B* 1995, 52, 2995-3009.
4. Ghasemi, S.; Hosseini, S. R; Nabipour, S.; Asen, P. Palladium nanoparticles supported on graphene as an efficient electrocatalyst for hydrogen evolution reaction. *Int. J. Hydrog. Energy* 2015, 40, 16184-16191.
5. Hurley, K. D.; Zhang, Y.; Shapley, J. R. Ligand-enhanced reduction of perchlorate in water with heterogeneous Re—Pd/C catalysts. *J. Am. Chem. Soc.* 2009, 131, 14172-14173.
6. McPherson, L. D.; Drees, M.; Khan, S. I.; Strassner, T.; Abu-Omar, M. M. Multielectron atom transfer reactions of perchlorate and other substrates catalyzed by rhenium oxazoline and thiazoline complexes: Reaction kinetics, mechanisms, and density functional theory calculations. *Inorg. Chem.* 2004, 43, 4036-4050.
7. Ainsworth, S. Michaelis-Menten Kinetics. In *Steady-State Enzyme Kinetics*: Macmillan Education UK: London, 1977: pp 43-73.
8. Shuai, D.; Choe, J. K.; Shapley, J. R.; Werth, C. J. Enhanced activity and selectivity of carbon nanofiber supported Pd catalysts for nitrite reduction. *Environ. Sci. Technol.* 2012, 46, 2847-2855.
9. Weisz, P.; Prater, C. Interpretation of measurements in experimental catalysis. *Adv. Catal* 1954, 6.60390-60399.
10. Satterfield, C. N. *Mass Transport in Heterogeneous Catalysis*: MIT Press: Cambridge, Mass., 1970.
11. Davie, M. G., Reinhard, M.; Shapley, J. R. Metal-catalyzed reduction of N-nitrosodimethylamine with hydrogen in water. *Environ. Sci. Technol.* 2006, 40, 7329-7335.
12. Heil, S. R.; Holz. M.; Kastner, T. M.; Weingärtner, H. Self-diffusion of the perchlorate ion in aqueous electrolyte solutions measured by $^{35}Cl^-$ NMR spin-echo experiments. *J. Chem. Soc. Faraday Trans.* 1995, 91, 1877-1880.
13. Sänger, P.; Deckwer, W.-D. Liquid-solid mass transfer in aerated suspensions. *Chem. Eng. J.* 1981, 22, 179-186.
14. Sano, Y.; Yamaguchi, N.; Adachi, T. Mass transfer coefficients for suspended particles in agitated vessels and bubble columns. *J. Chem. Eng. Japan* 1974, 7.255-261.
15. Bates, R. L.; Fondy, P. L.; Corpstein, R. R. Examination of some geometric parameters of impeller power. *Ind. Eng. Chem. Process. Des. Dev.* 1963, 2, 310-314.
16. Liu, B.; Yao, H.; Song, W.; Jin, L.; Mosa, I. M.; Rusling, J. F.; Suib, S. L.; He, J. Ligand-free noble metal nanocluster catalysts on carbon supports via "soft" nitriding. *J. Am. Chem. Soc.* 2016, 138, 4718-4721.
17. You, J.; Wu, D.; Liu, H. Electrochemical studies of molybdate and thiomolybdates. *Polyhedron* 1986, 5, 535-537.
18. Hurley, K. D.; Shapley, J. R. Efficient heterogeneous catalytic reduction of perchlorate in water. *Environ. Sci. Technol.* 2007, 41, 2044-2049.

19. Liu, J.; Han, M.; Wu, D.; Chen, X. Choe, J. K.; Werth, C. J.; Strathmann, T. J. A new bioinspired perchlorate reduction catalyst with significantly enhanced stability via rational tuning of rhenium coordination chemistry and heterogeneous reaction pathway. *Environ. Sci. Technol.* 2016, 50, 5874-5881.

20. Abu-Omar, M. M.; McPherson, L. D.; Arias, J.; Béreau, V. M. Clean and efficient catalytic reduction of perchlorate. *Angew. Chem.* 2000, 112, 4480-4483.

21. Ford, C. L.; Park, Y. J.; Matson, E. M.; Gordon, Z.; Fout, A. R. A bioinspired iron catalyst for nitrate and perchlorate reduction. *Science* 2016, 354, 741-743.

22. Drummond, M. J.; Miller, T. J.; Ford, C. L.; Fout, A. R. Catalytic perchlorate reduction using iron: Mechanistic insights and improved catalyst turnover. *ACS Catal.* 2020, 10, 3175-3182.

23. Choe, J. K.; Shapley, J. R.; Strathmann, T. J.; Werth, C. J. Influence of rhenium speciation on the stability and activity of Re/Pd bimetal catalysts used for perchlorate reduction. *Environ. Sci. Technol.* 2010, 44, 4716-4721.

received. Aqueous solutions were prepared with deionized (DI) water (resistivity >18.2 MΩ cm). The 5 wt % Pd/C (Sigma-Aldrich, catalog #330116) was wet sieved to obtain the <37 μm fraction, dried under air at 110° C. for 2 h and heated under $H_2$ flow at 250° C. for 1 h.[1] The treated Pd/C had the surface area of 860 $m^2$ $g_{cat}^{-1}$, the pore volume of 0.67 $cm^3$ $g^{-1}$, the average pore size of 3.1 nm, and the Pd surface area of 6.9 $m^2$ $g_{cat}^{-1}$ (Pd dispersion of 31% and average Pd particle size of 3.7 nm).[2] Control experiments suggest that the (L)$MoO_x$—Pd/C catalysts prepared from the Pd/C with and without the sieving and reducing treatments showed very similar performance in $ClO_4^-$ reduction.

Catalyst Preparation

This procedure describes the in situ preparation of the typical 0.2 g $L^{-1}$ loading of [$(NH_2)_2$bpy]$MoO_x$—Pd/C catalyst with 5 wt % Mo and the same molar amount of the $(NH_2)_2$bpy ligand. A 50-mL round bottom flask was sequentially loaded with 49 mL of DI water (pH adjusted to 3.0 with $H_2SO_4$), 10 mg of Pd/C powder, 0.5 mL of $Na_2MoO_4$ stock solution (containing 0.5 mg or 5.2 μmol of Mo), 0.5

TABLE 16

Performance of Abiotic Metal-Catalyzed Perchlorate Reduction Systems.

| Entry | Catalyst | Catalyst loading | Reaction Medium | Reductant | Moisture sensi-tivity | Air sensi-tivity | $[ClO_4^-]_0$ (mM) | TON | $TOF^a$ ($h^{-1}$) | Apparent rate constant or $ClO_4^-$ conversion | Ref. |
|---|---|---|---|---|---|---|---|---|---|---|---|
| Heterogeneous Catalysts-Mo and Re |||||||||||||
| 1 | [$(NH_2)_2$bpy] $MoO_x$—Pd/C | 0.2 g $L^{-1,b}$ | Water (pH 3.0) | $H_2$ (1 atm) | No | $No^e$ | 0.01 | 0.4 | 4.2 | 11.1 $h^{-1}$ | this study |
| 2 | | | | | | | | 38.5 | 106 | 2.8 $h^{-1}$ | |
| 3 | | | | | | | 10 | 385 | 137 | 3.5 mM $h^{-1,h}$ | |
| 4 | | | | | | | 100 | 3850 | 165 | 4.3 mM $h^{-1,h}$ | |
| 5 | $ReO_x$—Pd/C | 2.0 g $L^{-1,c}$ | Water (pH 2.7) | $H_2$ (1 atm) | No | $Yes^f$ | 2 | 13 | 4.2 | 0.33 $h^{-1}$ | 18 |
| 6 | [Re(O)$_2$(Me$_2$Npy)$_4$]—Pd/C | 1.0 g $L^{-1,d}$ | Water (pH 2.7) | $H_2$ (1 atm) | No | N/A | 2 | 40 | 31 | 0.80 $h^{-1}$ | 5 |
| 7 | Re(O)(hoz)$_2$—Pd/C | 0.5 g $L^{-1,b}$ | Water (pH 3.0) | $H_2$ (1 atm) | No | $Yes^g$ | 1 | 30 | 72 | 2.5 $h^{-1}$ | 1 |
| 8 | | | | | | | 10 | 300 | 64 | 0.22 $h^{-1}$ | 19 |
| Homogeneous Catalysts- Re and Fe |||||||||||||
| 9 | [Re(O)(hoz)$_2$(OH$_2$)]$^+$ | 0.03 equiv | $CH_3CN/H_2O$ (v/v 95/5) | $CH_3SCH_3$ (5.4 equiv) | No | No | 92 | 31 | 7.8 | 100% after 4 h | 20 |
| 10 | [N(afa$^{Cy}$)$_3$Fe(OTf)]$^+$ | 1 equiv | $CH_3CN$ (anhydrous) | Diphenyl-hydrazine (4.0 equiv) | Yes | Yes | 0.03 | 3 | 0.19 | 75% after 16 h | 21 |
| 11 | | 0.05 equiv | THF (anhydrous) | | | | 0.02 | $76^i$ | 3.2 | 86% after 24 h | 22 |

$^a$Turnover frequencies are either calculated using the degradation of the first 5% of the initial $ClO_4^-$ concentration or as reported in the cited literature.
$^b$These catalysts contained ~5 wt % Mo or Re, and 5 wt % Pd.
$^c$This catalyst contained 5.7 wt % Re and 5 wt % Pd. $ReO_x$ catalysts were prepared from $KReO_4$.
$^d$This catalyst contained 3.7 wt % Re and 5 wt % Pd. The catalyst can also be prepared in situ with 2:1 molar ratio of Me$_2$Npy:KReO$_4$ added into Pd/C.
$^e$Air exposure oxidized the reduced Mo, but metal leaching was minimal (<1.5%) and the catalytic activity was fully restored upon the re-application of 1 atm $H_2$. See FIG. 44a.
$^f$Air exposure oxidized the reduced Re and caused significant leaching (>50%), but the catalytic activity was fully restored upon the re-application of 1 atm $H_2$.[23]
$^g$Air exposure caused irreversible decomposition of the Re(hoz)$_2$ complex into $ReO_4^-$ and free hoz ligand. The activity could not be restored. See FIG. 44b.
$^h$Zero-order kinetics shown at high $ClO_4^-$ concentrations. See Langmuir-Hinshelwood Mechanism section for details.
$^i$TON was increased from entry 10 due to the addition of [N(afa$^{Cy}$)$_3$Zn(OTf)]$^+$ as a sacrificial agent to remove $Cl^-$ from the poisoned catalyst. [N(afa$^{Cy}$)$_3$FeCl]$^+$ Materials and Methods
Reagents and Materials Sodium molybdate dihydrate ($Na_2MoO_4 \cdot 2H_2O$), ammonium molybdate tetrahydrate [$(NH_4)_6Mo_7O_{24} \cdot 4H_2O$], molybdenum(IV) oxide ($MoO_2$), and molybdenum(I) acetate dimer [$Mo_2(OCOCH_3)_4$] were purchased from Sigma-Aldrich. The nitrogen ligands were purchased from Alfa Aesar, Ark Pharm, Combi-Blocks, Oakwood Chemical, Sigma-Aldrich, and TCI. Inorganic salts (e.g., $NaClO_4$, NaCl, and $Na_2SO_4$) in ≥99% purities were purchased from Fisher Chemical. Sulfuric acid solution (2 N standard) was purchased from Alfa Aesar. All chemicals were used as mL of aqueous $(NH_2)_2$bpy stock solution (containing 5.2 μmol of ligand), and a magnetic stir bar. The flask was sealed with a rubber stopper and sonicated for 1 min, and then placed in the fume hood. $H_2$ gas (99.999%, Airgas) was supplied by two 16-gauge (diameter) and 6-inch (length) stainless steel needles penetrating the stopper as the gas inlet and outlet, respectively. The aqueous suspension was stirred at 1600 rpm under 1 atm $H_2$ headspace for 1 h to afford the suspension of [$(NH_2)_2$ bpy]$MoO_x$—Pd/C catalyst. All parameters such as Mo concent, catalyst loading, solution pH, and ligand structure can be readily adjusted.

Perchlorate Reduction

The reduction of the typical 1 mM $ClO_4^-$ was initiated by adding 0.25 mL of $NaClO_4$ stock solution (200 mM) into the catalyst suspension. For the initial $ClO_4^-$ concentration of 100 mM, 612.5 mg of solid $NaClO_4$ was added into the suspension. All reactions were carried out at room temperature (20° C.) and under 1 atm $H_2$ atmosphere. The flow rate of $H_2$ was about 1-2 bubbles per second coming out from the 16-gauge needle tip to maintain a slightly positive pressure of the $H_2$ headspace inside the flask. The solution pH remained at pH 2.9-3.0 throughout the reaction because the reduction of $ClO_4^-$ does not consume $H^+$. Aliquots were collected through the $H_2$ outlet needle with a 3-mL plastic syringe and immediately filtered through a 0.22-μm cellulose membrane to quench reactions.

Aqueous Sample Analysis

The quantitation of $ClO_4^-$ and $Cl^-$ was conducted by ion chromatography (Dionex ICS-5000 system with a conductivity detector and a 25 μL sample injection loop). Samples from the reduction of 100 mM of $ClO_4^-$ were diluted 100 times before analysis. A Dionex IonPac AS16 analytical column was used at 30° C., with 65 mM KOH at the flow rate of 1 mL min$^{-1}$ as the eluent. The concentration of total Mo in aqueous samples was analyzed by inductively coupled plasma-mass spectrometry (ICP-MS, Agilent 7700). The concentration of free N ligand in aqueous samples was quantified by high-performance liquid chromatography (HPLC) with a photodiode array (PDA) detector (Shimadzu Nexera XR).

Catalyst Collection and Characterization

After disconnection from the $H_2$ supply, the flask was kept sealed by the rubber stopper and immediately transferred into an anaerobic glove bag (Coy Laboratories, filled with 98% $N_2$ and 2% $H_2$) to avoid artifacts from air exposure. The catalyst suspension was filtered through a ceramic funnel covered with filter paper (Whatman qualitative) under vacuum. The filter paper was transferred into a 20-mL scintillation vial and dried in a sand bath at 110° C. to remove moisture. The dried catalyst powder was collected and stored in the glove bag until XPS and XAS analysis (see below). For microscopy analysis, the catalyst powder was re-dispersed in distilled water and sonicated for 30 min. A drop of the suspension was loaded onto the copper microgrids and dried under vacuum. The distribution of Mo, Pd, N, O, and C elements was characterized by high-angle annular dark-field (HAADF) imaging with scanning transmission electron microscopy (STEM, FEI Titan Themis 300, operated at 300 kV) at the UC Riverside Central Facility for Advanced Microscopy and Microanalysis (CFAMM).

X-Ray Photoelectron Spectroscopy (XPS)

Inside the glove bag, the dried powder was loaded onto a copper conductive tape on the XPS sample holder and stored in an anaerobic chamber secured with Klein Flange before transferring to the XPS facility at the UC Irvine Materials Research Institute (IMRI). All XPS experiments were performed on the Kratos AXIS Supra surface analysis instrument. The sp$^2$ C 1s peak (284.5 eV) of the carbon support was used for binding energy (BE) calibration. The BE of $Mo^{II}$, $Mo^{IV}$, and $Mo^{VI}$ standards were acquired in our previous study.[2] Spectra in the resolution of 0.1 eV were fit using CasaXPS (version 2.3.19). Spectra of Mo 3d (30 scans) were fit with the constrained peak separations (3.15 eV) and the constrained ratio of peak areas (3:2) of 3d spin-orbital coupling doublets.

X-Ray Absorption Spectroscopy (XAS)

The preparation and transfer of XAS samples are the same as mentioned above. Mo K-edge EXAFS data were collected at beamlines 4-1 and 2-2 at Stanford Synchrotron Radiation Light source. The sample chamber was purged with $N_2$ during data collection to minimize the artifact caused by atmospheric $O_2$. Both transmission and fluorescence signals were acquired. A Mo metal foil reference was concomitantly measured with the samples for energy calibration ($E_0$=2000 eV). Zirconium (Z-2) metal foil was used as the filter for collecting fluorescence signals. Athena was used for energy calibration, raw spectra average, post-edge normalization, and background removal.[2] Artemis was used to obtain the structural parameters by fitting k$^3$-weighted EXAFS spectra to the standard EXAFS equation using several single-scattering paths. The fittings were over a k range of 3-13 Å$^{-1}$ and an R range of 1.0-3.0 Å for the catalyst sample, a k range of 3-12 Å and an R range of 1.2-3.9 Å for $MoO_2$ standard, and a k range of 3-12 Å$^{-1}$ and an R range of 0.9-2.0 Å for $(NH_4)_6Mo_7O_{24}$ standard as reported previously.[2] Phase and amplitude functions for the scattering paths were generated using FEFF6$^3$ based on the structures of $MoO_2$, $MoO_3$, and monomolybdate. In all fittings, the number of independent variables included was fewer than the number of independent data points. The Hanning window was used for the Fourier transform of the EXAFS data.

Electrochemical Study

Samples for electrochemical studies were prepared by immobilizing $Na_2MoO_4$, free $(NH_2)_2$bpy, and the 1:1 mixture of $(NH_2)_2$bpy+$Na_2MoO_4$ onto activated carbon powder with the same adsorption procedures used for the in situ preparation of [$(NH_2)_2$bpy]$MoO_x$—Pd/C. The activated carbon did not contain Pd because Pd$^0$ nanoparticles can catalyze the hydrogen evolution reaction[4] and interfere with the reduction of [$(NH_2)_2$bpy]$MoO_x$. Catalyst ink was prepared by dispersing 5 mg of each carbon powder sample in the mixture of 5 ml Nafion, 500 ml ethanol, and 250 ml deionized water. Aliquots of 2 ml of the catalyst ink were applied twice onto the glassy carbon electrode. After the ink was dried in air, the working electrode was ready for use. The electrochemical cell was purged with Ar gas before measurement to prevent the artifacts from atmospheric oxygen. Cyclic voltammetry was performed at pH 3.0 using an Ag/AgCl reference electrode and platinum wire counter electrode.

Langmuir-Hinshelwood Mechanism

The kinetic data of [$(NH_2)_2$bpy]$MoO_x$—Pd/C catalyst was analyzed with the Langmuir-Hinshelwood (LH) model. Previous works suggest that the reduction of $ClO_4^-$ to $ClO_3^-$ by the active sites is the rate-limiting step.[5,6] The surface reactions can be simplified with the one-site model[7] shown in Scheme S1. At the water-catalyst interface, aqueous $ClO_4^-$ reversibly coordinates with the surface Mo center in the first step (i.e., the adsorption of $ClO_4^-$). The carbon surface has a very low affinity to $ClO_4^-$. Then, the reduction of Mo-coordinated $ClO_4^-$ is enabled by the two-electron oxygen atom transfer (OAT) reaction, resulting in the formation of Mo=O and the dissociation of $ClO_3^-$.

Scheme S1.

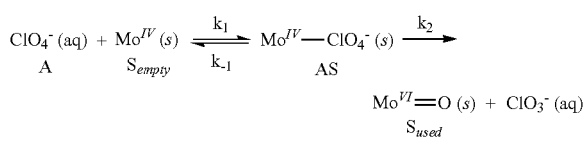

Langmuir-Hinshelwood model for $ClO_4^-$ reduction by $[(NH_2)_2bpy]MoO_x$—Pd/C. The catalytic reduction proceeds on the surface of the solid catalyst. First, aqueous phase $ClO_4^-$ (A) reversibly coordinates with the unoccupied $Mo^{IV}$ active sites ($S_{empty}$), forming a $Mo^{IV}$—$ClO_4^-$ (AS) intermediate. Then, the OAT reaction affords the reduction of $ClO_4^-$ and the formation of $Mo^{VI}=O$ ($S_{used}$). The following assumptions are made: (i) the reduction of $ClO_4^-$ is the rate-limiting step. (ii) the regeneration of $S_{used}$ by Pd/C and $H_2$ is fast and complete; therefore, the number of total active sites (S) is approximately equal to the summation of $S_{empty}$ and AS (i.e., the surface concentration of $S_{used}$ is close to zero), (iii) there is no activity loss of the Mo sites, and (iv) the adsorption of $ClO_4^-$ on activated carbon is minimal. The global reaction rate (r) is defined by $$r = k_2[AS] = k_2\theta[S] \tag{1}$$

where [S] and [AS] denote the surface concentration of total active sites and occupied sites, respectively. $\theta$ is the surface coverage, which is defined as $\theta=[AS]/[S]$. Because the adsorption and desorption of $ClO_4^-$ are assumed to be fast, the steady-state approximation is applied to AS. Therefore, the concentration variation of AS with respect to time is expressed as $$\frac{d[AS]}{dt} = k_1[A][S](1-\theta) - k_{-1}[S](\theta) - k_2[S](\theta) = 0 \tag{2}$$

$\theta$ is solved as $$\theta = \frac{k_1[A]}{k_1[A] + k_{-1} + k_2} \tag{3}$$

Because the OAT reaction is assumed to be the rate-limiting step (i.e., $k_2 \ll k_1[A]$ and $k_{-1}$), $\theta$ can be simplified to $$\theta = \frac{k_1[A]}{k_1[A] + k_{-1}} \tag{4}$$

From Eq. 4 and Eq. 1, r can be expressed in terms of [A] and [S] by $$r = \frac{K_1 k_2 [A][S]}{K_1[A] + 1} \tag{5}$$

in which $K_1 = k_1/k_{-1}$ is the equilibrium constant and [A] is the aqueous concentration of $ClO_4^-$ at any given time. Based on the kinetic results, we notice that the observed rate constant, $k_{obs}$, varies in terms of the initial concentration of $ClO_4^-$ (i.e., $[A_0]$). Hence, we define a new term $\varphi$, in which $\varphi=[A]/[A_0]$, and replace [A] with $\varphi[A_0]$ in Eq. 5.

$$r = \frac{K_1 k_2 [A_0][S]\varphi}{K_1[A_0]\varphi + 1} \tag{6}$$

At high Initial concentrations, in which $K_1[A_0]\varphi \gg 1$, Eq. 6 can be further simplified to $$r = k_2[S] \tag{7}$$

Eq. 7 demonstrates that the reaction is zeroth-order with respect to $ClO_4^-$. This rate law is in good agreement with our kinetic results, in which zeroth-order fitting provides >0.99 $R^2$ values (i.e., coefficient of determination) for 1, 10 and 100 mM $ClO_4^-$ reduction by the $[(NH_2)_2bpy]MoO_x$—Pd/C catalyst (FIG. 41). Furthermore, the concentration variations of $ClO_4^-$ can be described by $$\frac{d[A]}{dt} = -k_2[S] \tag{8}$$

Upon integration and rearrangement, we can obtain the following kinetic equation $$\varphi = -\frac{k_2[S]}{[A_0]}t + 1 \tag{9}$$

Eq. 9 shows that $k_{obs}=k_2[S]/[A_0]$ at high $ClO_4^-$ concentrations. This kinetic pattern agrees with our experimental observations. When the initial concentration of $ClO_4^-$ increased from 1 to 100 mM and the catalyst loading remained constant (i.e., [S] does not change), the $k_{obs}$ decreased from 2.01 to 0.043 mM h$^{-1}$ (FIG. 41, panels a-c). In addition, $k_{obs}$ values were almost identical when we scaled up the reaction proportionally (e.g., reduction of 10 mM $ClO_4^-$ by 0.2 g L$^{-1}$ catalyst and reduction of 100 mM $ClO_4^-$ by 2 g L$^{-1}$ catalyst, FIG. 41, panel c versus d).

At low initial concentrations, in which $K_1[A_0]\varphi \ll 1$, Eq. 6 becomes $$r = K_1 k_2 [A_0][S]\varphi \tag{10}$$

Now the reaction is first-order in $\varphi$ (i.e., first-order in $[ClO_4^-]$). Similarly, the reduction of $ClO_4^-$ can be described by $$\frac{d[A]}{dt} = -K_1 k_2 [A_0][S]\varphi \tag{11}$$

And the following equation holds for low concentrations scenarios $$\varphi = e^{-K_1 k_2 [S]t} \tag{12}$$

Figures 42A, 42B, 42C, 42D:
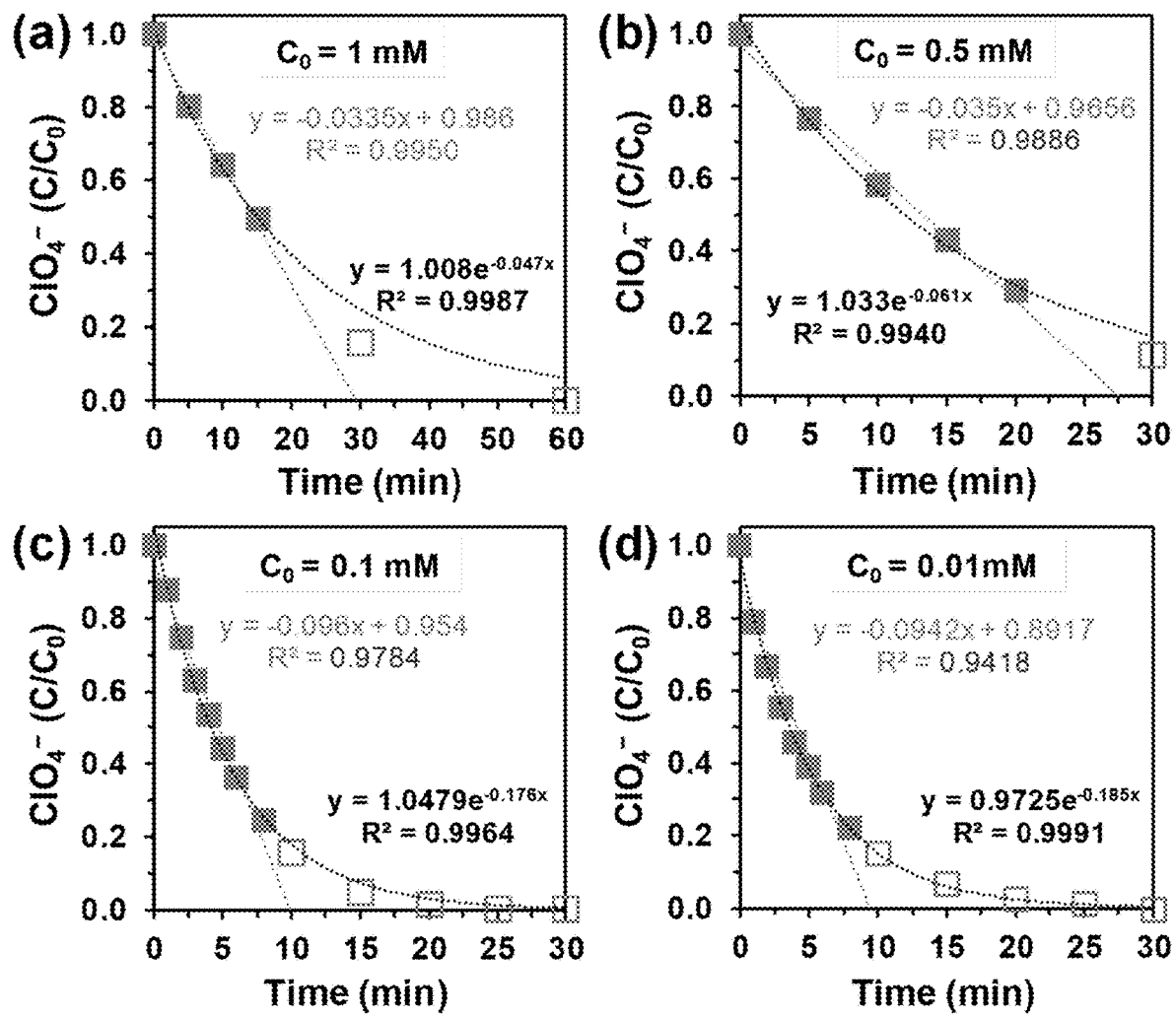
FIGS. 42A-42D. Catalytic reduction of low concentrations ($C_0$=1, 0.5, 0.1, and 0.01 mM) of $ClO_4^-$ by 0.2 g $L^{-1}$ of [$(NH_2)_2$bpy]$MoO_x$—Pd/C catalyst (5 wt % Mo in 5 wt % Pd/C, pH 3.0, 1 atm $H_2$, 20° C.). The data with $C/C_0$>0.2 were fit with both $0^{th}$- and $1^{st}$-order models. The better fit has the equation highlighted in bold. The power of the exponential fitting indicates the first-order rate constant ($min^{-1}$, independent from $C_0$). The highlight is the consistent $1^{st}$-order $k_{obs}$ values when the kinetics cannot be fit by the $0^{th}$-order model (i.e., $R^2$<0.98 when $C_0$=0.1 and 0.01 mM).

Eq. 12 shows that $k_{obs}$ is not a function of $[A_0]$. In other words, $k_{obs}$ remains constant regardless of $[A_0]$. This kinetic pattern agrees with our experimental results, in which $k_{obs}$ remained the same when the initial concentration of $ClO_4^-$ varied from 0.1 to 0.01 mM (FIG. 42, panels a-c).

Mass Transfer Analysis

A prerequisite of the LH kinetic model is the assumption that surface reactions constitute the rate-limiting step. This assumption implies that the diffusion of $ClO_4^-$ from the bulk solution phase to the liquid-solid interface is much faster than the chemical reactions on the surface. Therefore, evaluations of external and internal mass transfer are essential to verify the assumption. To evaluate the effect of pore diffusion resistance (i.e., internal mass transfer) on the measured reaction rates, we applied Weisz-Prater (WP) criterion for the system under consideration here.[8,9] In general, the WP criterion and WP parameter ($C_{WP}$) are described below:

If $$C_{WP} = \frac{k_{obs}\tau R^2}{D\theta} < 1,$$

the internal mass transfer limitation is negligible
If $$C_{WP} = \frac{k_{obs}\tau R^2}{D\theta} > 1,$$

the internal mass transfer limitation is significant
In the expression of $$C_{WP} = \frac{k_{obs}\tau R^2}{D\theta}, k_{obs}$$

is the observed pseudo-first-order rate constant of heterogeneous reaction ($min^{-1}$), R is the radius of the catalyst particle (m), $\tau$ is the tortuosity factor of the catalyst particle, $\theta$ is the porosity of the catalyst particle, and D is the diffusion coefficient of reactant in bulk solution ($m^2s^{-1}$).

To conservatively evaluate $C_{WP}$, we used the largest observed reaction rate (i.e., 0.185 $min^{-1}$) from this study. The diameter of the catalyst particle is 37 μm because the commercial Pd/C powder was wet-filtered through a 400-mesh sieve before use.[1] Previous studies suggest that the parameters $\tau$ and $\theta$ are typically in the range of 2-10 and 0.2-0.7, respectively.[10,11] In our conservative calculation, 10 and 0.2 were used as the estimated values for $\tau$ and $\theta$, respectively. The diffusion coefficient of $ClO_4^-$ is ($D_{ClO_4^-}$) is $1.79 \times 10^{-9}$ $m^2s^{-1}$ in bulk solution.[12] Therefore, $C_{WP}$ is calculated as $$C_{WP} = \frac{k_{obs}\tau R^2}{D\theta} = \frac{0.185\ min^{-1} \times 10 \times \left(\frac{37}{2} \times 10^{-6}\ m\right)^2}{1.79 \times 10^{-9}\ m^2s^{-1} \times 60s\ min^{-1} \times 0.2} = 0.029 < 1$$

The above calculation shows that the WP criterion is satisfied for the system under consideration. Therefore, the pore diffusion resistance is negligible.

The evaluation of the external mass transfer rate is conducted following our recently reported method.[2] First, we calculated the Sherwood number (Sh) and used it to estimate the mass transfer coefficient ($k_{aq/s}$) of $ClO_4^-$ between the aqueous solution and the catalyst surface.[13,14]

$$Sh = \left[2 + 0.4\left(\frac{\varepsilon d_p^4}{v^3}\right)^{0.25} Sc^{0.33}\right] \cdot \phi_c \quad (13)$$

$$k_{aq/s} = \frac{D_{ClO_3^-}}{d_p} \cdot Sh \quad (14)$$

In Eq. 13, $\varepsilon$ is the rate of flow energy supply per unit mass of liquid ($m^2s^{-3}$), $d_p$ is the diameter of the catalyst particle (m), $\nu$ is the kinematic viscosity of water ($\nu_{H_2O}=1.003\times10^{-6}$ $m^2s^{-1}$ at 20° C.), Sc is Schmidt number, and $\phi_c$ is Carman's surface factor (assume the catalyst particle is spherical, $\phi_c=1$). We evaluated Sc and $\varepsilon$ with the following equations:

$$Sc = \frac{\nu_{H_2O}}{D_{ClO_4^-}} = \frac{1.003 \times 10^{-6}\ m^2s^{-1}}{1.79 \times 10^{-9}\ m^2s^{-1}} = 560.34$$

$$\varepsilon = \frac{N_p \cdot l^5 \cdot n^3}{V} = \frac{5 \times (3\ cm)^5 \times (27\ s^{-1})}{50\ cm^3} = 48\ m^2s^{-3}$$

where $N_p$ is the power number (normally $N_p \approx 5.0$)[15], l is the length of the stir bar (l≈3 cm), n is the rotating speed of the stir bar (n=1600 round $min^{-1}$=27 round $s^{-1}$), and V is the volume of the reactor (V=50 $cm^3$). Thus, $\varepsilon$ has the value of 48 $m^2\ s^{-3}$.

With the calculated values for Sc and $\varepsilon$, the Sherwood number was calculated as $$Sh = \left[2 + 0.4\left(\frac{48\ m^2s^{-3} \times (3.7 \times 10^{-5}\ m)^4}{(1.003 \times 10^{-6}\ m^2s^{-1})^3}\right)^{0.25} 560.34^{0.33}\right] \cdot 1 = 11.944$$

And $k_{aq/s}$ was estimated by Eq. 14.

$$k_{aq/s} = \frac{D_{ClO_3^-}}{d_p} \cdot Sh = \frac{1.79 \times 10^{-9}\ m^2s^{-1}}{3.7 \times 10^{-5}\ m} \times 11.944 = 5.78 \times 10^{-4}\ ms^{-1}$$

The geometric surface area of the catalyst per volume of solution (a)[16] is calculated as $$a = \frac{SA_p \times M}{\rho_p \times V_p} \times \frac{1}{V_R} =$$

$$\frac{4\pi \times (18.5 \times 10^{-6}\ m)^2 \times 0.01\ g}{2 \times 10^6\ gm^{-3} \times \frac{4\pi}{3}(18.5 \times 10^{-6}\ m)^3} \times \frac{1}{50 \times 10^{-6}\ m^3} = 16.22\ m^{-1}$$

in which $SA_p$ is the geometric surface area of one catalyst particle ($m^2$), M is the mass of catalyst in the reduction test (0.01 g), $V_p$ is the volume of one catalyst particle ($m^3$), and $V_R$ is the volume of the reactor (50 mL).

The mass transfer rate was then calculated by taking the product of the mass transfer coefficient and the geometric surface area of the catalyst per volume of the solution:

$$k_{aq/s} \cdot a = 5.78 \times 10^{-4}\ m\ s^{-1} \times 16.22\ m^{-1} = 9.375 \times 10^{-3}\ s^{-1} = 0.563\ min^{-1}$$

The above estimation indicates that the external mass transfer rate is larger than the observed rate constant $k_{obs}$=0.185 $min^{-1}$ for $ClO_4^-$ reduction. Therefore, the impact of external mass transfer on the reaction rates is negligible.

REFERENCES IN TABLE 16, MATERIALS AND METHODS SECTION OF EXAMPLE 80

1. Liu, J.; Choe, J. K.; Wang, Y.; Shapley, J. R.; Werth, C. J.; Strathmann, T. J. Bioinspired complex-nanoparticle hybrid catalyst system for aqueous perchlorate reduction: Rhenium speciation and its influence on catalyst activity. *ACS Catal.* 2015, 5, 511-522.
2. Ren, C.; Yang, P.; Gao, J.; Huo, X.; Min, X.; Bi, E. Y.; Liu, Y.; Wang, Y.; Zhu, M.; Liu, J. Catalytic reduction of aqueous chlorate with $MoO_x$ Immobilized on Pd/C. *ACS Catal.* 2020, 10, 8201-8211.
3. Zabinsky, S.; Rehr, J.; Ankudinov, A.; Albers. R.; Eller, M. Multiple-scattering calculations of X-ray-absorption spectra. *Phys. Rev. B* 1995, 52, 2995-3009.

4. Ghasemi, S.; Hosseini, S. R.; Nabipour, S.; Asen, P. Palladium nanoparticles supported on graphene as an efficient electrocatalyst for hydrogen evolution reaction. *Int. J. Hydrog. Energy* 2015, 40, 16184-16191.
5. Hurley, K. D.; Zhang, Y.; Shapley, J. R Ligand-enhanced reduction of perchlorate in water with heterogeneous Re—Pd/C catalysts. *J. Am. Chem. Soc.* 2009, 131, 14172-14173.
6. McPherson, L. D.; Drees, M.; Khan, S. I.; Strassner, T.; Abu-Omar, M. M. Multielectron atom transfer reactions of perchlorate and other substrates catalyzed by rhenium oxazoline and thiazoline complexes: Reaction kinetics, mechanisms, and density functional theory calculations. *Inorg. Chem.* 2004, 43, 4036-4050.
7. Ainsworth, S. Michaelis-Menten Kinetics. In *Steady-State Enzyme Kinetics*; Macmillan Education UK: London. 1977; pp 43-73.
8. Shuai, D.; Choe, J. K.; Shapley, J. R.; Werth, C. J. Enhanced activity and selectivity of carbon nanofiber supported Pd catalysts for nitrite reduction. *Environ. Sci. Technol.* 2012, 46, 2847-2855.
9. Weisz, P.; Prater. C. Interpretation of measurements in experimental catalysis. *Adv. Catal* 1954, 6, 60390-60399.
10. Satterfield, C. N. *Mass Transport in Heterogeneous Catalysis*: MIT Press: Cambridge, Mass., 1970.
11. Davie. M. G.; Reinhard, M.; Shapley, J. R Metal-catalyzed reduction of N-nitrosodimethylamine with hydrogen in water. *Environ. Sci. Technol.* 2006, 40, 7329-7335.
12. Heil, S. R.; Holz, M.; Kastner, T. M.; Weingärtner, H. Self-diffusion of the perchlorate ion in aqueous electrolyte solutions measured by $^{35}$Cl NMR spin-echo experiments. *J. Chem. Soc. Faraday Trans.* 1995, 91, 1877-1880.
13. Sänger, P.; Deckwer, W.-D. Liquid-solid mass transfer in aerated suspensions. *Chem. Eng. J.* 1981, 22, 179-186.
14. Sano, Y.; Yamaguchi, N.; Adachi, T. Mass transfer coefficients for suspended particles in agitated vessels and bubble columns. *J. Chem. Eng. Japan* 1974, 7, 255-261.
15. Bates, R. L.; Fondy, P. L.; Corpstein, R. R. Examination of some geometric parameters of impeller power. *Ind. Eng. Chem. Process. Des. Dev.* 1963, 2, 310-314.
16. Liu, B.; Yao, H.; Song, W.; Jin, L.; Mosa, I. M.; Rusling, J. F.; Suib, S. L.; He, J. Ligand-free noble metal nanocluster catalysts on carbon supports via "soft" nitriding. *J Am. Chem. Soc.* 2016, 138, 4718-4721.
17. You, J.; Wu, D.; Liu, H. Electrochemical studies of molybdate and thiomolybdates. *Polyhedron* 1986.5.535-537.
18. Hurley, K. D.; Shapley, J. R. Efficient heterogeneous catalytic reduction of perchlorate in water. *Environ. Sci. Technol.* 2007, 41, 2044-2049.
19. Liu, J.; Han, M.; Wu. D.; Chen, X.; Choe, J. K.; Werth, C. J.; Strathmann, T. J. A new bioinspired perchlorate reduction catalyst with significantly enhanced stability via rational tuning of rhenium coordination chemistry and heterogeneous reaction pathway. *Environ. Sci. Technol.* 2016, 50, 5874-5881.
20. Abu-Omar, M. M.; McPherson, L. D.; Arias, J.; Béreau, V. M. Clean and efficient catalytic reduction of perchlorate. *Angew. Chem.* 2000, 112, 4480-4483.
21. Ford, C. L.; Park, Y. J.; Matson. E. M.; Gordon, Z.; Fout, A. R. A bioinspired iron catalyst for nitrate and perchlorate reduction. *Science* 2016, 354, 741-743.
22. Drummond, M. J.; Miller, T. J.; Ford, C. L.; Fout, A. R. Catalytic perchlorate reduction using iron: Mechanistic insights and improved catalyst turnover. *ACS Catal.* 2020, 10, 3175-3182.
23. Choe, J. K.; Shapley. J. R.; Strathmann, T. J.; Werth. C. J. Influence of rhenium speciation on the stability and activity of Re/Pd bimetal catalysts used for perchlorate reduction. *Environ. Sci. Technol.* 2010, 44, 4716-4721.

Unless otherwise indicated, all numbers expressing quantities of ingredients, properties such as molecular weight, reaction conditions, and so forth used in the specification and claims are to be understood as being modified in all instances by the term "about." As used herein, the term "about" means that the item, parameter or term so qualified encompasses a range of plus or minus ten percent above and below the value of the stated item, parameter or term. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed considering the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice ant of the embodiments disclosed in the present disclosure.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It is to be understood that the embodiments of the invention disclosed herein are illustrative of the principles of the present invention. It should be understood that the disclosed subject matter is in no way limited to a particular methodology, protocol, and/or reagent, etc., as described herein. Various modifications or changes to or alternative configurations of the disclosed subject matter can be made in accordance with the teachings herein without departing from the spirit of the present specification. Accordingly, the present invention is not limited to that precisely as shown and described.

What is claimed is:

1. A heterogeneous catalyst for removing impurities from a fluid, the catalyst comprising: an oxygen atom transfer (OAT) transition metal, a Group VIII metal, a support, and a bidentate nitrogen donor ligand comprising two nitrogen donor groups wherein the nitrogen donor groups are on the ring of one or more heteroaryl, where the transition metal and the Group VIII metal are immobilized on the support, wherein the OAT transition metal is in the form of complex with the bidentate nitrogen donor ligand, and wherein the bidentate nitrogen donor ligand is:

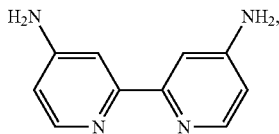 [SMILES: Nc1ccnc(-c2cc(N)ccn2)c1]

or a salt thereof.

2. The catalyst of claim 1, where the OAT transition metal is a Group 5 or Group 6 metal.

3. The catalyst of claim 2, where the OAT transition metal is vanadium, tungsten, molybdenum, or oxides thereof.

4. The catalyst of claim 3, where the OAT transition metal is molybdenum, or oxides thereof.

5. The catalyst of claim 4, where the molar ratio of the OAT transition metal to the nitrogen donor ligand is 1:1.

6. The catalyst of claim 5, where the Group VIII metal is palladium (Pd).

7. The catalyst of claim 6, where the support comprises activated carbon.

8. The catalyst of claim 1, where the molar ratio between the Group VIII metal and OAT transition metal is from 100:1 to 1:100.

9. The catalyst of claim 1, where the total amount of loading of OAT transition metal on the support is from 0.01 wt. % to 20 wt. % of the support.

10. The catalyst of claim 1, where the catalyst can chemically remove perchlorate ($ClO_4^-$) from the fluid in the presence of a reducing atmosphere when the fluid is acidic.

* * * * *